(12) United States Patent
Pollica et al.

(10) Patent No.: US 11,892,126 B2
(45) Date of Patent: Feb. 6, 2024

(54) HYDROGEN FUELING SYSTEMS AND METHODS

(71) Applicant: Ivys Inc., Waltham, MA (US)

(72) Inventors: Darryl Edward Pollica, Melrose, MA (US); Christopher John O'Brien, Somerville, MA (US); Bryan Gordon, Goffstown, NH (US)

(73) Assignee: Ivys Inc., Waltham, MA (US)

( * ) Notice: Subject to any disclaimer, the term of this patent is extended or adjusted under 35 U.S.C. 154(b) by 0 days.

(21) Appl. No.: 17/587,821

(22) Filed: Jan. 28, 2022

(65) Prior Publication Data
US 2022/0186883 A1 Jun. 16, 2022

Related U.S. Application Data

(63) Continuation of application No. 17/374,268, filed on Jul. 13, 2021.
(Continued)

(51) Int. Cl.
*F17C 9/00* (2006.01)
*B67D 7/14* (2010.01)
*B67D 7/80* (2010.01)

(52) U.S. Cl.
CPC ............... *F17C 9/00* (2013.01); *B67D 7/145* (2013.01); *B67D 7/80* (2013.01);
(Continued)

(58) Field of Classification Search
CPC ... B67D 7/145; B67D 7/80; F17C 9/00; F17C 2221/012; F17C 2250/032; F17C 2250/0636; F17C 2265/065; F17C 2270/0168; F17C 2270/0184; F17C 2227/0341; F17C 2227/0388; F17C 2250/034; F17C 2250/043; F17C 2250/0439; F17C 2250/0631; F17C 2260/025; F17C 2270/0139; F17C 13/0325; F17C 13/026; F17C 5/007
(Continued)

(56) References Cited

U.S. PATENT DOCUMENTS

| 3,194,025 A | 7/1965 | Grossmann |
| 3,871,444 A | 3/1975 | Edwin et al. |

(Continued)

FOREIGN PATENT DOCUMENTS

| CN | 101251352 A | 8/2008 |
| CN | 203147014 U | 8/2013 |

(Continued)

OTHER PUBLICATIONS

WO-2019176915-A1 English Translation of Specification (Year: 2022).*

(Continued)

*Primary Examiner* — Timothy P. Kelly
*Assistant Examiner* — Stephanie A Shrieves
(74) *Attorney, Agent, or Firm* — Wolf, Greenfield & Sacks, P.C.

(57) ABSTRACT

According to aspects, hydrogen fueling systems and methods are provided, including vehicle-to-vehicle communication techniques, hydrogen cooling techniques and/or hydrogen dispenser control techniques that facilitate improving aspects of a hydrogen fueling station.

16 Claims, 40 Drawing Sheets

Related U.S. Application Data

(60) Provisional application No. 63/195,435, filed on Jun. 1, 2021, provisional application No. 63/131,953, filed on Dec. 30, 2020, provisional application No. 63/057,159, filed on Jul. 27, 2020, provisional application No. 63/057,163, filed on Jul. 27, 2020, provisional application No. 63/057,150, filed on Jul. 27, 2020, provisional application No. 63/051,181, filed on Jul. 13, 2020.

(52) U.S. Cl.
CPC .. *F17C 2221/012* (2013.01); *F17C 2250/032* (2013.01); *F17C 2250/0636* (2013.01); *F17C 2265/065* (2013.01); *F17C 2270/0168* (2013.01); *F17C 2270/0184* (2013.01)

(58) Field of Classification Search
USPC .............................................................. 141/1
See application file for complete search history.

(56) References Cited

U.S. PATENT DOCUMENTS

| | | | |
|---|---|---|---|
| 4,321,963 A | 3/1982 | Bowden | |
| 4,360,059 A | 11/1982 | Funke | |
| 4,386,309 A | 5/1983 | Peschka | |
| 4,793,377 A | 12/1988 | Haynes et al. | |
| 5,913,180 A | 6/1999 | Ryan | |
| 6,390,151 B1 | 5/2002 | Christman et al. | |
| 6,615,137 B2 | 9/2003 | Lutter et al. | |
| 6,904,944 B2 | 6/2005 | Satou et al. | |
| 7,406,987 B2 | 8/2008 | Takano et al. | |
| 8,020,589 B2* | 9/2011 | Cohen | F17C 5/06 141/234 |
| 8,239,103 B2 | 8/2012 | Ichihara | |
| 8,336,734 B2 | 12/2012 | Ware et al. | |
| 8,517,062 B2* | 8/2013 | Allidieres | F17C 5/06 141/4 |
| 8,555,920 B2* | 10/2013 | Hirata | G05D 7/0664 137/601.18 |
| 8,924,037 B2 | 12/2014 | Seymour et al. | |
| 9,458,968 B2* | 10/2016 | Gupta | F17C 5/007 |
| 9,464,761 B2 | 10/2016 | Nagura et al. | |
| 9,574,709 B2 | 2/2017 | Seki et al. | |
| 9,586,806 B2 | 3/2017 | Mathison | |
| 9,765,933 B2* | 9/2017 | Lambrix | F17C 5/007 |
| 9,810,374 B2 | 11/2017 | Nagura et al. | |
| 9,863,583 B2* | 1/2018 | Youlio | F17C 13/025 |
| 10,683,967 B2 | 6/2020 | Petersen et al. | |
| 10,920,933 B2 | 2/2021 | Werlen et al. | |
| 10,949,830 B1 | 3/2021 | Gaudin et al. | |
| 11,034,338 B2 | 6/2021 | Lei et al. | |
| 11,692,670 B2 | 7/2023 | Pollica et al. | |
| 2003/0150510 A1 | 8/2003 | Cohen et al. | |
| 2005/0061390 A1 | 3/2005 | Mathis et al. | |
| 2005/0178463 A1* | 8/2005 | Kountz | F17C 9/02 141/4 |
| 2007/0079892 A1* | 4/2007 | Cohen | F17C 5/06 141/105 |
| 2007/0104988 A1 | 5/2007 | Nishii et al. | |
| 2009/0151812 A1* | 6/2009 | Allidieres | F17C 5/06 141/82 |
| 2009/0155648 A1 | 6/2009 | Lee et al. | |
| 2009/0185972 A1 | 7/2009 | Lee et al. | |
| 2009/0187416 A1 | 7/2009 | Baer et al. | |
| 2009/0199590 A1 | 8/2009 | Adler et al. | |
| 2010/0016168 A1 | 1/2010 | Atkins et al. | |
| 2010/0307636 A1 | 12/2010 | Uemura | |
| 2011/0077809 A1 | 3/2011 | Leary | |
| 2011/0259469 A1 | 10/2011 | Harty et al. | |
| 2012/0125482 A1* | 5/2012 | Mori | F17C 5/007 141/98 |
| 2012/0159970 A1 | 6/2012 | Reese et al. | |
| 2012/0193072 A1 | 8/2012 | Enomura | |
| 2012/0216915 A1 | 8/2012 | Takata et al. | |
| 2012/0325443 A1 | 12/2012 | Miyata et al. | |
| 2013/0037165 A1 | 2/2013 | Okawachi et al. | |
| 2014/0102587 A1 | 4/2014 | Nagura et al. | |
| 2014/0196814 A1 | 7/2014 | Nagura et al. | |
| 2014/0202584 A1* | 7/2014 | Mathison | F17C 5/06 141/4 |
| 2015/0068222 A1 | 3/2015 | Hakamada et al. | |
| 2015/0267865 A1 | 9/2015 | Adler et al. | |
| 2015/0308621 A1 | 10/2015 | Mathison | |
| 2015/0345705 A1 | 12/2015 | Seki et al. | |
| 2015/0368102 A1 | 12/2015 | Louis | |
| 2016/0153615 A1 | 6/2016 | Allidieres | |
| 2016/0281928 A1 | 9/2016 | Yoshida et al. | |
| 2017/0023180 A1* | 1/2017 | Petit | F16K 15/023 |
| 2017/0030524 A1 | 2/2017 | Tilander | |
| 2017/0073211 A1 | 3/2017 | Wilson et al. | |
| 2017/0308965 A1 | 10/2017 | Morris et al. | |
| 2017/0328519 A1 | 11/2017 | Okuno et al. | |
| 2018/0038550 A1 | 2/2018 | Kondo | |
| 2018/0266633 A1 | 9/2018 | Fujita | |
| 2018/0375536 A1 | 12/2018 | Emori et al. | |
| 2019/0064834 A1 | 2/2019 | Adams | |
| 2019/0092234 A1 | 3/2019 | Gibson et al. | |
| 2019/0271439 A1* | 9/2019 | Lopez | G05D 7/03 |
| 2020/0010966 A1 | 1/2020 | Kazuno et al. | |
| 2020/0063917 A1 | 2/2020 | Werlen et al. | |
| 2020/0276909 A1 | 9/2020 | Boisen et al. | |
| 2022/0136655 A1 | 5/2022 | Pollica et al. | |
| 2022/0153568 A1 | 5/2022 | Pollica et al. | |
| 2022/0186879 A1 | 6/2022 | Pollica et al. | |
| 2022/0186880 A1 | 6/2022 | Pollica et al. | |
| 2022/0186881 A1 | 6/2022 | Pollica et al. | |
| 2022/0186882 A1 | 6/2022 | Pollica et al. | |
| 2022/0193600 A1 | 6/2022 | Maehara et al. | |

FOREIGN PATENT DOCUMENTS

| | | | | |
|---|---|---|---|---|
| CN | 203162293 U | | 8/2013 | |
| CN | 106090387 A | | 11/2016 | |
| JP | 2003-269693 A | | 9/2003 | |
| KR | 2013-0084841 A | | 7/2013 | |
| KR | 2018-0115760 A | | 10/2018 | |
| WO | WO-2019176915 A1 * | | 9/2019 | B67D 7/04 |

OTHER PUBLICATIONS

Invitation to Pay Additional Fees dated Sep. 22, 2021 for International Application No. PCT/US21/41401.

International Search Report and Written Opinion dated Dec. 8, 2021 for International Application No. PCT/US21/41401.

International Preliminary Report on Patentability dated Jan. 26, 2023 for International Application No. PCT/US2021/041401.

[No Author Listed], Differences Between Encoder Resolution, Accuracy, and Precision. Robotics Business Review. Oct. 22, 2019. https://www.roboticsbusinessreview.com/news/differences-between-encoder-resolution-accuracy-and-precision/. [Last retrieved Feb. 23, 2023]. 23 pages.

* cited by examiner

HYDROGEN FUELING SYSTEMS AND METHODS

CROSS REFERENCE TO RELATED APPLICATIONS

This application claims the benefit under 35 U.S.C. § 120 and is a continuation (CON) of U.S. application Ser. No. 17/374,268, entitled "HYDROGEN FUELING SYSTEMS AND METHODS" filed on Jul. 13, 2021, which claims priority under 35 U.S.C. § 119 to U.S. Provisional Application Ser. No. 63/195,435, filed Jun. 1, 2021 and titled HYDROGEN FUELING SYSTEMS AND METHODS, to U.S. Provisional Application Ser. No. 63/131,953, filed Dec. 30, 2020 and titled VEHICLE COMMUNICATION IN HYDROGEN GAS DISPENSING SYSTEMS, to U.S. Provisional Application Ser. No. 63/057,163, filed Jul. 27, 2020 and titled VEHICLE TO DISPENSER COMMUNICATION METHODS AND APPARATUS, to U.S. Provisional Application Ser. No. 63/057,150, filed Jul. 27, 2020 and titled HYDROGEN DISPENSER METHODS AND APPARATUS, to U.S. Provisional Application Ser. No. 63/057,159, filed Jul. 27, 2020 and titled HYDROGEN COOLING METHODS AND APPARATUS, to U.S. Provisional Application Ser. No. 63/051,181, filed Jul. 13, 2020 and titled VEHICLE TO DISPENSER COMMUNICATION METHODS AND APPARATUS, each application of which is herein incorporated by reference in its entirety.

BACKGROUND

Hydrogen fuel cell vehicles (HFCV) are emerging as a zero-emission alternative to internal combustion engine vehicles. HFCVs operate by providing compressed hydrogen to a fuel cell stack which converts the hydrogen into electricity to drive an electric motor. Similar to internal combustion engine vehicles, HFCVs are equipped with fuel tanks that must be refilled periodically. To safely and/or efficiently dispense hydrogen gas to a vehicle, a number of parameters are typically required, including tank volume, measured pressure and measured temperature. Conventionally, fueling parameters are communicated between a hydrogen gas dispenser and the vehicle using the set of protocols specified by the Infrared Data Association (IrDA) for optical line-of-sight (LOS) wireless communication. IrDA provides a communication scheme with a low bit error rate suitable for communication between a dispenser on a vehicle.

HFCVs often have fuel tanks that utilize Compressed Hydrogen Storage Systems (CHSS), which are very sensitive to high temperatures. Many current fueling protocols adopted by hydrogen refueling stations require gaseous hydrogen fuel to be cooled between $-40°$ C. to $-17.5°$ C. prior to dispensing to the vehicle in order to ensure the vehicle's CHSS maintain their bulk gas temperatures below $85°$ C. regardless of ambient or previous driving conditions. Current fueling stations typically employ one of two types of heat exchangers to cool hydrogen gas for dispensing into the fuel tank of an HFCV.

A first conventional heat exchanger includes a large cast aluminum block (typically, in a range between 600-1000 kg) that is buried underneath the fuel dispenser and that is cooled to very low temperatures by a refrigeration or condenser unit (also referred to as a "chiller" or "cooler") via refrigeration tubing about which the aluminum block was cast. The aluminum block is also cast with stainless steel tubing through which hydrogen gas is passed to cool the hydrogen gas before dispensing the hydrogen into the fuel tank of the vehicle. Specifically, heat exchange between the hydrogen gas flowing through the stainless-steel tubing and the chilled aluminum block cools the hydrogen gas to the low temperatures needed for HFCV dispensing.

A second conventional heat exchanger employs a diffusion-bonded heat exchanger that uses a conventional plate-to-plate configuration that is designed for high pressure. The diffusion-bonded heat exchanger is fluidly coupled to a reservoir of coolant that is brought down to the low temperatures needed for hydrogen gas dispensing by a large refrigeration unit (chiller). Chilled coolant from the reservoir is passed through the diffusion-bonded heat exchanger along with hydrogen gas to cool the hydrogen gas before dispensing into the fuel tank of the HFCV.

SUMMARY

Some embodiments include a hydrogen gas fueling station comprising a roadside unit positioned at the fueling station and configured to communicate with a first on-board unit associated with a first vehicle, and a first dispenser communicatively coupled to the roadside unit and configured to dispense hydrogen gas via a first nozzle, the first dispenser configured to provide first nozzle information corresponding to the first nozzle to the first vehicle when the first vehicle has engaged with the first nozzle, wherein the roadside unit is configured to receive feedback from the first vehicle responsive to the first nozzle identification information via a first connection established with the first on-board unit.

Some embodiments include method of performing vehicle-to-nozzle pairing comprising establishing a first connection between a roadside unit positioned at a fueling station and a first on-board unit associated with a first vehicle, engaging a first nozzle of a first dispenser with a first vehicle, providing first nozzle information corresponding to the first nozzle to the first vehicle, receiving feedback from the first vehicle responsive to the first nozzle identification information via the first connection, and associating the first connection with the first nozzle based on the received feedback.

Some embodiments include a fueling station comprising a roadside unit positioned at the fueling station and configured to communicate with a plurality of on-board units associated with respective vehicles via a respective wireless connection established between the roadside unit and each of the plurality of on-board units, and at least one controller configured to process fueling information received via each respective wireless connection and configured to cause at least one action to be performed based on the received fueling information.

Some embodiments include a method comprising establishing a wireless connection between a roadside unit positioned at a fueling station and each of a plurality of on-board units associated with respective vehicles, receiving fueling information via each wireless connection, and performing at least one action at the fueling station in response to the received fueling information.

Some embodiments includes fueling station comprising a roadside unit positioned at the fueling station and configured to communicate with a plurality of on-board units associated with respective vehicles via a respective wireless connection between the roadside unit and each of the plurality of on-board units, and at least one controller coupled to the roadside unit, the at least one controller configured to process fueling information received via each respective wireless connection and configured to cause at least one action to be performed based on an expected refueling demand determined from the received fueling information.

Some embodiments include a method comprising establishing a wireless connection between a roadside unit positioned at a fueling station and each of a plurality of on-board units associated with respective vehicles, receiving fueling information via each wireless connection, and performing at least one action at the fueling station based on an expected refueling demand determined from the received fueling information.

Some embodiments include a fueling station comprising a roadside unit positioned at the fueling station and configured to communicate with a first on-board unit associated with a first vehicle via a first wireless connection established between the roadside unit and the on-board unit, and at least one controller configured to receive a nozzle reservation request via the first wireless connection and configured to negotiate a nozzle reservation via the first wireless connection.

Some embodiments include a method comprising establishing a wireless connection between a roadside unit positioned at a fueling station and a first on-board unit associated with a first vehicle, receiving a nozzle reservation request via the first wireless connection, and negotiating a nozzle reservation via the first wireless connection.

Some embodiments include a fueling station comprising a first roadside unit positioned at the fueling station and configured to communicate with a plurality of on-board units associated with respective vehicles via a respective wireless connection between the roadside unit and each of the plurality of on-board units, and at least one controller coupled to the first roadside unit, the at least one controller configured to process fueling information received from the roadside unit via each respective wireless connection, determine status information indicative of refueling capability of the fueling station, and provide the status information to at least one of the plurality of on-board units via the respective wireless connection.

Some embodiments include a method comprising establishing a wireless connection between a roadside unit positioned at a fueling station and each of a plurality of on-board units associated with respective vehicles, receiving fueling information received via each respective wireless connection, determining status information indicative of refueling capability of the fueling station, and providing the status information to at least one of the plurality of on-board units via the respective wireless connection.

Some embodiments include a hydrogen cooling system comprising a large-volume reservoir for holding coolant, a small-capacity refrigeration unit coupled to the large-volume reservoir to reduce a temperature of coolant held in the large-volume reservoir, and a heat exchanger configured to thermally couple coolant held by the large-volume reservoir to hydrogen gas flowing through the heat exchanger via heat exchange with the coolant.

Some embodiments include a hydrogen cooling system comprising a large-volume reservoir for holding coolant, a small-capacity refrigeration unit fluidly coupled to the large-volume reservoir to reduce the temperature of coolant held in the large-volume reservoir, and a heat exchanger fluidly coupled to the large-volume reservoir and a hydrogen gas source, the heat exchanger configured to cool hydrogen gas from the hydrogen gas source using coolant from the large-volume reservoir.

Some embodiments include a hydrogen fueling system comprising a first dispenser configured to dispense hydrogen gas via a first nozzle, a second dispenser configured to dispense hydrogen gas via a second nozzle, a large-volume reservoir for holding coolant, a small-capacity refrigeration unit coupled to the large-volume reservoir to reduce a temperature of coolant held in the large-volume reservoir, a first heat exchanger coupled to the large-volume reservoir and configured to chill hydrogen gas via heat transfer with coolant held by the large-volume reservoir and provide chilled hydrogen gas to the first dispenser for dispensing via the first nozzle, and a second heat exchanger coupled to the large-volume reservoir and configured to chill hydrogen gas via heat transfer with coolant held by the large-volume reservoir and provide chilled hydrogen gas to the second dispenser for dispensing via the second nozzle.

Some embodiments include a hydrogen fueling system comprising a first dispenser configured to dispense hydrogen gas via a first nozzle, a second dispenser configure to dispense hydrogen gas via a second nozzle, a large-volume reservoir for holding coolant, a small-capacity refrigeration unit coupled to the large-volume reservoir to reduce a temperature of coolant held in the large-volume reservoir, and a first heat exchanger coupled to the large-volume reservoir and configured to chill hydrogen gas via heat transfer with coolant held by the large-volume reservoir and provide chilled hydrogen gas to the first dispenser for dispensing via the first nozzle and to the second dispenser for dispensing via the second nozzle.

Some embodiments include a hydrogen fueling system comprising a first dispenser configured to dispense hydrogen gas via a first nozzle, a second dispenser configure to dispense hydrogen gas via a second nozzle, a first large-volume reservoir for holding coolant, a second large-volume reservoir for holding coolant, a small-capacity refrigeration unit coupled to the first large-volume reservoir and the second large-volume reservoir to reduce a temperature of coolant held in the first large-volume reservoir and the second large-volume reservoir, a first heat exchanger coupled to the large-volume reservoir and configured to chill hydrogen gas via heat transfer with coolant held the first large-volume reservoir and provide chilled hydrogen gas to the first dispenser for dispensing via the first nozzle, and a second heat exchanger coupled to the second large-volume reservoir and configured to chill hydrogen gas via heat transfer with coolant held by the second large-volume reservoir and provide chilled hydrogen gas to the second dispenser for dispensing via the second nozzle.

Some embodiments include a hydrogen cooling system comprising a first reservoir comprising a first tank configured to hold first coolant comprising at least one phase-change material, a refrigeration unit coupled to the first reservoir to chill the first coolant to cause the phase-change material held by the first tank to change from a first state to a second state, and a first heat exchanger configured to thermally couple the first coolant held by the first reservoir to hydrogen gas flowing through the heat exchanger via heat exchange with the first coolant.

Some embodiments include a hydrogen cooling system comprising a first reservoir comprising a first tank configured to hold first coolant comprising at least one phase change material, a second reservoir comprising second tank configured to hold second coolant, a refrigeration unit coupled to the first reservoir to chill the at least one phase change material to cause the phase change material to change from a first state to a second state, and coupled to the second reservoir to chill the second coolant, and a first heat exchanger configured to thermally couple the first coolant and hydrogen gas flowing through the heat exchanger to chill the hydrogen gas to a first temperature via heat exchange with the first coolant, and a second heat exchanger configured to thermally couple the second coolant and the hydrogen gas chilled to the first temperature to chill the hydrogen gas to a second temperature via heat exchange with the second coolant and to provide the chilled hydrogen gas to at least one first dispenser.

Some embodiments include a hydrogen fueling system comprising a first dispenser configured to dispense hydrogen gas via a first nozzle, a second dispenser configured to dispense hydrogen gas via a second nozzle, a large-volume reservoir for holding coolant, a single small-capacity refrigeration unit fluidly coupled to the large-volume reservoir to reduce the temperature of coolant held in the large-volume reservoir, a first heat exchanger fluidly coupled to the large-volume reservoir and a hydrogen gas source, the first heat exchanger configured to provide cooled hydrogen gas for dispensing by the first dispenser via the first nozzle, and a second heat exchanger fluidly coupled to the large-volume reservoir and a hydrogen gas source, the heat exchanger configured to provide cooled hydrogen gas for dispensing by the second dispenser via the second nozzle.

Some embodiments include a hydrogen fueling system comprising a first dispenser configured to dispense hydrogen gas via a first nozzle, a second dispenser configure to dispense hydrogen gas via a second nozzle, a large-volume reservoir for holding coolant, a small-capacity refrigeration unit fluidly coupled to the large-volume reservoir to reduce the temperature of coolant held in the large-volume reservoir, and a first heat exchanger fluidly coupled to the large-volume reservoir and a hydrogen gas source, the first heat exchanger configured to provide cooled hydrogen gas to the first dispenser for dispensing via the first nozzle and to the second dispenser for dispensing via the second nozzle.

Some embodiments include a hydrogen fueling system comprising a first dispenser configured to dispense hydrogen gas via a first nozzle, a second dispenser configure to dispense hydrogen gas via a second nozzle, a first large-volume reservoir for holding coolant, a second large volume reservoir for holding coolant, a small-capacity refrigeration unit fluidly coupled to the first large-volume reservoir and the second large-volume reservoir to reduce the temperature of coolant held in the first and second large-volume reservoirs, a first heat exchanger fluidly coupled to the first large-volume reservoir and a hydrogen gas source, the first heat exchanger configured to provide cooled hydrogen gas for dispensing by the first dispenser via the first nozzle, and a second heat exchanger fluidly coupled to the second large-volume reservoir and a hydrogen gas source, the heat exchanger configured to provide cooled hydrogen gas for dispensing by the second dispenser via the second nozzle.

Some embodiments include a hydrogen cooling system comprising a first reservoir comprising a first tank holding at least one phase change material, a refrigeration unit coupled to the first reservoir to chill the at least one phase change material to cause the phase change material held by the first tank to change from a first state to a second state, and a first heat exchanger to receive hydrogen from a hydrogen gas source and provide hydrogen gas to at least one first dispenser, the first heat exchanger coupled to the first reservoir to chill the hydrogen gas from the hydrogen gas source to provide chilled hydrogen to the at least one first dispenser.

Some embodiments include a hydrogen cooling system comprising a first reservoir comprising a first tank configured to hold first coolant comprising at least one phase-change material, a second reservoir comprising a second tank configured to hold second coolant, a refrigeration unit coupled to the first reservoir to chill the at least one phase-change material to cause the at least one phase-change material to change from a first state to a second state, and coupled to the second reservoir to chill the second coolant, a first heat exchanger configured to thermally couple the first coolant and hydrogen gas flowing through the first heat exchanger to chill the hydrogen gas to a first temperature via heat exchange with the first coolant, and a second heat exchanger configured to thermally couple the second coolant and the hydrogen gas chilled to the first temperature to chill the hydrogen gas to a second temperature via heat exchange with the second coolant and to provide the chilled hydrogen gas to at least one first dispenser.

Some embodiments include a hydrogen cooling system comprising a first reservoir comprising a first tank holding at least one phase change material, a second reservoir comprising second tank holding at least one non-phase change coolant, a refrigeration unit coupled to the first reservoir to chill the at least one phase change material to cause the phase change material held by the first tank to change from a first state to a second state, and coupled to the second reservoir to chill the at least one non-phase change coolant, a first heat exchanger to receive hydrogen from a hydrogen gas source, the first heat exchanger coupled to the first reservoir to chill the hydrogen gas to a first temperature via heat exchange with the at least one phase change material, and a second heat exchanger to receive the hydrogen gas at the first temperature from the first heat exchanger, the second heat exchanger coupled to the second reservoir to chill the hydrogen gas via heat exchange with the at least one non-phase change material to chill the hydrogen gas to a second temperature and provide the hydrogen gas to at least one first dispenser.

Some embodiments include an annular heat exchanger comprising a shell having a coolant inlet and a coolant outlet, at least one coil comprising nickel alloy tubing concentrically arranged within the shell, the at least one coil having a hydrogen inlet and a hydrogen outlet, and a plurality of copper fins brazed to the at least one nickel alloy coil using silver or silver alloy, wherein the annular heat exchanger is configured to chill hydrogen gas that is caused to flow through the at least one coil via the hydrogen inlet and the hydrogen outlet by heat exchange with coolant that is caused to circulate through the shell via the coolant inlet and the coolant outlet.

Some embodiments include annular heat exchanger comprising a shell having a coolant inlet and a coolant outlet, at least one coil comprising tubing concentrically arranged within the shell, the tubing having a wall thickness between 0.03 and 0.06 inches and a length between 30 and 50 feet, the at least one coil further comprising a hydrogen inlet and a hydrogen outlet and having between 20 and 35 turns, and a plurality of fins attached to the at least one coil, wherein the annular heat exchanger is configured to chill hydrogen gas that is caused to flow through the at least one coil via the hydrogen inlet and the hydrogen outlet via heat exchange with coolant that is caused to circulate through the shell via the coolant inlet and the coolant outlet.

Some embodiments include a hydrogen gas dispenser configured to receive hydrogen gas from a hydrogen gas supply and provide the hydrogen gas to a fuel tank of a vehicle during a fueling event, the hydrogen gas dispenser comprising at least one nozzle configured to engage with the fuel tank to dispense hydrogen gas to the fuel tank during the fueling event, a valve bank comprising a plurality of fixed-size orifice valves arranged in parallel, the bank configured to receive hydrogen gas from the hydrogen gas supply and to deliver hydrogen gas passing through one or more of the plurality of fixed-size orifice valves that have been opened, and a dispenser controller coupled to the bank and configured to selectively open or close the plurality of fixed-size orifice valves to deliver gas at desired target pressures and/or target flow rates to the at least one nozzle.

Some embodiments include a hydrogen gas dispenser configured to receive hydrogen gas from a hydrogen gas supply and provide the hydrogen gas to a fuel tank of a vehicle during a fueling event, the hydrogen gas dispenser comprising at least one nozzle configured to engage with the fuel tank to dispense hydrogen gas to the fuel tank during the fueling event, a variable-size valve comprising a valve stem that when rotated changes a size of the valve opening, the variable-size valve coupled to receive hydrogen gas from the hydrogen gas such that changing the size of the valve opening results in a change in a flow rate of hydrogen gas passing through the valve opening, a direct drive servo motor coupled to the valve stem of the variable-size valve, the direct drive servo motor configured to rotate the valve stem to change the size of the valve opening, wherein one rotation of the direct drive servo motor results in one rotation of the valve stem, and a dispenser controller coupled to the direct drive servo motor and configured to cause the direct drive servo motor to rotate to change the size of the valve opening to provide hydrogen gas at desired flow rates based on target pressures and/or target flow rates of the fuel tank of the vehicle during the fueling event.

Some embodiments include coaxial tubing for piping hydrogen gas between components of a hydrogen fueling station, the coaxial tubing comprising inner tubing configured to allow hydrogen gas to be piped between one or more components of the hydrogen fueling station, middle tubing arranged concentrically about the inner tubing such that when phase change material is contained in the middle tubing, the phase change material is positioned to thermally couple to hydrogen gas flowing through the inner tubing, and outer tubing arranged concentrically about the middle tubing such that when coolant is conveyed through the outer tubing, the coolant thermally couples to the phase-change material when present.

Some embodiments include a hydrogen fueling system comprising coaxial tubing comprising inner tubing configured to allow hydrogen gas to be piped between one or more components of the hydrogen fueling station, middle tubing arranged concentrically about the inner tubing so that a phase change material contained in the middle tubing thermally couples to hydrogen gas flowing through the inner tubing, and outer tubing arranged concentrically about the middle such that when coolant is conveyed through the outer tubing, the coolant thermally couples to the phase-change material contained in the middle tubing, and a chiller system configured to chill coolant to a temperature sufficient to cause a state transition of the phase-change material, the chiller system coupled to the coaxial tubing to convey chilled coolant through the outer tubing to cause the state transition of the phase-change material contained in the middle tubing.

BRIEF DESCRIPTION OF DRAWINGS

Various aspects and embodiments of the disclosed technology will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
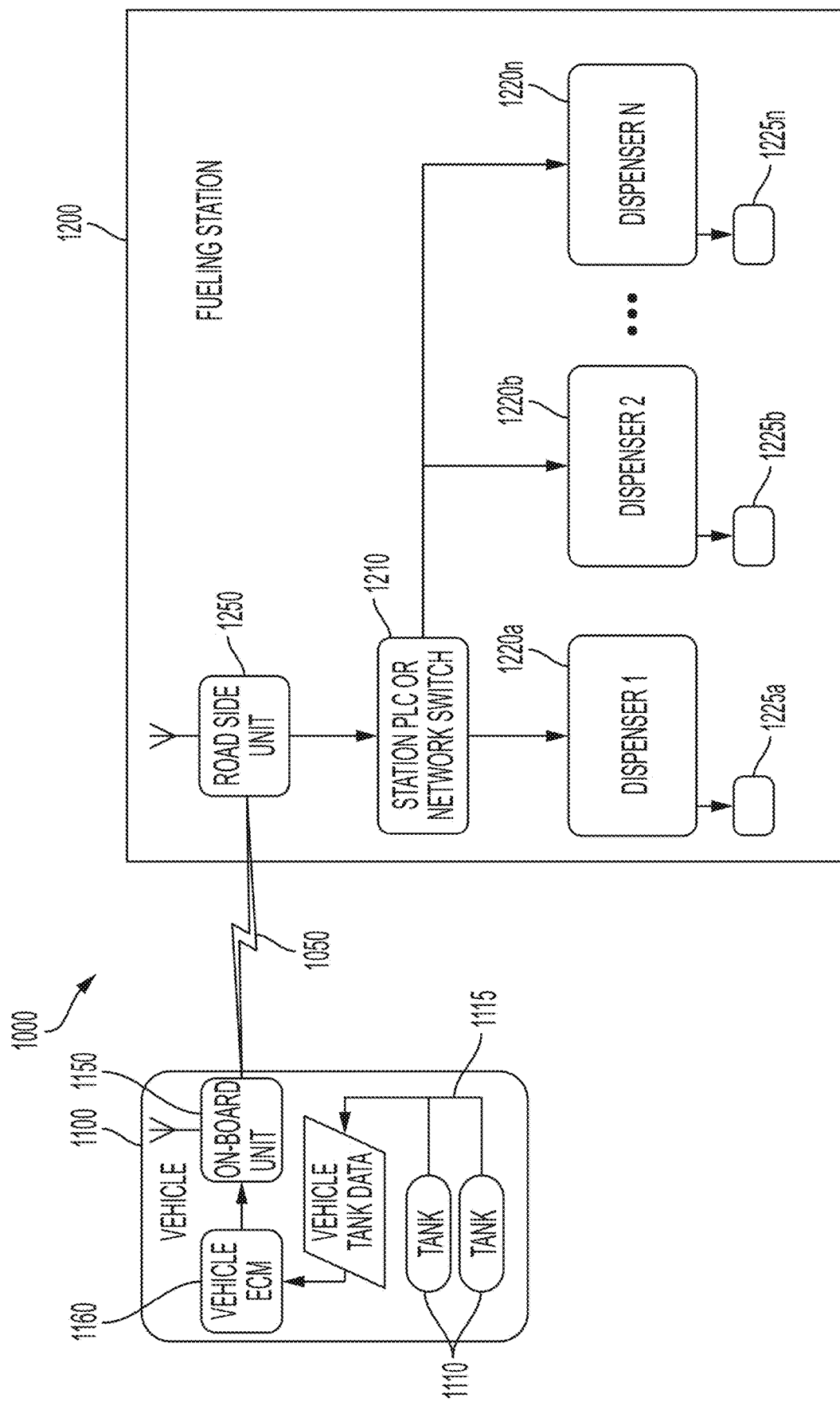
FIG. 1 illustrates a block diagram of an exemplary hydrogen gas dispensing system including a fueling station and a vehicle communicatively coupled to the fueling station, in accordance with some embodiments.

Existing communication between a vehicle and a hydrogen fueling station is generally limited to a LOS link between the vehicle and the hydrogen dispenser, conventionally implemented using a one-way IrDA connection established between an infrared transmitter disposed near the vehicle's fuel tank and an infrared receiver on the dispenser nozzle brought into close proximity when the nozzle is inserted into the vehicle's fuel tank. Once this unidirectional communication link is established, the vehicle can transmit fueling parameters such as tank volume and current tank conditions such as tank pressure and temperature. This conventional approach has a number of drawbacks recognized by the inventors, including limited bandwidth, unidirectionality, equipment reliability and cost (approximately $3K per nozzle), etc.

The inventors have recognized that vehicle-to-vehicle and vehicle-to-infrastructure communications, referred to as V2X, can be employed to expand the communication capabilities between vehicles and hydrogen fueling stations to improve the refueling process in a number of ways, including providing a higher bandwidth, bi-directional communication channel capable of safely and securely exchanging a much richer set of data between vehicles and fueling stations. According to some embodiments, a vehicle is equipped with an on-board unit (OBU) configured to wirelessly communicate with a road-side unit (RSU) located at a fueling station to exchange, among other data, fueling parameters, status information on the fueling station, and the like.

The inventors have further developed techniques to determine which vehicle is engaged with which nozzle at a fueling station, a process referred to as vehicle-to-nozzle pairing. As discussed above, conventional systems employed an IrDA communication link between a vehicle and a dispenser established between an IrDA transmitter disposed proximate the vehicle's fuel and tank and an IrDA receiver (typically a circular array of IrDA receivers) disposed on the nozzle dispenser. Because an IrDA link could only be established between a nozzle and the vehicle to which the nozzle was engaged, there was no ambiguity to resolve. However, in a V2X wireless network, a fueling station may communicate with numerous vehicles within a zone of communication of the fueling station. As a result, the fueling station typically needs to resolve which vehicle is engaged at a given nozzle prior to performing a refueling event. According to some embodiments, vehicle-to-nozzle pairing comprises providing nozzle information to a vehicle and receiving feedback from the vehicle via a wireless connection (e.g., a V2X connection) in response to receiving the nozzle information via a V2X connection established between the fueling station and the vehicle. The feedback from the vehicle may be used to associate the nozzle with the wireless connection to perform vehicle-to-nozzle pairing. The inventors have also recognized the importance of allowing refueling events to be performed anonymously. To ensure that vehicle anonymity can be maintained, the inventors have developed vehicle-to-nozzle pairing techniques and refueling processes that do not require a vehicle to provide information that identifies the vehicle or its operator, examples of which are described in further detail below.

Following below are further detailed descriptions of various concepts related to, and embodiments of, vehicle communication systems and methods for facilitating refueling of hydrogen fuel cell vehicles. It should be appreciated that the embodiments described herein may be implemented in any of numerous ways. Examples of specific implementations are provided below for illustrative purposes only. It should be appreciated that the embodiments and the features/capabilities provided may be used individually, all together, or in any combination of two or more, as aspects of the technology described herein are not limited in this respect.

FIG. 1 illustrates an exemplary system in which a fueling station is configured to communicate with a vehicle via wireless connection established between the vehicle and the fueling station (e.g., via wireless V2X communication). System 1000 comprises a hydrogen fuel cell vehicle (HFVC) 1100 having at least one hydrogen fuel tank 1110 for storing hydrogen gas used to power vehicle 1100. Vehicle 1100 is also equipped with an engine control module (ECM) 1160 (e.g., the vehicle's computer system) configured to obtain and monitor tank parameters of the hydrogen fuel tank(s) 1110. ECM 1160 is communicatively coupled to on-board unit (OBU) 1150 to allow wireless connections to be established between other vehicles and infrastructure, such as fueling station 1200. OBU 1150 includes one or more transceivers configured to transmit and receive information wirelessly, for example, to communicate with roadside units, other OBUs, or any other devices configured for wireless communications (e.g., mobile devices such as smart phones, navigation systems, etc.). OBU 1150 is typically mounted in or on the car or may be, alternatively, a mobile unit that can be positioned to communicatively couple with ECM 1160.

Fueling station 1200 comprises one or more hydrogen dispensers (e.g., dispensers 1220a, 1220b, etc.) that dispense hydrogen fuel stored at and/or generated by fueling station 1200 via nozzles (e.g., nozzles 1225a, 1225b, etc.) configured to engage with the fuel tank of an HFVC. Fueling station 1200 further comprises road-side unit (RSU) 1250 (alternatively referred to as a wayside unit) configured to communicate with vehicles equipped with an OBU (e.g., vehicle 1110 equipped with OBU 1150). RSU 1250 also includes one or more transceivers configured to transmit and receive information wirelessly, for example, to communicate with OBUs, other RSU's or any other devices configured for wireless communications. RSU may be coupled to one or more controllers (e.g., one or more processors, chips or chip sets, programmable logic controllers, systems-on-chip (SOC), etc.) configured to perform any one or combination of vehicle communication techniques described herein. As used herein, an RSU coupled to one or more controllers refers to communicative coupling between any of the controllers that are part of the RSU (e.g., on-unit processors, co-processors, PLC's, etc.) and/or any controllers that are communicatively coupled to the RSU (e.g., via a wired or wireless communication link) at the fueling station. Furthermore, acts described herein as being performed by the RSU refer to acts performed by the RSU and/or any controller to which the RSU is coupled at the fueling station.

In the embodiment illustrated in FIG. 1, RSU 1250 is connected to a network at the fueling station (e.g., via a station PLC or network switch) to allow information exchange between RSU 1250 and the dispensers or other components of fueling station 1200. System 1000 allows V2X communication between vehicle 1100 and fueling station 1200 by establishing a wireless connection 1050 between OBU 1150 and RSU 1250 over which information may be exchanged (e.g., fueling information such as tank parameters, fuel availability, navigation information, payment information, etc.).

According to some embodiments, V2X communication may be accomplished using the 5.9 GHz band allocated for dedicated short-range communication (DSRC). However, V2X may implemented in other ways such as via 4G, 5G, 802.11x or using other suitable standards and/or protocols operating in the same or different radio frequency bands, as the aspects are not limited to any particular type of V2X communication. Wireless connection 1050 does not require LOS so that fueling station 1200, via RSU 1250, can broadcast and/or exchange data with any OBU with which a connection has been established that is within range of RSU 1250 (e.g., within a kilometer of the fueling station), or within a larger zone of communication using a vehicle hopping technique, examples of which are described in further detail below. It will be understood that fueling station is illustrated to show schematically a exemplary communication coupling of certain components of the fueling station, and that fueling station may include other components not illustrated, such as hydrogen cooling systems (e.g., any of the exemplary hydrogen cooling systems described herein).

Figure 2A:
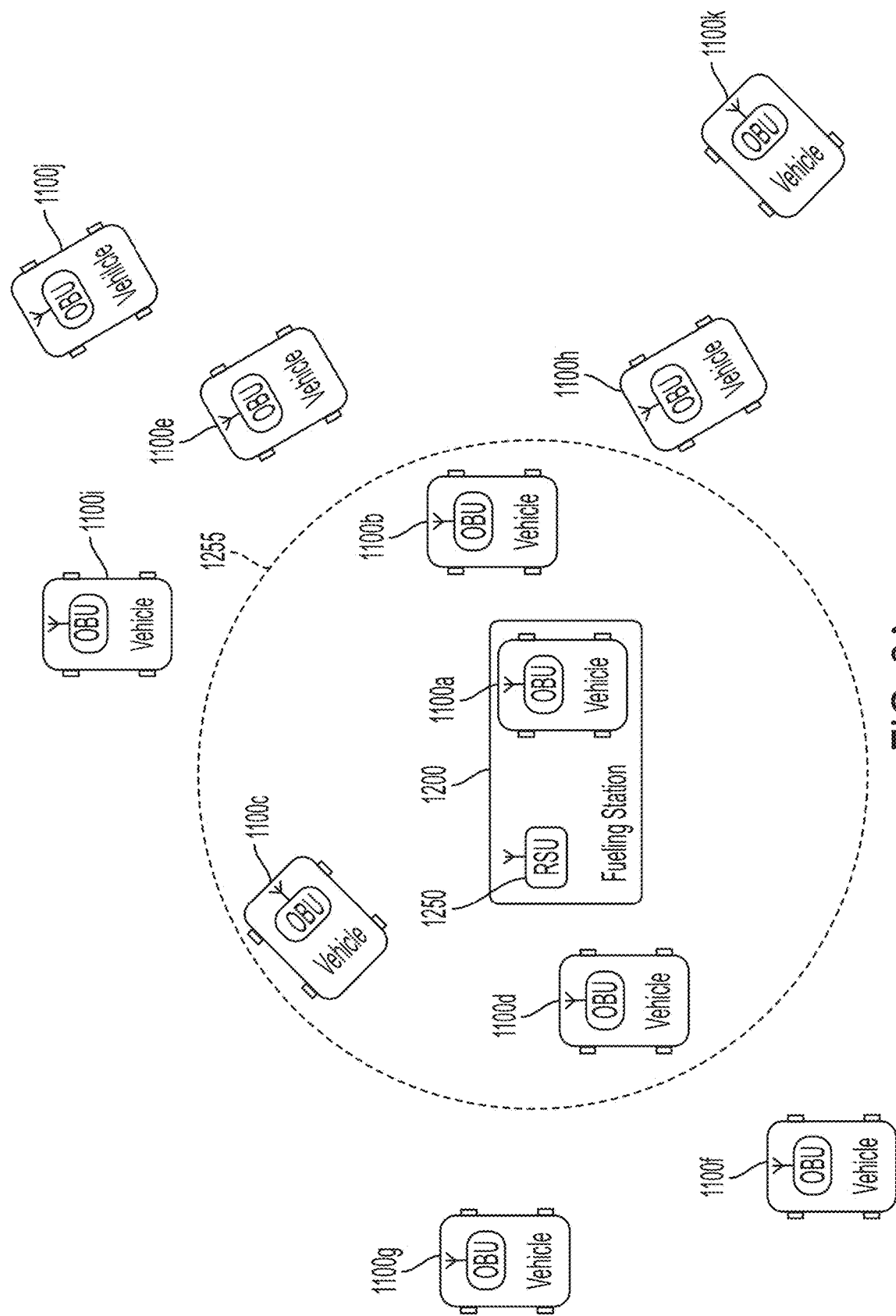
FIG. 2A illustrates a plurality of vehicles in-range and out-of-range of a fueling station, in accordance with some embodiments.

FIG. 2A illustrates an example environment in which RSU 1250 employed at fueling station 1200 can communicate with multiple vehicles (e.g., vehicles 1100a-1100d) within range of the RSU (denoted schematically as range 1255). The range of the RSU will depend in part on the frequency band used by the RSU to communicate with OBUs and regulatory limits on that frequency band (e.g., power requirements limiting transmission power, etc.), and may range from tens to hundreds of yards to a kilometer or more. For example, according to some embodiments, RSUs and OBUs operate in the 5.9 GHz band (5.850-5.925 GHz band) allocated for DSRC, which can provide ranges on the order of a kilometer or more. According to some embodiments, OBUs and RSUs operate in the 5.9 GHz band and are IEEE 1609, IEEE 802.11P and SAE J2735 compliant to facilitate safe and secure exchange of information, further details of which are discussed below.

In FIG. 2A, vehicles 1100a-d are within range of RSU 1250 and can communicate with fueling station 1200 via the vehicle's respective OBU. Vehicle 1100a, for example, may be at the fueling station and vehicles 1100b-d may be on the road or otherwise located within range of RSU 1250. Typically, RSUs and OBUs exchange security information (e.g., digitally signed certificates) to ensure that a given RSU and OBU are authorized to exchange information and to authenticate the units at both ends of an exchange. Once a connection is established, the OBU can securely transmit tank information to the RSU such as tank volume, receptacle type, fueling commands, measure pressured and temperature information and/or additional information about the vehicle (e.g., location). Fueling station 1200 may transmit information to vehicles via established connections between RSU 1250 and corresponding OBUs, such as status information regarding fuel availability, current wait times, fueling station location, etc. Additional information such as nozzle reservation information, navigation directions, etc., may be exchanged between the fueling station and the vehicles within range 1255, some examples of which are discussed in further detail below.

According to some embodiments, establishing wireless connections and information exchange occur in a wireless access in vehicular environment (WAVE) that enables safe and secure communications between RSUs and OBUs, as discussed in further detail in Appendix A of U.S. Provisional Application No. 63/131,953 ('953 Provisional) incorporated by reference herein. Alternatively, or in addition to, other wireless communication channels and protocols may be used to establish connections and exchange information between a fueling station and vehicles within a zone of communication of the fueling station, some further examples of which are described in Appendix A of the '953 Provisional.

The V2X environment illustrated in FIG. 2A may be used to establish a controller area network (CAN) that allows fueling station 1200, via RSU 1250, to communicate with multiple vehicles to obtain fueling parameters to inform a refueling event, collect data that facilitates predicting the demand on the fueling station based on the fueling needs of vehicles in the area, advise vehicles as to optimal timing and/or location for a refueling event, schedule a refueling event, etc. According to some embodiments, information exchanged via the CAN may be used to implement further functionality such as establishing automatic payment, providing navigation guidance to fueling stations, transmitting fueling station availability, performing nozzle reservation, etc. For example, by evaluating tank information received from multiple in-range vehicles, fueling station can predict near-term demand and take one or more actions at the fueling station in response, such as powering down certain components of the fueling station (e.g., one or more components of a hydrogen cooling system) to save on power consumption, optimizing filling of storage tanks to better handle expected fueling events, model usage trends over time, establish peak demand, low demand and/or average demand metrics, etc., examples of which are described in further detail below.

Figure 3:
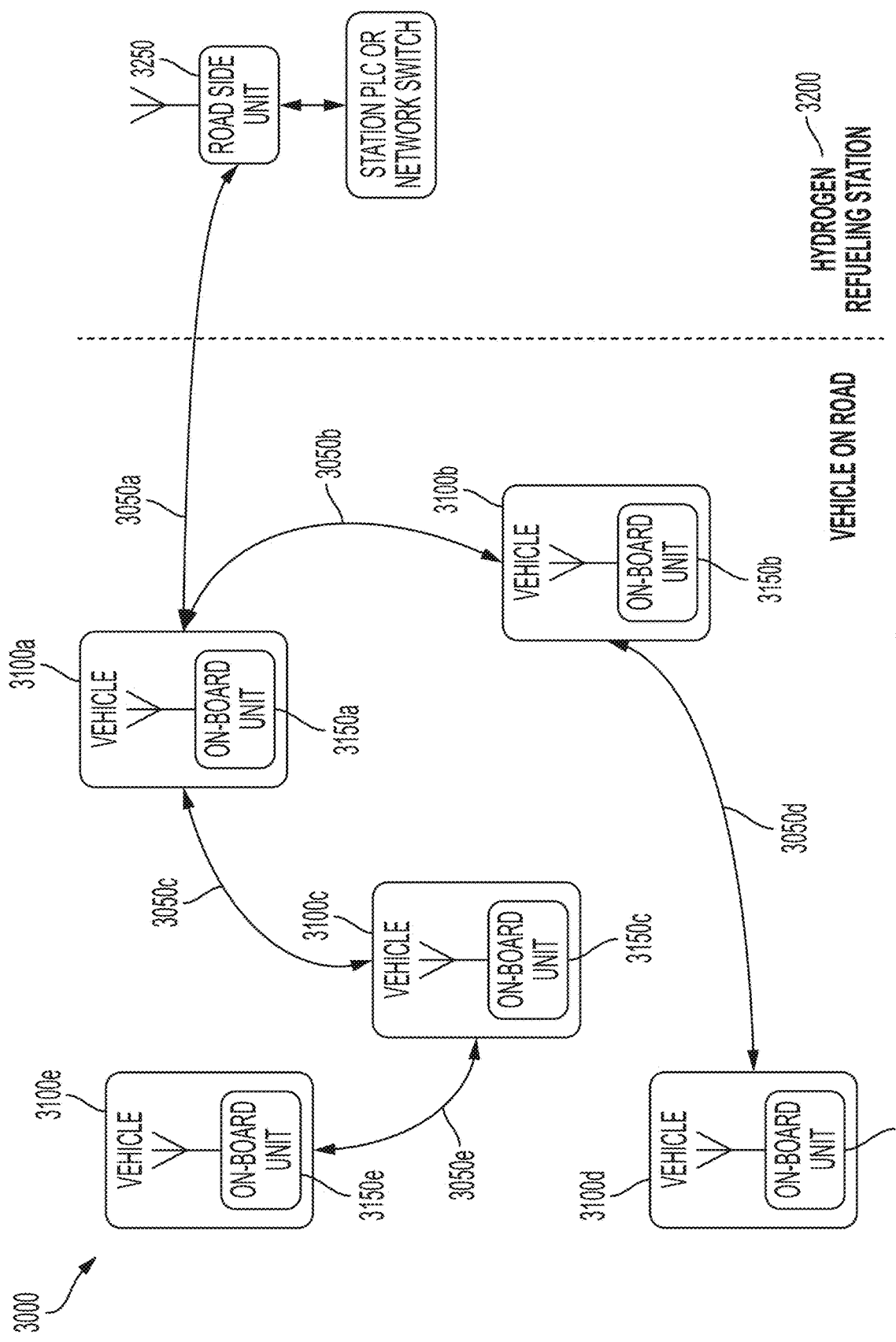
FIG. 3 illustrates a vehicle hopping technique, in accordance with some embodiments.

According to some embodiments, a fueling station can communicate with vehicles that are out-of-range using a technique referred to herein as vehicle hopping by which messages between a fueling station and a destination vehicle may be routed through one or more intermediary vehicles. For example, FIG. 3 schematically illustrates an exemplary CAN 3000 comprising RSU 3250 at a fueling station 3200 and a plurality of OBUs 3150*a-e* deployed in respective vehicles 3100*a-e*. In exemplary CAN 3000, vehicle 3100*a* is within range of RSU 3250 and has established a direct connection 3050*a* with OBU 3150*a*. Vehicles 3100*b* and 3100*c* are within range of vehicle 3100*a* and direct connections 3050*b* and 3050*c* have been established between OBU 3150*a* and OBUs 3150*b* and 3150*c*, respectively. Vehicle 3100*d* is within range of vehicle 3100*b* and a direct connection 3050*d* has been established between OBU 3150*b* and OBU 3150*d*. Similarly, vehicle 3100*e* is within range of vehicle 3100*c* and direction connection 3050*e* has been established between OBU 3150*c* and OBU 3150*e*.

The direct connections established in CAN 3000 can be utilized to establish an indirect connection between RSU 3250 and any of the OBUs in the network, even those that are not within range of RSU 3250. According to some embodiments, established direct connections are used as pass-throughs that enable RSU 3250 to establish an indirect connection and thereafter route messages to and receive messages from any of the OBUs in the network via secure indirect connections. According to some embodiments, the communication protocol allows for the same security features to be used to ensure that indirect connections are also safe and secure (e.g., authorized and authenticated). After an indirect connection is established, information can be exchanged via this indirect connection by routing messages from vehicle to vehicle until the messages reach the specified destination.

Figure 2B:
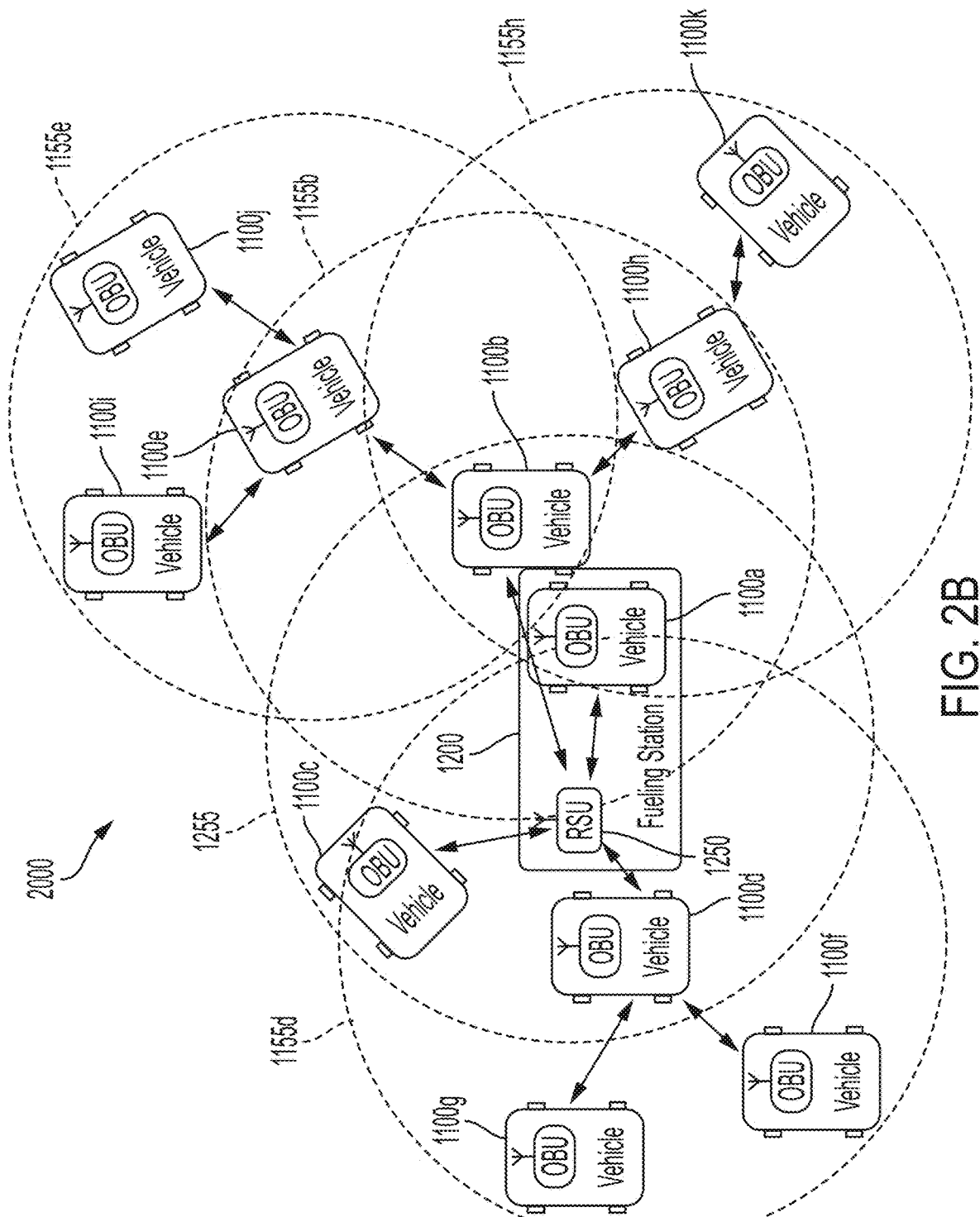
FIG. 2B illustrates a plurality of vehicles within a zone of communication of a fueling station, in accordance with some embodiments.

By using vehicle hopping techniques, a fueling station can expand its zone of communication to exchange information with vehicles over a wider geographic area. For example, FIG. 2B illustrates the environment illustrated in FIG. 2A in which vehicles 1100*a-d* are within range 1255 of RSU 1250 and wireless connections have been established between RSU 1250 and each in-range vehicle. However, in the example schematically illustrated in FIG. 2B, the fueling station's zone of communication has been expanded to allow RSU 1250 to exchange information with out-of-range vehicles 1100*e-k* using vehicle hopping techniques. For example, vehicles 1100*e* and 1100*h* are within range 1155*b* of vehicle 1100*b* and direct connections are established between the OBUs of the respective vehicles. RSU 1250 can therefore establish an indirect connection with vehicles 1100*e* and 1100*h* to transmit messages to and receive messages from vehicles 1100*e* and 1100*h* by routing messages through vehicle 1100*b*. Similarly, vehicles 1100*i* and 1100*j* are within range 1155*e* of vehicle 1100*e* and direct connections are established between the OBUs of the respective vehicles and RSU 1250 can establish an indirect connection with vehicles 1100*i* and 1100*j* by vehicle hopping via vehicles 1100*b* and 1100*e*. Indirect connections can likewise be established between RSU 1250 and vehicle 1100*k* by vehicle hopping from vehicle 1100*b* to 1100*h*, and between RSU 1250 vehicle 1100*g* and 1100*f* by vehicle hopping via vehicle 1100*d*. Thus, RSU 1250 can communicate with vehicles over a larger geographic area to expand the reach of fueling station 1200 (e.g., to form a larger CAN 2000), which can in turn improve the fueling station's ability to predict demand, can allow for a richer set of data to be obtained and/or may facilitate providing services to a larger set of vehicles.

Figure 4A:
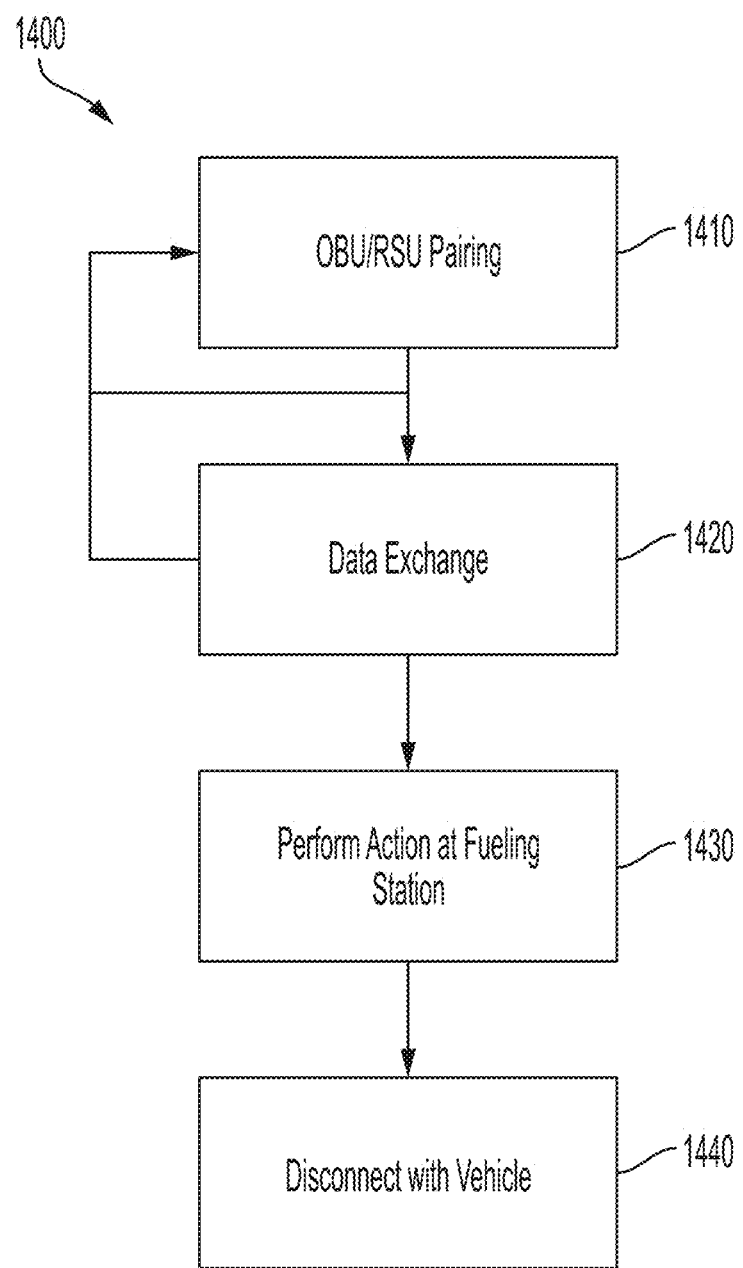
FIG. 4A illustrates an exemplary communication sequence between a fueling station and one or more vehicles, in accordance with some embodiments.

FIG. 4A illustrates an exemplary V2X communication sequence, in accordance with some embodiments. Act 1410 comprises establishing a wireless connection between an RSU located at a fueling station and an OBU of a vehicle. The connection process, also referred to herein as OBU/RSU pairing, may be initiated either by an OBU transmission received by the RSU or a via an RSU broadcast to OBUs within range. As discussed above, in consideration of privacy considerations, some embodiments employ a communication architecture that allows for a secure connection to be established (and subsequent messages to be exchanged) while preserving vehicle anonymity. For example, the above-mentioned WAVE architecture enables OBUs to establish authorized and authenticated connections with RSUs without requiring vehicle specific identification information to be relayed to the fueling station. In this way, V2X communications can be implemented while maintaining the privacy of the vehicle and its operator. According to some embodiments, upon the express or implied consent of the vehicle operator, information identifying the vehicle or the vehicle operator may be exchanged to allow certain services to be provided, such as automatic payment, nozzle reservation, etc., as discussed in further detail below.

Referring again to act 1410, to establish a wireless connection, an OBU and an RSU may exchange security information (e.g., signed digital certificates) confirming that the OBU and RSU are both authorized to establish a connection and to authenticate the OBU and RSU devices. The specifics of the security information exchange will depend on the protocol supporting the V2X communication. According to some embodiments, the V2X communication is a DSRC connection that complies with, for example, IEEE 1609, IEEE 802.11P, SAE J2735 and/or any of the protocols discussed in the '953 Provisional, and the security information exchange is implemented via WAVE. Once a connection has been established, data can be securely exchanged between the OBU and the RSU. As discussed above, some embodiments implement OBU/RSU pairing without requiring vehicle or vehicle operator identification, thereby allowing a secure connection to be established and subsequent data exchange to be conducted while maintaining vehicle anonymity.

Act 1420 comprises exchanging data between the OBU and RSU over the established connection. In many conventional systems, information exchange between a vehicle and a fueling station was limited to data that could be transmitted over a IrDA link, which was limited not only in bandwidth but was also typically limited to unidirectional transmission of data from the vehicle to the dispenser nozzle. Establishing a V2X connection allows a richer set of information to be exchanged between a vehicle and a fueling station. For example, conventional IrDA links were sufficient for transmitting a minimum set of tank parameters needed by the fueling station to refuel the vehicle. According to some embodiments, a V2X connection has orders of magnitude higher bandwidth, allowing for significantly more information to be exchanged bi-directionally between a fueling station and a vehicle. According to some embodiments, the RSU at a fueling station (e.g., RSU 1250) may obtain tank information from the vehicle via the OBU over the established connection in real-time or near real-time.

As discussed above, some embodiments of a V2X communication system allow for a many-to-many connections to be established (e.g., an RSU may establish a direct connection with a plurality of OBU within range of the RSU and/or may establish an indirect connection with one or more out-of-range OBUs via vehicle hopping, as discussed above in connection with the exemplary embodiments illustrated in FIGS. 2A, 2B and 3). Accordingly, acts 1410 and 1420 may be repeated to establish secure connections (direct or indirect) between a fueling station and multiple vehicles within a zone of communication of the RSU at the fueling station. As a result, information can be exchanged between a fueling station, via its RSU, and multiple vehicles that can be used to improve service at the fueling station.

Act 1430 comprises performing one or more actions at the fueling station based at least in part on information exchanged between the RSU and one or more OBUs associated with vehicles within the zone of communication of the fueling station. According to some embodiments, a fueling station may obtain tank information from multiple vehicles in the vicinity and evaluate the information to perform one or more predictive actions at the fueling station based on an expected demand at the fueling station. For example, information exchanged in act 1420 may indicate that several vehicles in the vicinity are low on fuel and will likely need to refuel at the station in the near-term. In response, the fueling station may evaluate the status of the fueling systems (e.g., assess the current capacity of the fueling station to deliver hydrogen fuel at certain temperature levels). On the other hand, information exchanged in act 1420 may suggest that there are no HFCVs in the area or that those that are within range of the fueling station are not currently in need of refueling. Based on the predicted demand, fueling station 1200 can ready itself to best meet the predicted demand (e.g., power up or power down certain components of the fueling station such as components of the hydrogen fueling station), alert vehicles in the vicinity as to status, wait times, etc., prepare for future fueling demands at the fueling station and/or identify trends or patterns in fueling demands to optimize the ability of the fueling station to meet fueling demands throughout the day.

The inventors have developed a number of predictive techniques and responsive operations to facilitate optimal fueling station performance (i.e., to maximize availability and/or minimize refueling times) to handle changing fueling demands throughout the day, examples of which are discussed in further detail below. Any one or combination of optimizations may be performed, including but not limited to, minimizing energy consumption, maximizing fuel availability, reducing refueling times, conducting dispenser scheduling (e.g., nozzle reservations), ascertaining demand trends, planning for peak demand hours, providing navigation information to vehicles, redirecting vehicles to other fueling stations, etc., examples of which are discussed in further detail below.

The one or more actions performed at the fueling station may include a fueling event in which the fueling station delivers fuel to the tank of one of the vehicles. For example, the data exchanged in act 1420 may include feedback from a vehicle to which a dispenser nozzle has been engaged from which the fueling station performs vehicle-to-nozzle pairing, examples of which are described in connection with FIGS. 5-10 below. The data exchanged in act 1420 may also include tank information from the vehicle that the fueling station uses to refuel the vehicle after the vehicle has been paired with the nozzle engaged with the vehicle's fuel tank. Act 1440 comprises disconnecting the RSU and the OBU, which may be performed with or without a fueling event with the vehicle. For example, the RSU and an OBU may disconnect after the corresponding vehicle has refueled, or the RSU and an OBU may disconnect when the vehicle drives out-of-range or out of the zone of communication of the RSU without the vehicle having come to and/or refueled at the fueling station. In the latter case, for example, tank information may be obtained from a vehicle in act 1420 indicating that the vehicle has a full tank and the fueling station may use this information to perform one or more predictive actions and may subsequently disconnect with the OBU when the vehicle drives out of range.

Figure 5:
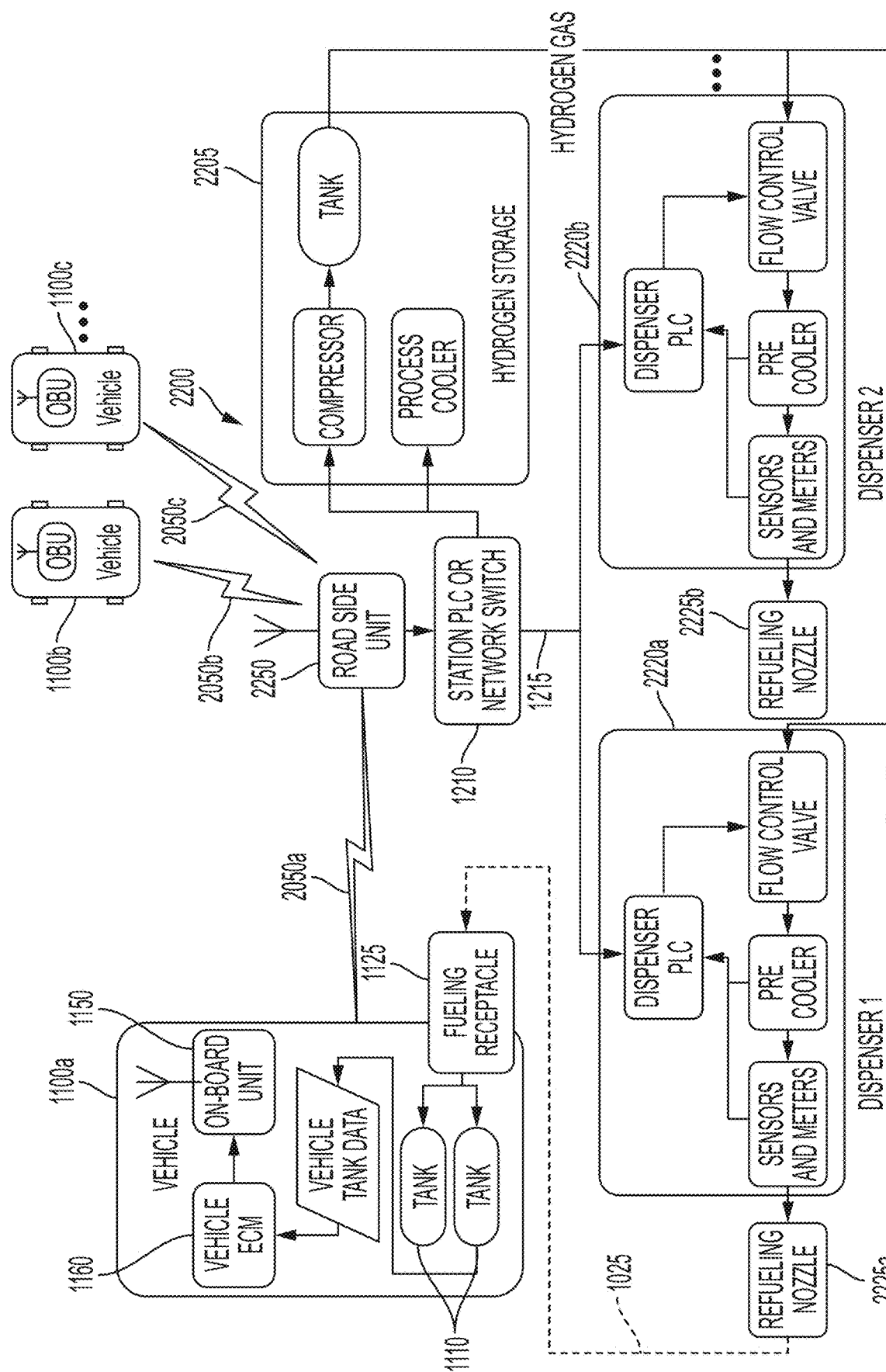
FIG. 5 illustrates a block diagram of an exemplary hydrogen gas dispensing system including a fueling station and a plurality of vehicles communicatively coupled to the fueling station, in accordance with some embodiments.

FIG. 5 illustrates a system 5000 comprising a fueling station 2200 configured to refuel HFCVs and communicate with vehicles within a zone of communication of the fueling station. At an exemplary point in time, a first vehicle 1100a may be located at fueling station 2200 prior to a fueling event and a plurality of vehicles including vehicles 1100b and 1100c may be located within a zone of communication of fueling station 2200. Fueling station 2200 includes RSU 2250, which may be similar to or the same as RSU 1250 described in connection with FIG. 1 (e.g., an RSU configured to communicate with OBUs associated with vehicles within a zone of communication of the RSU). In the example illustrated in FIG. 5, wireless connections 2050a, 2050b and 2050c are established between RSU 2250 and OBUs of respective vehicles 1100a, 1100b and 1100c.

Fueling station 2200 comprises a first dispenser 2220a and a second dispenser 2220b configured to dispense hydrogen gas via a first nozzle 2225a and second nozzle 2225b, respectively. While exemplary dispensers 2220a and 2220b are shown having a single nozzle, one or both of dispensers 2220a and 2220b may include multiple nozzles via which hydrogen gas may be dispensed. Furthermore, while exemplary fueling station 2200 is illustrated as including two dispensers, some embodiments include fewer or additional dispensers. For example, a fueling station may include one single-nozzle or multi-nozzle dispenser or may include multiple single-nozzle or multi-nozzle dispensers, as the aspects are not limited to any particular configuration of dispensers and nozzles.

In the embodiment illustrated in FIG. 5, dispensers 2220a-b are communicatively coupled to RSU 2250 via station network component 2210 (which may be the same as or similar to network component 1210 described in connection with FIG. 1). In the embodiment illustrated in FIG. 5, dispensers 2220a-b are fluidly coupled to hydrogen storage component 2205 that stores hydrogen gas to be dispensed by the dispensers through their respective nozzles. According to some embodiments, the dispensers may also include hydrogen storage within the dispenser or may be a standalone appliance that produces, stores and dispenses hydrogen gas in a self-contained dispenser appliance, some examples of which are described in U.S. Pat. No. 10,236,522 titled "Hydrogen Gas Dispensing Systems and Methods," which is herein incorporated by reference in its entirety.

Wireless connections (e.g., wireless connections 2050a, 2050b and 2050c) may be established between RSU 2250 and the respective OBU of any vehicle within the zone of communication of the fueling station. For example, wireless connections 2050a and 2050b may be direct connections to vehicles 1100a and 1100b and wireless connection 2050c may be an indirect connection to vehicle 1100c via vehicle 1100b using vehicle hopping techniques. Once a wireless connection has been established, information can be exchanged between vehicles and the various components of the fueling station including, but not limited to, any one or combination of fueling information (e.g., tank parameters), fueling station status (e.g., hydrogen gas availability, predicted fill times, etc.), navigation information, payment information, etc. In exemplary system 5000, vehicle 1100a is located at fueling station 2200 for refueling. When nozzle 2225a is engaged with vehicle 1100 via fuel receptacle 1125, dispenser 2200a provides first nozzle information 1025 corresponding to nozzle 2225a to the first vehicle. Responsive to first nozzle information 1025, feedback from vehicle 1100a is provided via wireless connection 2050a that the fueling station can use to pair nozzle 2225a with vehicle 1100a to initiate a fueling event.

Because RSU 2250 may have established wireless connections with multiple vehicles (e.g., vehicle 1100b, 1100c, etc.), the fueling station needs to resolve which vehicle has engaged with which nozzle (e.g., the fueling station needs to identity which of the vehicle that it is communicating with has engaged with the nozzle so that it can ascertain which tank parameters belong the vehicle engaged for refueling). By providing nozzle information and receiving feedback responsive to the nozzle information, vehicle-to-nozzle pairing can be performed without requiring the vehicle to provide identification information specific to the vehicle or the vehicle's operator. An exemplary method that allows vehicle-to-nozzle pairing to be performed anonymously is described below in connection with FIG. 6. It should be appreciated that a vehicle may voluntarily provide identification information for the vehicle or vehicle operator (e.g., to perform automatic payment), but aspects of the inventors' contribution allow for vehicle-to-nozzle pairing and the subsequent fueling event to be performed anonymously without requiring such information.

Figure 6:
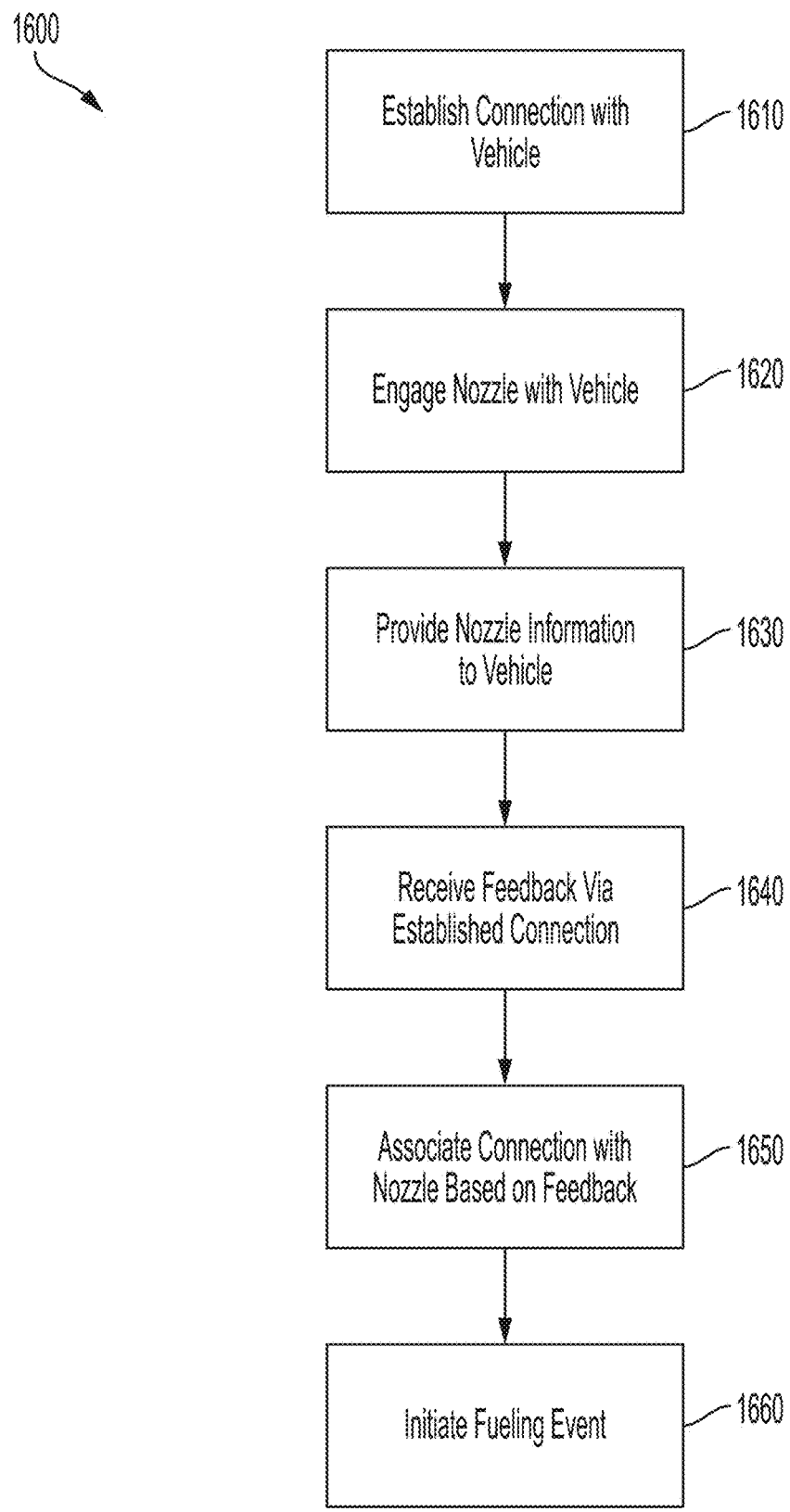
FIG. 6 illustrates a method of performing vehicle-to-nozzle pairing, in accordance with some embodiments.

FIG. 6 illustrates an exemplary method of performing vehicle-to-nozzle pairing, in accordance with some embodiments. Method 1600 may be performed, for example, in the context of the system illustrated in FIG. 5. Act 1610 comprises establishing a wireless connection between a fueling station and a vehicle. For example, act 1610 may be performed by establishing a first connection between an RSU positioned at the fueling station and a first OBU associated with a first vehicle, such as a V2X connection discussed above in connection with FIG. 4A. Act 1610 may be performed to establish a wireless connection between the fueling station and any vehicle within the zone of communication of the fueling station (e.g., fueling station may establish one or more direct connections and/or one or more indirect connections via vehicle hopping). Accordingly, act 1610 may be repeated to establish connections with any number of vehicles with a zone of communication of the fueling station.

Act 1620 comprises engaging a dispenser nozzle with a vehicle to begin a refueling process. For example, a vehicle operator or fueling station personnel may attach a dispenser nozzle to a fuel receptacle of the vehicle. Because a wireless connection may be established with multiple vehicles in a zone of communication of the fueling station, the fueling station may not be able to ascertain which vehicle has engaged with the dispenser nozzle. For example, a fueling station may obtain tank information (e.g., tank size, measured tank pressure and temperature, etc.) from multiple vehicles via respective wireless connections but be unable to determine which information corresponds to the vehicle that has engaged with the dispenser nozzle for refueling. Accordingly, the fueling station may need to resolve the correct pairing between dispenser nozzle and vehicle to safely and correctly refuel the vehicle. At conventional fueling stations, a dispenser nozzle could only receive tank information from the vehicle to which the nozzle was engaged due to the LOS limitations of the IrDA link over which this information is transmitted so that vehicle-to-nozzle pairing was accomplished simply by engaging the dispenser nozzle with the vehicle and establishing the IrDA link.

Act 1630 comprises providing nozzle information corresponding to the dispenser nozzle to the vehicle engaged with the dispenser nozzle. Nozzle information may comprise information of any type (or of multiple different types) and may be provided in any suitable manner, such as transmitting nozzle information electronically to the vehicle (e.g., via a low power radio frequency transmitter, such as an RFID tag), delivering nozzle information as a fluid flow signature (e.g., a hydrogen gas flow pattern), or a combination of both, as discussed in further detail below in connection with FIGS. 7-9. According to some embodiments, at least some of the nozzle information provided in act 1630 is changed or varied each time the nozzle is engaged with a vehicle. In exemplary act 1630, nozzle information is provided via the dispenser nozzle so that only the vehicle engaged with the respective dispenser nozzle receives the nozzle information so that the corresponding vehicle-to-nozzle pairing can be correctly resolved.

Act 1640 comprises receiving feedback from the vehicle responsive to the nozzle identification information via the wireless connection. The feedback from the vehicle will depend on the manner in which nozzle information was provided to the vehicle. For example, the nozzle information may include a nozzle ID (e.g., a nozzle ID number) provided to the vehicle (e.g., electronically) that the vehicle parrots back to the fueling station via the wireless connection established between the fueling station RSU and the vehicle OBU. As another example, the nozzle information may include a fluid flow signature delivered to the fuel tank that causes changes in tank parameters (e.g., tank pressure) transmitted by the vehicle to the fueling station via the RSU/OBU wireless connection. As yet another example, nozzle information may include both a nozzle ID and a fluid flow signature so that feedback received from the vehicle via the wireless connection comprises both the nozzle ID and changes in transmitted tank parameters resulting from delivering the flow signature to the vehicle's fuel tank.

Act 1650 comprises associating the wireless connection between the fueling station and the vehicle (e.g., a V2X connection between the fueling station RSU and the vehicle OBU) with the corresponding dispenser nozzle based on the received feedback to pair the dispenser nozzle with the vehicle. Thereafter, the fueling station knows that fueling information (e.g., tank parameters) received over the wireless connection corresponds to the vehicle engaged with the paired nozzle and can be used to initiate a fueling event with that vehicle via the paired nozzle (act 1660). For example, fueling information received via the wireless connection over which the feedback was received may be routed via the fueling station's communication network to the dispenser having the paired nozzle so that the dispenser can control the fueling of the vehicle's tank, aspects of which are described in further detail below.

By providing nozzle information to the vehicle and receiving feedback from the vehicle responsive to the nozzle information, the fueling station can accomplish vehicle-to-nozzle pairing without requiring the vehicle to provide vehicle identification or vehicle operator identification information to the fueling station. However, in some circumstances, the vehicle may provide (or may have provided) identification information voluntarily in order to perform actions such as automatic payment, nozzle reservation, etc. Thus, vehicle-to-nozzle pairing method 1600 allows for, but does not require, vehicle anonymity. If vehicle identification information is provided to the fueling station, this information may be used during vehicle-to-nozzle pairing (e.g., to confirm that a vehicle that has made a nozzle reservation is the same vehicle engaged with the nozzle) and/or may be used during the fueling event (e.g., to perform automatic payment), as discussed in further detail below.

According to some embodiments, a vehicle may engage with a dispenser nozzle prior to establishing a wireless connection with the fueling. In such circumstances, the act of engaging the dispenser nozzle with the vehicle and/or the act of providing nozzle information to the vehicle may trigger the fueling station or the vehicle to initiate establishing a wireless connection between, for example, a fueling station RSU and the vehicle's OBU. As such, act 1610 need not be performed first, but instead may be performed after the vehicle engages, or in response to the vehicle engaging with a dispenser nozzle at the fueling station and/or after or in response to nozzle information being provided by the dispenser via the nozzle to the vehicle, as the aspects are not limited in this respect.

Figure 7:
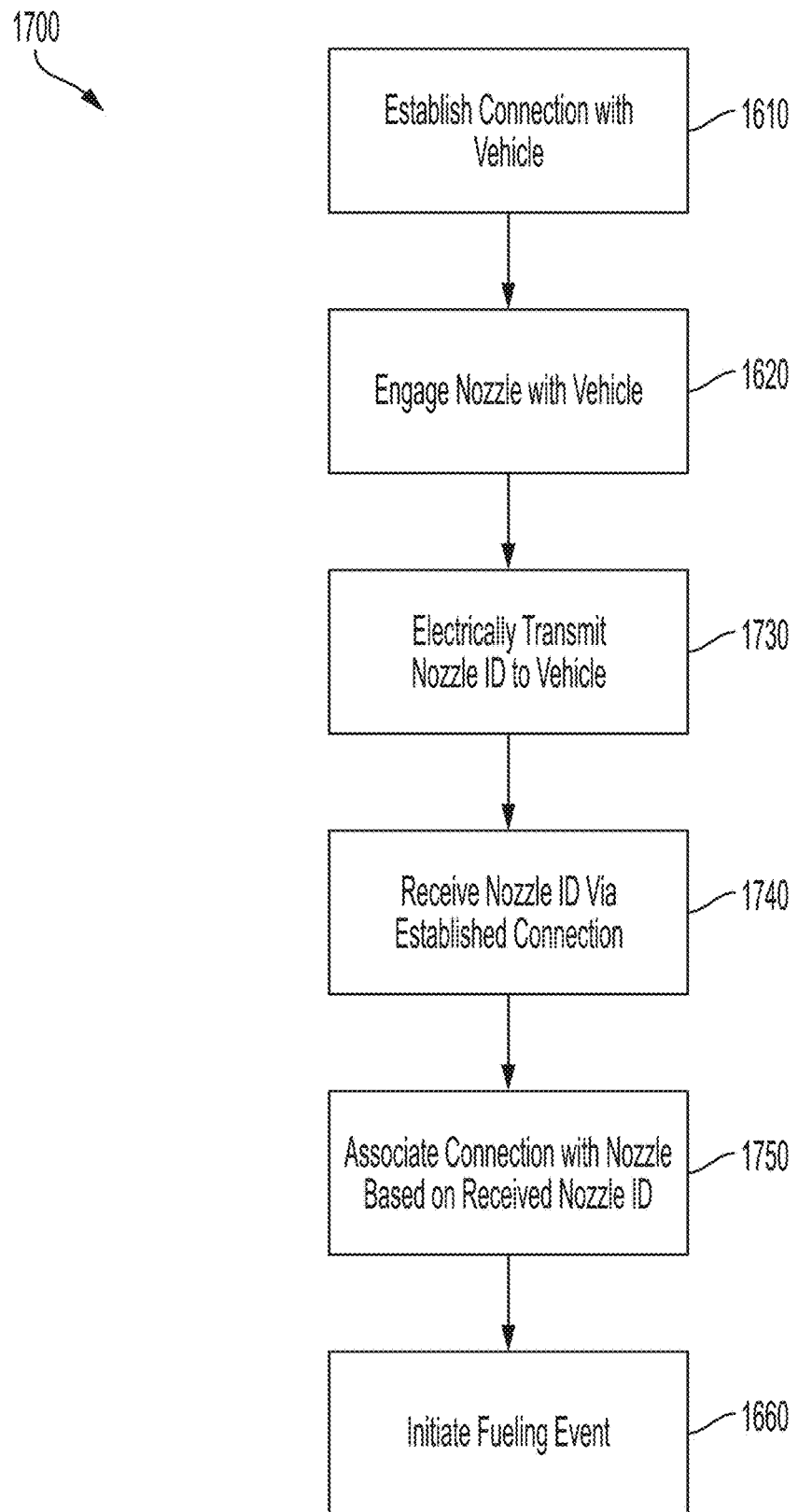
FIG. 7 illustrates a method of performing vehicle-to-nozzle pairing comprising electrically transmitting a nozzle identification to a vehicle, in accordance with some embodiments.

FIG. 7 illustrates an exemplary vehicle-to-nozzle pairing method in which providing nozzle information to a vehicle includes electrically providing a nozzle ID to the vehicle that corresponds to the nozzle engaged with the vehicle. In exemplary method 1700, acts 1610 and 1620 may be the same as or similar to acts 1610 and 1620 described in connection with FIG. 6. Act 1730 comprises providing nozzle information to the vehicle at least in part by electrically transmitting a nozzle ID to the vehicle corresponding to the nozzle engaged with the vehicle (e.g., by performing act 1620). Electrically transmitting a nozzle ID may be performed using any type of electrical-based communication (e.g., electrical, electro-optical, electromagnetic, etc.) including, but not limited to, direct electrical communication, radio frequency communication, optical communication and/or any suitable wired or wireless communication technique suitable for transmitting a nozzle ID. It should be appreciated that act 1730 may also include providing additional nozzle information, either electrically or otherwise, to vehicle, as the aspects are not limited to transmitting any particular nozzle information to the vehicle.

The nozzle ID may be any type of identifier that can be used to differentiate the nozzle from the other nozzles at the fueling station at a given moment in time. According to some embodiments, a nozzle ID corresponding to a given nozzle is changed each time a nozzle is engaged with a vehicle. For example, the nozzle ID can be changed for each nozzle by configuring the respective dispenser(s) (e.g., a dispenser controller or other computing unit) to generate a random or pseudo-random number and assign the generated number to a nozzle that has been engaged with a vehicle, select from a set of predetermined nozzle IDs, or perform any other suitable technique of assigning a nozzle ID to each nozzle so that no two nozzles are assigned the same nozzle ID at the same time and so that the nozzle ID of a nozzle changes periodically, after each fueling event and/or in response to some other event, as the aspects are not limited in this respect. According to some embodiments, nozzle IDs assigned to different nozzles are changed periodically (e.g., hourly, daily, etc.) as an alternative, or in addition to, changing the nozzle each time a nozzle is engaged with a vehicle.

Act 1740 comprises receiving feedback from the vehicle responsive to providing nozzle information, including receiving the nozzle ID that was provided to the vehicle in act 1730 as feedback via a wireless connection established between the vehicle and fueling station (e.g., a V2X connection established in act 1610 between the fueling station RSU and the vehicle's OBU), For example, the vehicle may parrot the nozzle ID received from the nozzle (e.g., via a nozzle transmitter such as an RFID tag, Bluetooth® transmitter, IrDA transmitter, etc.) back to the fueling station via the wireless connection between the fueling station and the vehicle. As discussed above, a wireless connection between the fueling station may be established before or after the nozzle is engaged with the vehicle and/or before or after the nozzle ID is electrically transmitted to the vehicle, and may be triggered by performing either of these acts in circumstances where a wireless connection is not already established.

Act 1750 comprises associating the wireless connection established between the fueling station and the vehicle with the dispenser nozzle engaged with the vehicle based at least in part on receiving the nozzle ID via the wireless connection. According to some embodiments, when a nozzle ID is received via the wireless connection, the fueling station may associate the wireless connection with the dispenser nozzle identified by or corresponding to the received nozzle ID so that information received from the vehicle via the wireless connection (e.g., fueling information such as tank parameters, fueling protocols, etc.) may be routed to the dispenser comprising the corresponding nozzle to control a subsequent fueling event (e.g., a fueling event initiated in act 1660 as discussed above in connection with FIG. 6).

According to some embodiments, the fueling station distributes information received over each established wireless connection between the fueling station and vehicles within the zone of communication to each of the dispensers. When a nozzle ID is received via one of the wireless connections, the fueling station may indicate to the dispenser comprising the corresponding nozzle which wireless connection the nozzle ID was received over so that the dispenser knows to use information received via that wireless connection to control a subsequent fueling event via the identified nozzle. Accordingly, associating a wireless connection with a nozzle engaged with a vehicle may include routing fueling information received via the wireless connection to the corresponding dispenser, or indicating to the corresponding dispenser which fueling information presently being distributed to the dispenser should be used to control a fueling event at the corresponding nozzle.

Figure 8:
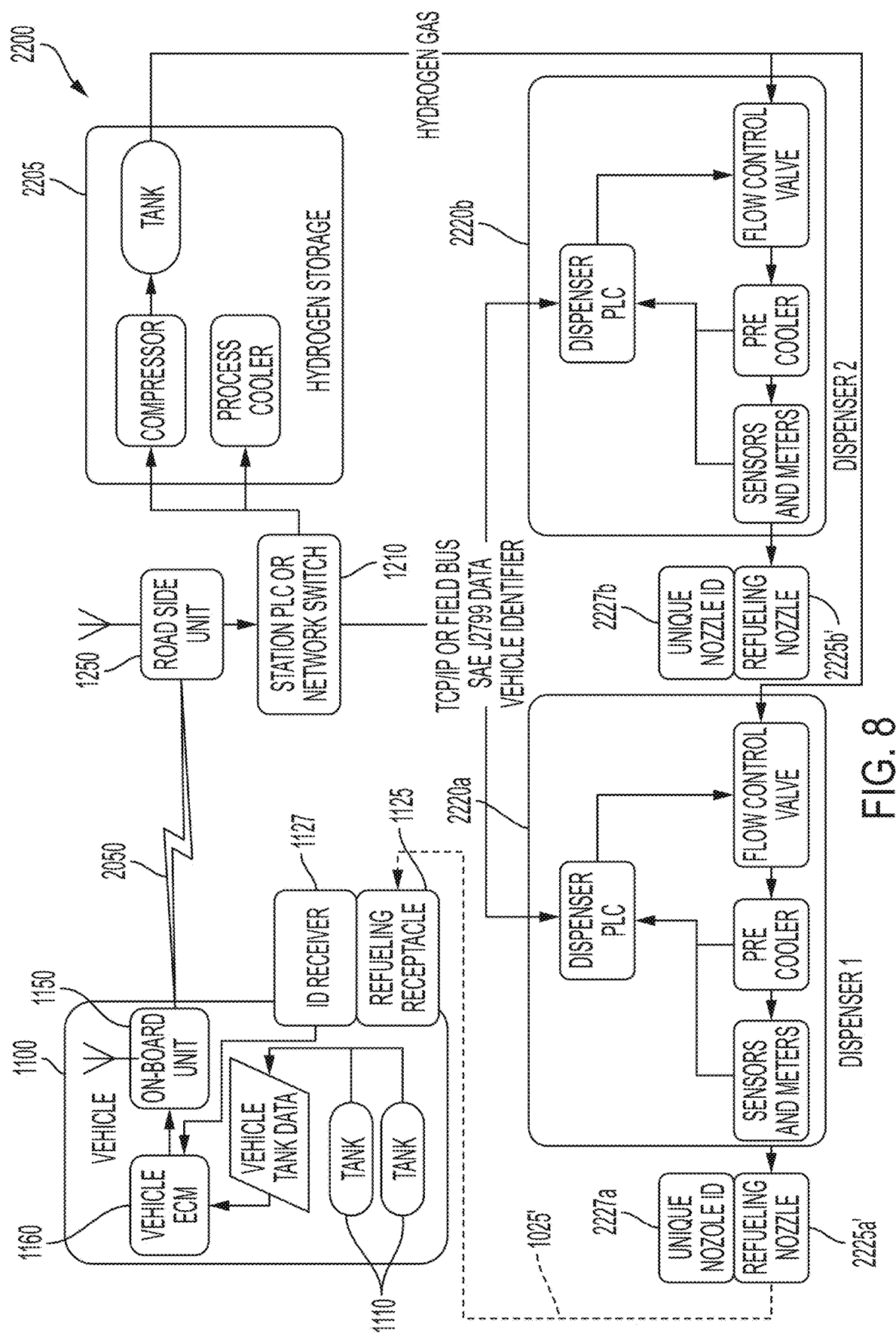
FIG. 8 illustrates a block diagram of an exemplary gas dispensing system using the vehicle-to-nozzle pairing method illustrated in FIG. 7, in accordance with some embodiments.

FIG. 8 illustrates an exemplary system configured to electronically transmit a nozzle ID to a vehicle to facilitate vehicle-to-nozzle pairing, in accordance with some embodiments. The system illustrated in FIG. 8 may be similar in many respects to the system illustrated in FIG. 5. In this exemplary system, dispensers are configured to electronically transmit a nozzle ID to a vehicle engaged with the nozzle. For example, to electronically transmit a nozzle ID corresponding to the respective nozzle to a vehicle, nozzle 2225*a*' may comprise a nozzle ID transmitter 2227*a* and nozzle 2225*b*' may comprise a nozzle ID transmitter 2227*b* configured to connect, either wirelessly or via a physical "wired" connection, to a receiver located at the vehicle (e.g., ID receiver 1127 located proximate the fueling receptable 1125 of vehicle 1100*a*).

According to some embodiments, nozzle ID transmitters 2227*a* and 2227*b* include a wireless transmitter for wirelessly transmitting a nozzle ID to a wireless receiver of a vehicle engaged with the nozzle. In embodiments configured to communicate wirelessly, wireless nozzle ID transmitters and receivers may communicate using any suitable communication technology including, but not limited to, radio frequency communication, optical communication, etc., provided the communication range is limited to prevent unintentional communication links from being established between a dispenser nozzle and a vehicle to which the nozzle has not been engaged. For example, wireless nozzle ID transmitters may comprise a low power RFID transmitter (e.g., an RFID tag) positioned on the nozzle so that a corresponding wireless receiver on the vehicle can receive information from the transmitter only when the nozzle is engaged with the fueling receptacle of the vehicle (or when the vehicle's ID receiver is in such close proximity to ensure that only that vehicle can receive nozzle information from the nozzle). As another example, wireless nozzle ID transmitters may comprise an IrDA transmitter that similarly prevents a communication link from being established unless and until the corresponding nozzle has been engaged with the vehicle. Thus, in the exemplary system illustrated in FIG. 7, vehicle 1100 that has engaged with nozzle 2225*a*' via fueling receptacle 1125 is the only vehicle capable of receiving information 1025', which includes the nozzle ID corresponding to nozzle 2225*a*'.

According to some embodiments, nozzle ID transmitters 2227*a* and 2227*b* include a physical connection for transmitting a nozzle ID to a receiver of a vehicle engaged with the nozzle via a "wired connection" using any suitable electrical connection between the nozzle ID transmitter and the receiver at the vehicle. For example, the dispenser nozzle may be configured so that when the nozzle is correctly engaged with the fueling receptacle so that the nozzle can dispense fuel to the vehicle's fuel tank, the nozzle ID transmitter also makes a physical connection with the receiver at the vehicle to create a wired link over which information 1025' (including the nozzle ID) may be transmitted.

According to some embodiments, each time a nozzle is engaged with a vehicle the nozzle is assigned a different nozzle ID. For example, dispensers 2225*a*' and 2225*b*' may change the nozzle ID corresponding to a nozzle each time the nozzle is engaged with a different vehicle. The nozzle ID can be changed for each nozzle by configuring dispensers (e.g., a dispenser controller or other computing unit) to generate a random or pseudo-random number and assign the generated number to a nozzle that has been engaged with a vehicle, select from a set of predetermined nozzle IDs, or any other suitable manner of assigning a nozzle ID to each nozzle so that no two nozzles are assigned the same ID at the same time. According to some embodiments, nozzle IDs assigned to different nozzles are changed periodically (e.g., hourly, daily, etc.) as an alternative, or in addition to, changing the nozzle each time a nozzle is engaged with a vehicle.

In response to receiving a nozzle ID, the vehicle may transmit the nozzle ID back to the fueling station via a wireless connection established between the fueling station and the vehicle. For example, in the system illustrated in FIG. 8, a nozzle ID corresponding to nozzle 2225*a*' is provided to the vehicle via link 1025' established between transmitter 2227*a* and receiver 1127 after the nozzle was engaged with fueling receptacle 1125 of the vehicle. In response to receiving the nozzle ID, vehicle 1100 provides feedback to fueling station 2200 at least in part by causing OBU 1150 to transmit the received nozzle ID to fueling station RSU 2250 via wireless connection 2050. It should be appreciated that other information may be provided over communication link 2050, including dispenser information, dispenser and/or nozzle status, fuel station information and/or status, etc., as the aspects are not limited to transmitting a nozzle ID. Based on the received feedback, RSU 1250 can ascertain that communication link 2050 is the communication link with vehicle 1100 engaged with nozzle 2225*a*'.

Figure 9:
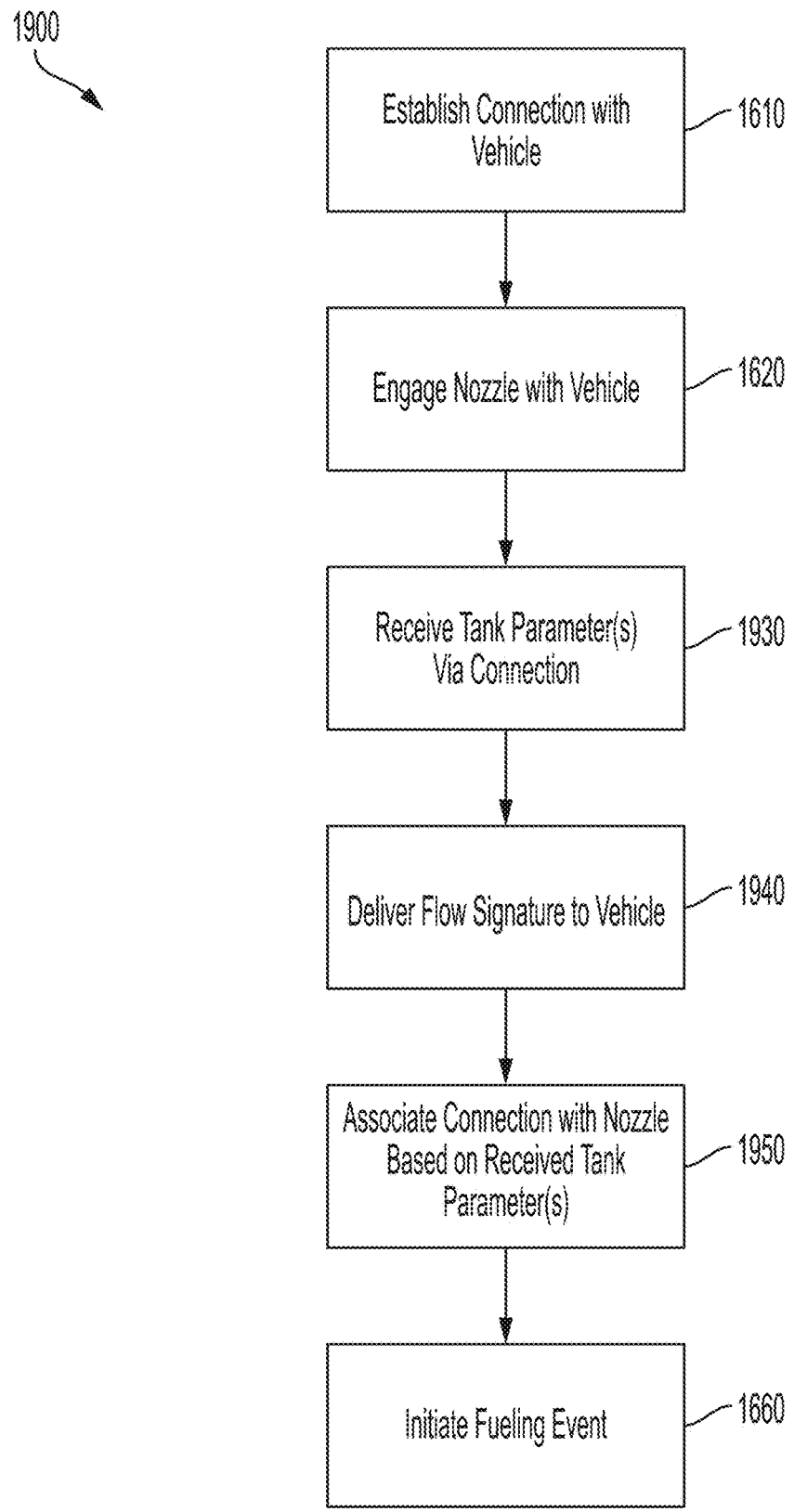
FIG. 9 illustrates a method of performing vehicle-to-nozzle pairing comprising delivering a flow signature to a vehicle, in accordance with some embodiments, in accordance with some embodiments.

FIG. 9 illustrates an exemplary vehicle-to-nozzle pairing method in which providing nozzle information to a vehicle includes delivering a fluid flow signature to the vehicle via the dispenser nozzle. Exemplary method 1900 includes establishing a connection between the fueling station (act 1610) and engaging a dispenser nozzle with the vehicle (act 1620) that may be performed in the manner described above in connection with FIGS. 6 and 7. As discussed above, establishing a connection between the fueling station may be performed before or after engaging a dispenser nozzle with the vehicle. Act 1930 comprises receiving fueling information, including tank parameters of the vehicle (e.g., tank size, measured tank pressure, measured tank temperature, etc.), via the established connection. Act 1930 may be performed any time after the connection is established with the fueling station, either before the nozzle is engaged with the vehicle, after the nozzle is engaged with the vehicle, or both (in circumstances in which the connection is established prior to engaging the nozzle). According to some embodiments, the fueling station monitors the fueling information received via the connection throughout the period in which the fueling station and vehicle remain connected via the connection established in act 1610. For example, the vehicle may continuously and/or regularly (e.g., in real-time or near real-time) transmit updated tank parameters via the established connection so that the fueling station receives up-to-the-instant or sufficiently current updated fueling information from the vehicle and can monitor changes thereof. That is, act 1930 may be performed repeatedly (e.g., continuously and/or regularly) throughout the vehicle-to-nozzle pairing process (and throughout a fueling event, as discussed in further detail below), and may also monitor tank parameters prior to vehicle engagement with a nozzle (e.g., any time or throughout the period of time that the vehicle and the fueling station have an established wireless connection.

Act 1940 comprises delivering a fluid flow signature to the vehicle via the dispenser nozzle. For example, the dispenser may control the flow of hydrogen gas through the nozzle in a specific on/off pattern so that the fuel tank of the vehicle engaged with the nozzle experiences the delivered fluid flow signature. The fluid flow signature may be any pattern of flow that results in one or more detectable changes in the tank parameters (e.g., a detectable change in measured tank pressure) in response to the fluid flow signature being delivered to the fuel tank of the vehicle engaged to the nozzle. According to some embodiments, the fluid flow signature delivered via a nozzle is changed each time the nozzle is engaged with a different vehicle and/or the fluid flow signature delivered via the nozzle may be changed periodically (e.g., hourly, daily, etc.). The specific fluid flow signature delivered via a nozzle may be assigned in any manner, either statically or dynamically, so that no two nozzles deliver the same fluid flow signature at the same time (or during a same interval of time), thus allowing the nozzle to be identified based on the fluid flow signature delivered to the vehicle currently engaged with the nozzle.

Act 1950 comprises associating the connection established in act 1610 with the nozzle engaged with the vehicle based at least in part on one or more tank parameters received via the connection established in act 1610. As discussed above, act 1930 may be repeated at any desired frequency so that the fueling station can monitor changes in one or more tank parameters over time to match those changes to the expected response of the fuel tank to the fluid flow signature delivered to the vehicle in act 1640. For example, the fueling station may monitor one or more tank parameters received via the established connection and may associate the connection with the nozzle that delivered a given fluid flow signature (e.g., the specific fluid flow signature delivered in act 1940) when changes in the one or more tank parameters match an expected response of the fuel tank to receiving the given fluid flow signature. That is, when changes in the one or more tank parameters received via the established connection reflects the expected response to the fluid flow signature, the fueling station can ascertain which connection is associated with the vehicle engaged at the corresponding nozzle, thus allowing or facilitating the vehicle-to-nozzle pairing to be resolved.

For example, referring again to FIG. 5, providing nozzle information 1025 may include dispenser 2220a controlling nozzle 2225a to deliver a gas flow pattern corresponding to the nozzle to fueling receptacle 1125 of vehicle 1100a. The hydrogen gas flow pattern then causes changes to the tank parameters that are reflected in the vehicle tank data received by vehicle ECM 1160 and transmitted to RSU 2250 via OBU 1150 over established wireless connection 2050a. Fueling station 2200 may be configured to monitor tank data received from each of the vehicles with which the fueling station has established a connection. When changes in received tank data from a vehicle matches expected changes resulting from delivering a fluid flow pattern, the fueling station associates the wireless connection over which the matched tank data was received with the nozzle that delivered the corresponding flow pattern, thereby pairing the vehicle and the nozzle.

Figure 10:
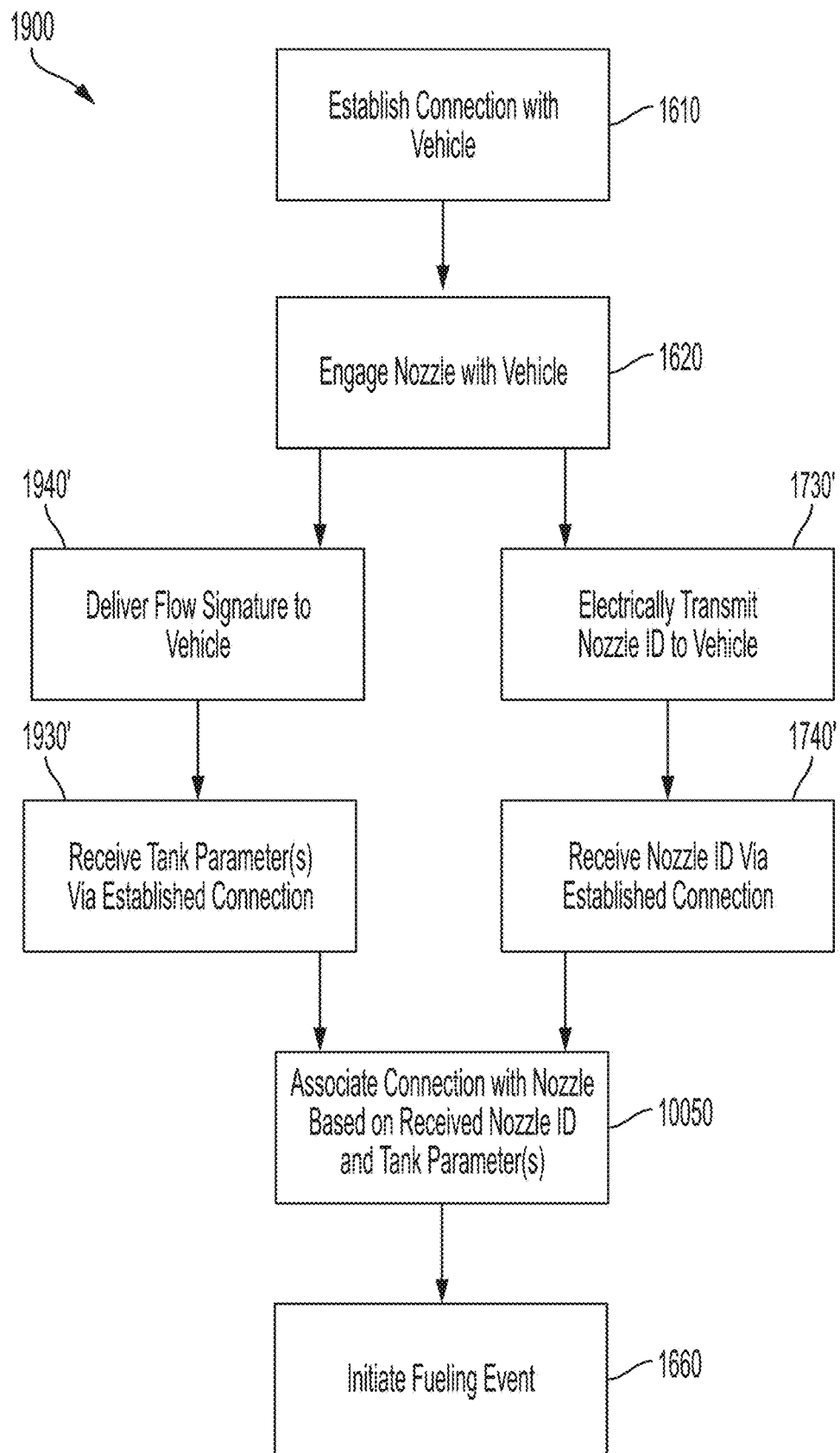
FIG. 10 illustrates a method of performing vehicle-to-nozzle pairing comprising electrically transmitting a nozzle identification and delivering a flow signature to a vehicle, in accordance with some embodiments.

FIG. 10 illustrates an exemplary vehicle-to-nozzle pairing method which provides nozzle information to a vehicle both by electrically transmitting (e.g., via wireless optical or radio frequency transmission) a nozzle ID and by delivering a fluid flow signature to the vehicle via the dispenser nozzle. For example, when a vehicle engages with a nozzle (act 1620), the dispenser may electrically transmit a nozzle ID corresponding to the nozzle to the vehicle that uniquely identifies the nozzle (act 1730') and may deliver a flow signature to the vehicle to cause an identifiable change in tank parameters of the vehicle (act 1940'). As a result, feedback transmitted from the vehicle and received by the fueling station via a wireless connection established in act 1610 may include both the nozzle ID (act 1740') and tank information (act 1930').

Act 10050 comprises associating the connection over which the feedback was received with the nozzle engaged with the vehicle. For example, act 10050 may include any of the actions described in connection with acts 1750 and 1950 of FIGS. 7 and 9, respectively, to resolve the correct vehicle-to-nozzle pairing. Basing vehicle-to-nozzle pairing on both types of feedback allows the fueling station to confirm the association and/or may enable vehicle-to-nozzle pairing when one or the other technique is not available. For example, some vehicles may not include the receiver needed to receive the electrically transmitted nozzle ID, or the receiver may currently be inoperable, but vehicle-to-nozzle pairing could still be accomplished via flow signature techniques.

As discussed, the V2X communication techniques discussed above allow a fueling station to establish a controller area network (CAN) communicatively connecting vehicles in-range of the fueling station's RSU (e.g., as described in connection with the CAN illustrated in FIG. 2A) and/or communicatively connecting vehicles in a larger zone of communication using vehicle hopping (e.g., as described in connection with the CAN illustrated in FIG. 2B and vehicle hopping techniques described in connection with FIG. 3). As a result, a fueling station can receive a rich set of information from vehicles at, near and/or at a distance from the fueling station that can be used to perform a wide range of actions at the fueling station, some examples of which are discussed in further detail below. In the following discussion of exemplary actions taken by the fueling station, the described actions may be performed by the fueling station via any one or combination of components at the fueling station including, but not limited, any one or combination of components connected to the fueling station network such as one or more fueling station controllers, dispenser controllers, system controllers for sub-systems of the fueling station (e.g., controllers for hydrogen cooling systems, hydrogen gas supply systems, dispenser island systems, etc.), or any other suitable component or combination of components.

Figure 4B:
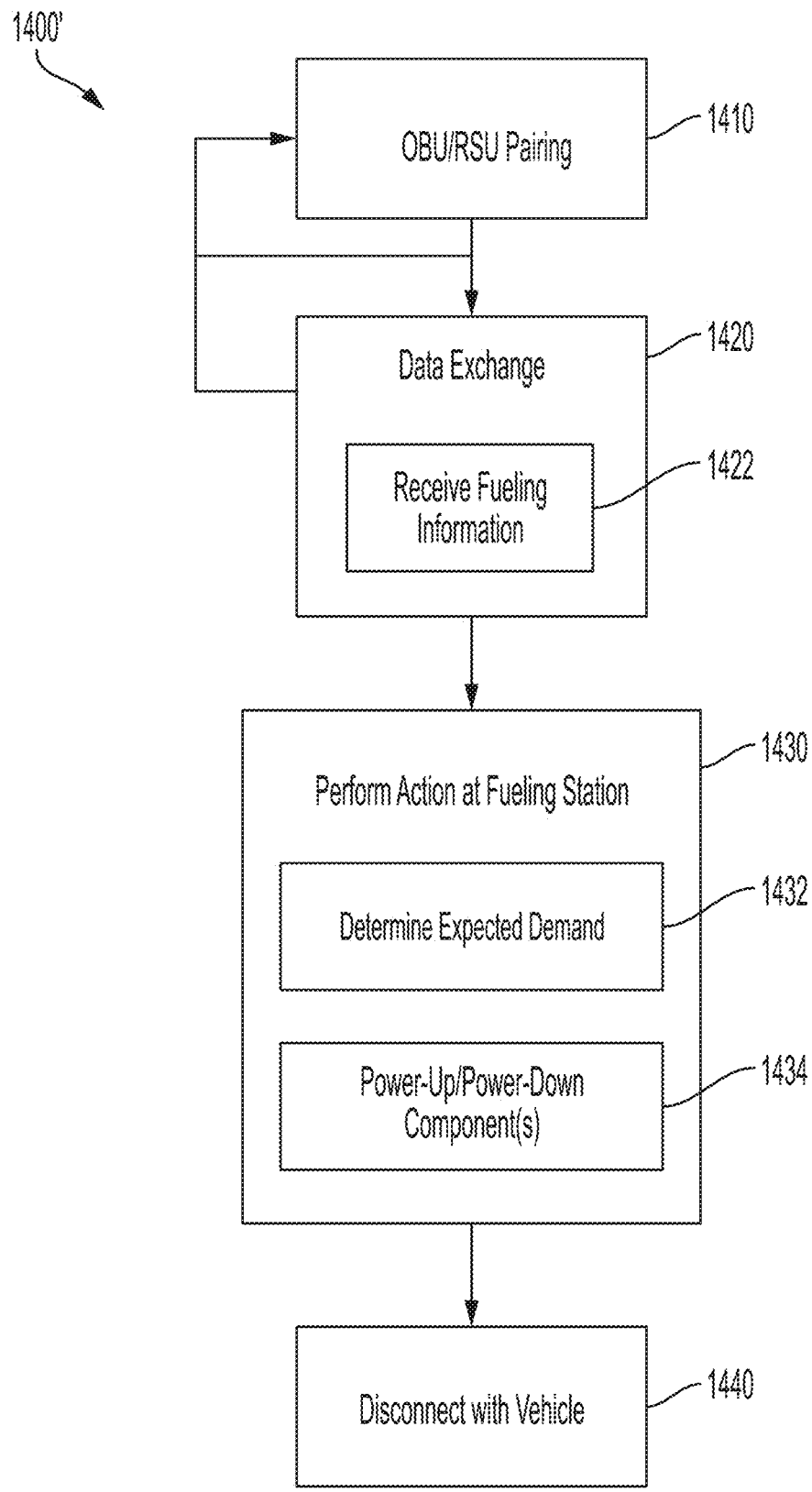
FIG. 4B illustrates an exemplary method of taking action at a fueling station based on fueling information received via a controller area network, in accordance with some embodiments.

According to some embodiments, based on information received from vehicles in the CAN, the fueling station can predict the near-term demand on the fueling station from the number of vehicles needing refueling and can configure the fueling station to meet those demands and/or to reduce energy consumption when the information indicates the ability to do so. FIG. 4B illustrates an exemplary method performed in response to receiving fueling information via a CAN comprising a road-side unit at a fueling station and a plurality of on-board units associated with respective vehicles with which the road-side unit has established respective wireless connections (e.g., by performing acts 1410 and 1420 as discussed above in connection with FIG. 4A). The fueling information received by performing act 1420 may include any information or combination of information from the vehicle that facilitates determining an expected demand at the fueling station including, but not limited to one or more tank parameters that allow the fueling station (e.g., via one or more controllers coupled to road-side unit) to determine how much fuel a vehicle presently has, location of the vehicle to determine how far the vehicle is from the fueling station, whether a vehicle is moving towards or away from the fueling station, proximity of a vehicle to another fueling station, etc.).

In the embodiment illustrated in FIG. 4B, this received fueling information is used by the fueling station (e.g., via the one or more controllers) to estimate the expected refueling demand at the fueling station so that the fueling station can prepare the fueling station to meet the expected demand (act 1432). In act 1434, the expected demand determined from the received fueling is used to power up one or more components of the fueling station (e.g., to meet an expected increase in demand) or power down one or more components of the fueling station in view of an expected decrease in demand. For example, if the fueling information obtained from the CAN indicates that the fueling station is likely to experience of period of little or no demand, the fueling station may respond by powering down one or more components of the fueling station. As another example, the fueling station may be in a reduced power consumption state (e.g., one or more components of the fueling station may have been powered down to reduce power consumption) and in response to information received via the CAN indicating relatively near-term demand, the fueling station may power up one or more components of the fueling station to ensure that the fueling station is able to meet the demand.

According to some embodiments, the fueling station may respond to information received via the CAN to disable operation of one or more refrigeration units (e.g., power down one or more refrigeration units or one or more components of a refrigeration unit), associated pumps, etc. of a hydrogen cooling system to reduce power consumption at the fueling station when information received via the CAN indicates a level of demand that allows the fueling station to operate in a reduced power state. For example, disabling operation of a refrigeration unit may comprise powering down or turning off one or more components of the refrigeration unit to save on power that would otherwise be consumed to reduce and/or maintain the temperature of coolant used by a hydrogen cooling system to chill hydrogen gas. Disabling operation of a component (e.g., a refrigeration unit, dispenser, pump, motor, etc.) may involve powering down or turning off some portions of the component while keeping some portions of the component powered up.

According to some embodiments, the fueling station responds to information received via the CAN to enable operation of one or more refrigeration units (e.g., power up one or more refrigeration units or one or more components of a refrigeration unit), associated pumps, etc. of a hydrogen cooling system when information received via the CAN indicates the need to do so to meet the likely near-term refueling demands on the fueling station. For example, enabling operation of a refrigeration unit may comprise powering up or turning on one or more components of the refrigeration unit that were previously disabled to resume reducing and/or maintaining the temperature of coolant used by a hydrogen cooling system to chill hydrogen gas. Enabling operation of a component (e.g., a refrigeration unit, dispenser, pump, motor, etc.) refers generally to powering up or turning on portions of the component needed to operate and/or resume operation. Further examples of using information received via the CAN to reduce power consumption, optimize performance and/or otherwise configure components of the fueling station are discussed in further detail in connection with the exemplary hydrogen cooling systems described below.

According to some embodiments, the fueling station may respond to information received from the CAN to provide information to vehicles with which the fueling station has established a connection such as status information on the fueling station or status information of another fueling station, fuel availability, estimated wait times, the availability of fuel at different temperature classes, estimated wait times, navigation information to the fueling station or other fueling stations, etc. (e.g., when performing act 1420 in the exemplary methods illustrated in FIGS. 4A-C). In this manner, status information may be broadcast to all vehicles to which a fueling station is connected and/or information specific to a given vehicles may be transmitted over the respective wireless connection so that different information is transmitted to different vehicles based on the specific information provided by the corresponding vehicle over its established connection.

Any combination of the above information may be transmitted from the fueling station RSU to OBUs of vehicles having established connections with the RSU, and the vehicles' ECM can display this information to the vehicle operator and/or recommend that the operator of the vehicle drive to the fueling station when the conditions at the fueling station are favorable and/or suitable or recommend that the operator of the vehicle continue to a different fueling station where conditions may be more favorable and/or suitable. In embodiments in which navigation information to one or more fueling stations is provided, this navigation information can be used to guide the operator of the vehicle to the fueling station that can best meet the current needs of the vehicle. In this way, helpful fueling information may be provided to vehicles to assist in refueling vehicles and/or current fueling demands of vehicles in a zone of communication can be distributed across multiple fueling stations to optimally meet that demand.

Figure 4C:
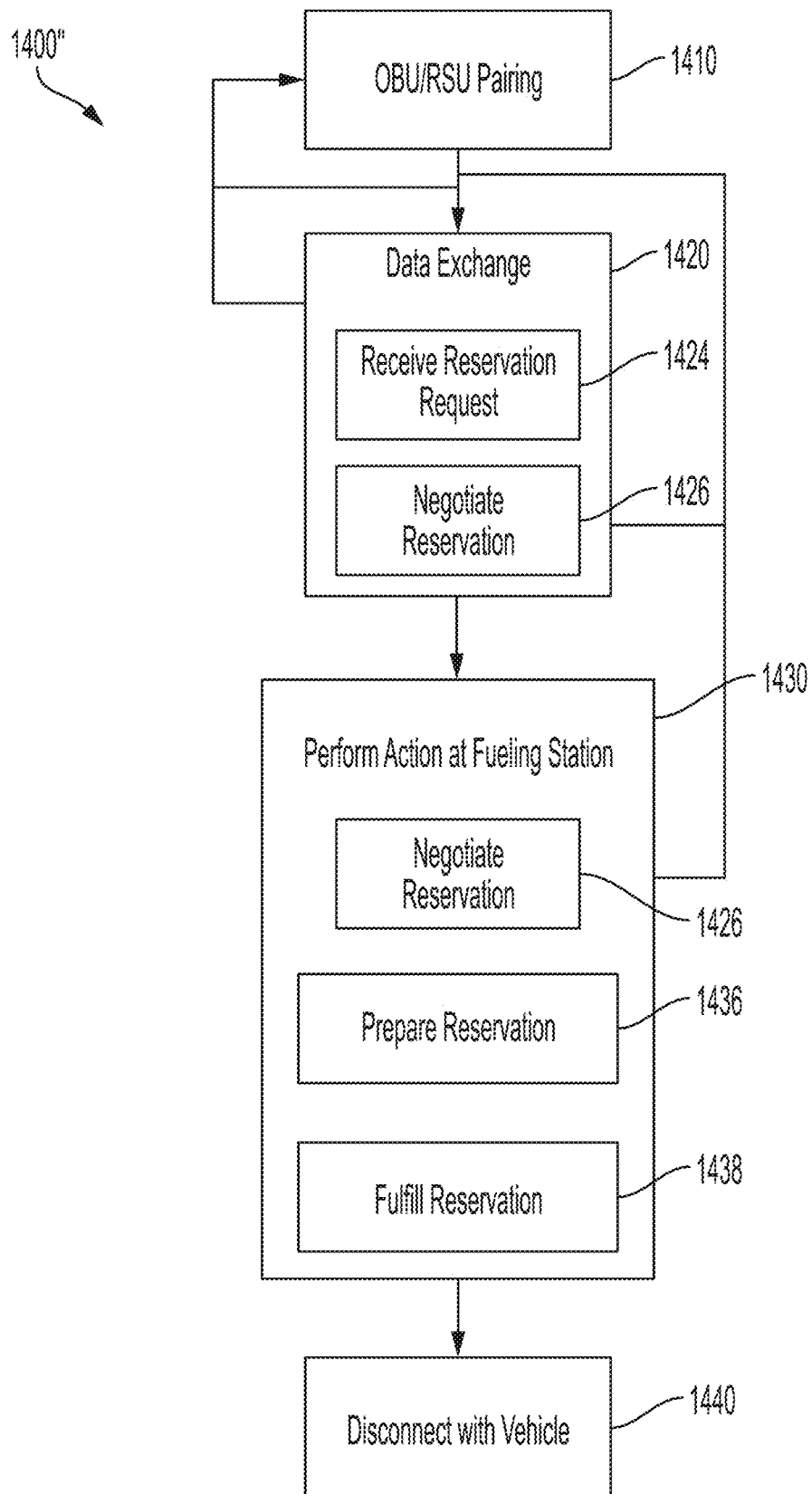
FIG. 4C illustrates an exemplary method of performing nozzle reservation via a controller area network, in accordance with some embodiments.

According to some embodiments, the fueling station may respond to information received from the CAN to perform nozzle reservation for a vehicle so that the vehicle can be assured of having an available nozzle at which to refuel when the vehicle arrives at a fueling station (e.g., at a specified reservation time, within a specified reservation window, any time after a specified earliest reservation time, etc.). FIG. 4C illustrates an exemplary method performed in response to receiving a nozzle reservation request via a CAN comprising an RSU at a fueling station and one or more OBUs associated with a respective vehicle(s) with which the road-side unit has established a wireless connection (e.g., by performing acts 1410 and 1420 as discussed above in connection with FIG. 4A), in accordance with some embodiments.

In the exemplary nozzle reservation method illustrated in FIG. 4C, for example, the RSU at a fueling station receives a request via the OBU of a vehicle to reserve a nozzle for a refueling event (act 1424) during data exchange with the OBU (act 1420). The request may include the amount of fuel needed, the required or preferred temperature class of the fill, a time or time periods for the reservation, or the fueling station may determine the parameters of the request from other information received from the vehicle (e.g., tank volume and current tank pressure, tank temperature, location of the vehicle if provided, etc.). In act 1426, the fueling station (e.g., via one or more controllers coupled to the RSU) negotiates the reservation with the vehicle.

Negotiating the reservation may include any processing needed to confirm a nozzle reservation for the requested reservation and may include both data exchange (e.g., act 1426 as part of data exchange 1420) and performing action at the fueling station (e.g., act 1426 as part of act 1430). For example, negotiating the reservation may include one or any combination of determining whether there is one or more dispensers at the fueling station that are capable of fulfilling the reservation or can be made ready to fulfill the reservation, further data exchange with the OBU to obtain additional information, modifying one or more parameters of the requested reservation, proposing one or more parameters for the requested reservation, providing a reservation identifier, confirming the reservation, etc. Once the nozzle reservation has been negotiated, one or more actions may be performed at the fueling station to prepare for fulfilling of the reservation (act 1436) including, but not limited to, associating information with the reservation, informing one or more dispensers of the reservation, powering up one or more components of the fueling station to make sure that the requested fueling event can be performed when the vehicle arrives for its reservation, etc., examples of which are described in further detail below. When the vehicle with the reservation arrives at the fueling station, the fueling station fulfills the reservation (act 1438) by performing a fueling event via a reserved dispenser.

A fueling station may prepare for a reservation (e.g., may perform act 1436) in any number of suitable ways. For example, if multiple dispenser nozzles are ready and available (or can be made to be ready and available prior to the reservation time) to perform the reserved fueling event, each available dispenser may be informed of the reservation. In this way, any of the available dispensers may still be used to perform intervening fueling events so long as at least one dispenser remains ready to fulfill the reservation. As such, vehicles that may arrive at the fueling station prior to the reservation need not be inconvenienced by inadvertently pulling up to a specific dispenser that has been temporarily dedicated to fulfilling a reservation and instead can utilize the dispenser unless and until only one dispenser nozzle remains that can fulfill the reservation. The dispenser numbers, for example, of dispensers that can fulfill the reservation may be conveyed to the vehicle with the reservation so that the vehicle can refuel at any of those dispensers. Dispenser availability can be updated (e.g., by performing further data exchange 1420) as needed prior to the reservation in the event that intervening vehicles utilizing one or more dispensers to refuel cause that dispenser to be unavailable to fulfill the reservation. According to some embodiments, a single dispenser (or a single nozzle of a multi-nozzle dispenser) is assigned to fulfill a reservation and therefore may be unavailable to other vehicles during some prescribed time unless the dispenser is capable of performing one or more refueling events and still be able to fulfill the reservation.

According to some embodiments, the reservation request received by the fueling station via the established connection (e.g., act 1424) may include identification information associated with the vehicle or the vehicle's operator and this identification information may then be associated with the reservation (e.g., during act 1426 or 1436). That same identification information may then be conveyed to the fueling station during vehicle-to-nozzle pairing using any of the techniques described in the foregoing to confirm that the vehicle engaged at a nozzle has reserved the nozzle (e.g., when a single nozzle is assigned to fulfill the reservation) and/or to indicate that the subsequent refueling event fulfills that reservation (e.g., when any available dispenser can be used to fulfill the reservation).

According to some embodiments, nozzle reservation may be performed anonymously. For example, when a vehicle requests a nozzle reservation and the fueling station confirms the reservation (e.g., by performing acts 1424 and 1426), the fueling station may associate the established connection with the vehicle to that reservation (e.g., by assigning a unique reservation number to the established connection). Thus, when the fueling station associates that established connection with a given nozzle during vehicle-to-nozzle pairing using any of the techniques describe above, the fueling station can confirm that this connection also has the reservation associated with it. Anonymous nozzle reservation can therefore be performed both when a single dispenser is dedicated to the reservation or when any available dispenser can be used to fulfill the reservation. According to some embodiments using the above technique for anonymous nozzle reservation, the same connection with the fueling station over which the reservation request was made may need to be maintained through to the completion of the refueling event. However, according to some embodiments, when a reservation is made, the fueling station may assign a unique number to that reservation (e.g., a pseudo-random number of sufficient length that ensures the reservation cannot be spoofed) and convey that reservation number to the vehicle (e.g., during reservation negotiation 1426). Should the established connection be disconnected (either inadvertently or intentionally in act 1440), the vehicle may convey the unique reservation number to the fueling station when a connection between the vehicle and the fueling station is established prior to a fueling event (e.g., during act 1610 of refueling event 1600 illustrated in FIG. 6) so that the connection established for the refueling event need not be the same connection over which the reservation was made.

According to some embodiments, a V2X connection with a vehicle and a fueling station is used to exchange payment information to allow automatic payment for a fueling event. For example, the vehicle may provide debit or credit card information or other information needed to perform any type of electronic payment to the fueling station over the established connection (e.g., via data exchange 1420) to facilitate secure transmission of payment information that allows the fueling system to process payment for a fueling event without needing the vehicle operator to interact with the dispenser (e.g., by inserting a debit or credit card into the dispenser) and/or fueling station personnel to pay for the fueling event, facilitating simpler and more convenient transactions and/or more efficient fueling events.

According to some embodiments, a fueling station uses information received from vehicles via the CAN to optimize a fueling event for individual vehicles. As discussed above, the increased bandwidth of V2X communications allows for a richer set of information about a vehicle to be transmitted to the fueling station (e.g., via data exchange 1420). For example, in addition to the limited set of tank parameters (e.g., tank pressure, tank temperature, tank size, etc.) transmitted via conventional LOS communications established between the vehicle and the dispenser via the nozzle, information about the specific fueling preferences, requirements and/or capabilities may be transmitted to the fueling station so that the dispenser can optimize a fill according to the preferences, requirements and/or capabilities of a specific vehicle conveyed to the fueling station via an established V2X connection. As a result, a dispenser may be configured to deliver a faster fill when information received from the vehicle confirms that the dispenser can do so safely.

According to some embodiments, a fueling protocol for the vehicle may be transmitted to the fueling station via the established V2X communication that can be used by the dispenser to optimize a fueling event for the vehicle. The fueling protocol may include, among other information, target tank pressure as a function of time that the dispenser should follow when performing a fueling event. This pressure profile can be used by the dispenser controller to vary the flow rate of hydrogen delivered to the fuel tank of a vehicle to follow the pressure profile specified by the fueling protocol. In this way, a dispenser can be configured to refuel a vehicle in accordance with the fueling protocol specified by the vehicle, further details of which are discussed in connection with the exemplary dispenser controllers described below.

According to some embodiments, information received by a fueling station via a CAN (e.g., via data exchange 1420) may be used to develop trend data on demand (e.g., time of day of peak demand, average demand for the fueling station, weekday vs. weekend demand, predominant type of vehicle being refueled during different times, etc.) that can be used to optimize the fueling station. For example, trend data can be used to create daily demand schedules that can be used by the fueling station to guide in the powering up or powering down one or more components of the fueling station. This information may be used to supplement and/or confirm current demand information received via the CAN. For example, the fueling station may determine from information received via the CAN that there may be little or no near-term demand but may decide to keep one or more components powered-up based the proximity in time to peak demand time captured by the trend data. Trend data may be used in multiple other ways such as determining an optimal configuration of components (e.g., hydrogen cooling system configuration), scheduling delivery of hydrogen gas, to guide in optimally configuring a new fueling station deployment or in other ways, as the aspects are not limited in this respect.

As discussed above, many current fueling protocols adopted by hydrogen refueling stations require hydrogen fuel to be cooled between −40° C. to −17.5° C. prior to dispensing to the vehicle to ensure the vehicle's fuel tank maintains bulk gas temperatures below 85° C. regardless of ambient temperatures or previous driving conditions. As discussed above, existing hydrogen gas fueling stations typically employ either a large chilled aluminum block that provides a thermal reservoir to cool hydrogen gas prior to dispensing or a diffusion-bonded heat exchanger that cools hydrogen gas by circulating chilled coolant through a plate-to-plate configuration. The inventors have recognized that while each technique has some advantages, both have significant drawbacks. Aluminum block heat exchanger systems are massive (e.g., 600-1000 kg) and costly (e.g., $100-150K per installation), and typically require breaking ground to bury the aluminum block beneath the dispenser, which may limit the locations for these installations and increases the cost. Additionally, contact resistance between the aluminum block and the stainless-steel tubing causes heat transfer inefficiency resulting in a low UA (overall heat transfer coefficient, U, multiplied by the heat transfer area, A) heat exchanger. Thus, aluminum block heat exchangers have relatively long fueling times (e.g., 5 minutes). Aluminum block heat exchangers generally are employed on a per dispenser basis so that multiple installations are required for fueling stations having multiple dispensers, making the aluminum block heat exchanger solution difficult and costly to scale. One advantage of aluminum block heat exchangers is that once cooled, the large thermal mass of the aluminum block allows the low temperature of the aluminum block to be maintained with relatively low energy output (e.g., 19 kW) so that relatively small capacity refrigeration units can be used maintain the target temperature of the aluminum block.

Conventional high UA heat exchanger systems (e.g., cooling systems that employ diffusion-bonded plate-to-plate heat exchangers) are typically even costlier (e.g., $200K per installation), but these systems provide for a high UA heat exchange allowing for faster fill times (e.g., on the order 2 minutes for some installations). Conventional diffusion-bonded heat exchanger systems employ relatively low volume coolant reservoirs (e.g., between 20-50 gallons) and large-capacity refrigeration unit (e.g., 35-70 kW capacity chillers) are required to maintain the low temperature of this low thermal mass coolant reservoir to meet peak fueling demands. Use of large-capacity chillers has a number of drawbacks. In particular, large-capacity chillers are themselves expensive and consume significant power and to the cost of operating these refrigeration units. Also, the large size of these chillers often prevents installation of the chiller proximate the dispenser. As a result, the coolant reservoir and chiller are typically installed some distance from the dispenser and must be connected to the heat exchanger at the dispenser with lengths of tubing.

The inventors have designed and developed high UA hydrogen cooling systems that address one or more of the above drawbacks associated with conventional hydrogen cooling systems. For example, the inventors have appreciated that the conventional approach of using a small-volume coolant reservoir and large-capacity refrigeration unit (chiller) results in both large and costly hydrogen cooling systems. The inventors recognized that by increasing the volume of the coolant reservoir, the thermal energy capacity of the reservoir can be increased, thus taking advantage of the high thermal mass characteristics of aluminum block heat exchangers without incurring the heat transfer inefficiency and other drawbacks of that solution. According to some embodiments, a heat exchanger system comprises a coolant reservoir of between 50-700 gallons (e.g., a 100-gallon tank of a coolant such as glycol) to increase the thermal energy storage capacity of the reservoir. As used herein, a large-volume reservoir refers to reservoir with an equal to or greater than 50 gallon holding capacity (in some embodiments, preferably greater than 80 gallons, and in some embodiments, preferably 100 gallons or larger).

The inventors further recognized that the increased thermal storage capacity of the large volume reservoir allows for the use of a significantly smaller refrigeration unit. Specifically, because increasing the volume of the reservoir increases the thermal energy capacity, the volume of the reservoir can be sized to handle peak demand so that the refrigeration unit need only be sized to handle the base load refueling needs of the fueling station. According to some embodiments, a small-capacity refrigeration unit is used to cool a large volume coolant reservoir, both sized according to the needs of the fueling system. As used herein, a small-capacity refrigeration unit (chiller) refers to a refrigeration unit have a capacity of greater than 3 kW and less than or equal to approximately 21 kW. The capacity of a refrigeration unit is often stated in terms of tons where each ton provides an additional 3.517 kW capacity approximately. Thus, a small-capacity refrigeration unit refers to between, and including, between approximately 1-ton and 6-ton refrigeration units.

Furthermore, the inventors have appreciated that aspects of this design for hydrogen cooling (e.g., large volume reservoirs and small chillers relative to conventional approaches) provides a flexible design approach that can be optimized according to the performance needs of a particular fueling station. For example, a fueling station requiring higher performance may size-up the capacity of the refrigeration unit to reduce recovery times and/or increase the volume of the coolant reservoir to increase the peak capacity of the station (e.g., the number of back-to-back fills that can be performed). Fueling stations requiring less demanding recovery times and/or that need less peak capacity capabilities can be sized down accordingly to provide a lower cost solution that meets the performance requirements of the fueling station, as discussed in further detail below.

The inventors have further appreciated that aspects of the above-described combination of components facilitate compact designs that allow for compact hydrogen cooling system that can be installed proximate the dispenser (e.g., next to or adjacent to one or more dispensers) delivering chilled hydrogen into fuel tanks of HFCVs. Additionally, using a large-volume reservoir/small-capacity refrigeration/high UA heat exchanger combination provides a flexible arrangement that can configured in different ways and optimized for a particular fueling station, providing a highly flexible, scalable and cost-effective solution to hydrogen cooling.

According to some embodiments, the hydrogen cooling system according to these techniques is provided in which a large-volume coolant reservoir, small-capacity refrigeration unit and heat exchanger are integrated and deployed as a single compact unit (e.g., integrated within the same housing). According to some embodiments, this integrated hydrogen cooling unit is located proximate the dispenser(s) (e.g., adjacent to one or more dispensers, or located on the canopy over the dispensers) for which the unit provides cooling. According to some embodiments, a single hydrogen cooling system provides cooling for a plurality of dispensers. For example, a fueling station may comprise one or more islands, each island having multiple dispensers (e.g., multiple nozzles by which a respective multiple number of vehicles can be simultaneously refueled). The multiple dispensers on each island may share a single hydrogen cooling system, which cooling system may be an integrated unit or may be of a different design, as the aspects are not limited in this respect. According to some embodiments, a single small-capacity refrigeration unit may be coupled to a single large-volume reservoir or multiple large-volume reservoirs. Using either configuration, each large-volume reservoir may provide coolant for one or multiple exchangers that are in turn coupled to one or multiple dispensers. A number of exemplary configurations are illustrated and described in further detail below.

The inventors have further appreciated that the thermal energy capacity of a hydrogen cooling system may be increased by using phase change material (PCM) that stores latent heat energy during transition from one state to another (e.g., energy is stored by the phase change material during a change from a liquid to a solid as a result of cooling the phase change material) to increase the heat energy capacity of the reservoir. The latent heat energy stored by the PCM is released as the PCM changes state when absorbing heat from a hydrogen gas to cool the hydrogen for dispensing to the fuel tank of a vehicle. That is, heat removed from hydrogen gas (or heat removed from conventional coolant that has absorbed heat from hydrogen gas) results in state change of the PCM rather than heating of the PCM (or conventional coolant) and thus provides a thermal buffer for the hydrogen cooling system. As a result, the increased heat energy capacity resulting from PCM techniques can be used to increase the back-to-back fill capacity of the hydrogen cooling system and/or to decrease the size and expense of the refrigeration unit needed to meet the fueling requirements of a specific refueling station. The inventors have recognized that a class of PCMs known as eutectics characterized by having a low temperature phase change are well suited for hydrogen gas cooling applications, however, other PCMs may be used in some embodiments, as discussed in further detail below.

It will be understood that all materials change state at some temperature and are therefore strictly speaking phase change materials. However, as used herein, a phase change material refers to a coolant that has a phase change temperature in the range of intended temperatures of the hydrogen cooling system and that exists in a first state at ambient temperatures and is caused to transition to a second state when chilled by components of a hydrogen cooling system to store heat energy via the state transition. Similarly, a non-PCM coolant (e.g., glycol) is a material that has a phase change temperature outside the range of intended temperatures of the hydrogen cooling system and that exists in a first state at ambient temperatures and remains in that first state when chilled by components of the hydrogen cooling system.

According to some embodiments, the above-described hydrogen cooling systems can employ conventional plate-to-plate diffusion bonded heat exchangers. However, diffusion-bonded heat exchangers are by themselves expensive, costing anywhere from $40-100K, thus potentially limiting the scalability and/or flexibility of these solutions. To facilitate further reduction in the cost of a hydrogen cooling system, the inventors have developed a high UA annular heat exchanger designed for high pressure heat exchange that, according to some embodiments, can be used in place of expensive diffusion-bonded heat exchangers, thereby further lowering the cost of the hydrogen cooling system and improving the scalability and flexibility of the solution, facilitating further optimization capabilities in the design, configuration and deployment of the hydrogen cooling system. As used herein, an annular heat exchanger refers to a heat exchanger in which the tubing through which hydrogen gas is formed into an annular coil, examples of which are described in further detail below.

According to some embodiments, the tubing of the coil of an annular heat exchanger is made from a material (e.g., a nickel alloy) that is compatible with hydrogen and that can withstand the pressure conditions of a hydrogen fueling environment and is designed to have a thin wall thickness to increase heat transfer efficiency of the coil. According to some embodiments, the annular coil is finned (e.g., copper fins) to increase the surface area of the coil to increase heat transfer efficiency. According to some embodiments, the annular heat exchanger is of a shell-and-tube configuration comprising an outer shell (e.g., a cylindrical shell) through which coolant is pumped and the coil of tubing is positioned within the outer shell so that hydrogen gas flowing through the coil transfers heat to the coolant flowing through the outer shell. According to some embodiments, an annular heat exchanger comprises a plurality of coils to increase the heat transfer capacity of the heat exchanger.

Following below are further detailed descriptions of various concepts related to, and embodiments of, hydrogen cooling systems for refueling of hydrogen fuel cell vehicles. It should be appreciated that the embodiments described herein may be implemented in any of numerous ways. Examples of specific implementations are provided below for illustrative purposes only. It should be appreciated that the embodiments and the features/capabilities provided may be used individually, all together, or in any combination of two or more features/capability, as aspects of the systems and techniques described herein are not limited in this respect.

Figure 11:
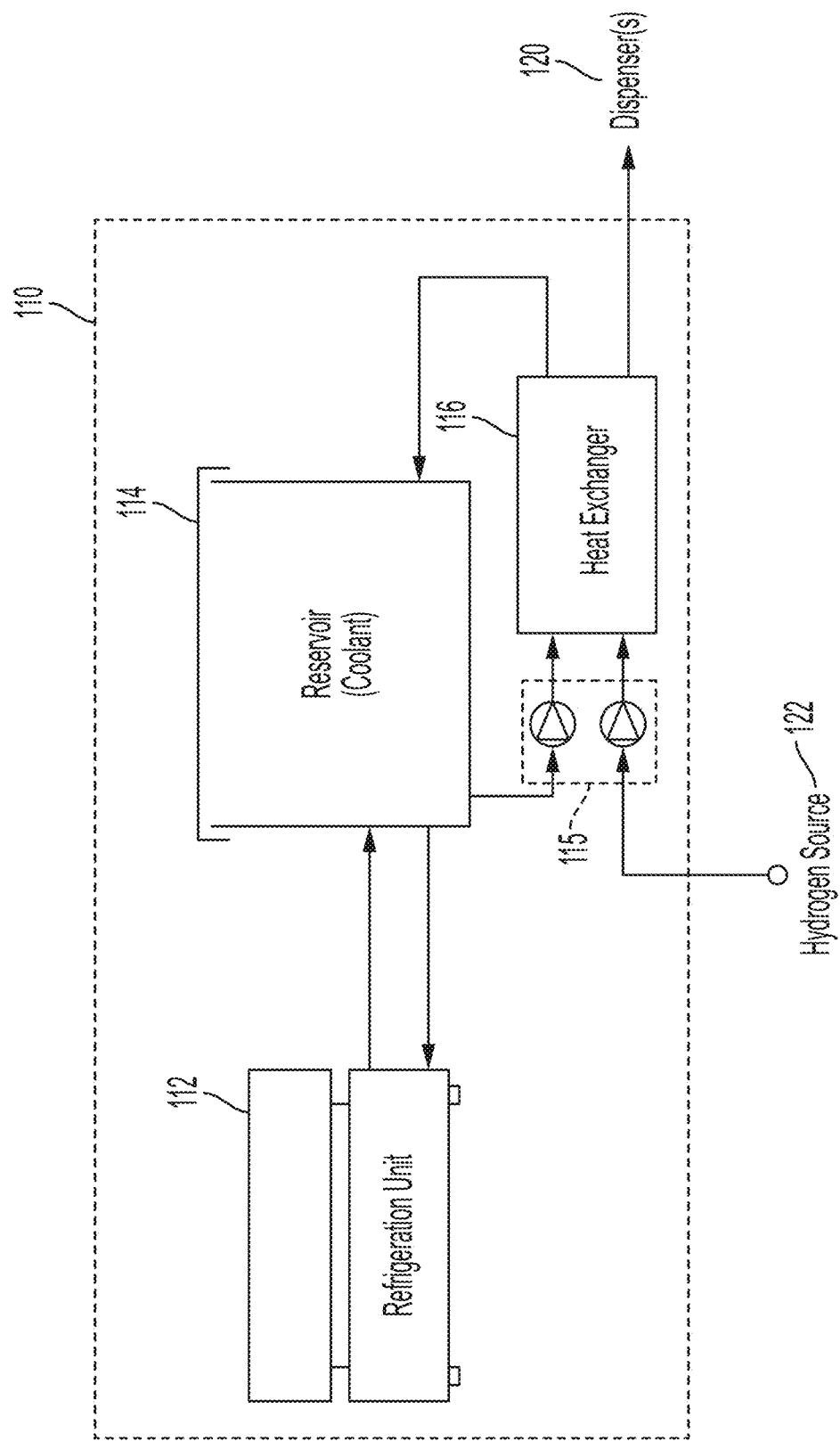
FIG. 11 illustrates a hydrogen cooling system comprising a refrigeration unit, coolant reservoir and high UA heat exchanger, in accordance with some embodiments.

FIG. 11 illustrates a block diagram of a hydrogen cooling system, in accordance with some embodiments. The block diagram in FIG. 11 is not drawn to scale and is meant to illustrate how components of an exemplary hydrogen cooling system 110 are coupled to each other and to components of a fueling station in some embodiments. Hydrogen cooling system comprises refrigeration unit 112 coupled to reservoir 114 of coolant and configured to bring the coolant down to low temperatures (e.g., in a range from −40° C. to −17.5° C.) to facilitate fast and safe fueling of HFCVs. As discussed above, such refrigeration units are also referred to as chillers or coolers and, unless otherwise specified, refrigeration unit, condenser unit, chiller and cooler will be used interchangeably to refer to this component configured to chill coolant that is in turn used by heat exchanger 116 to chill hydrogen gas for dispensing into the fuel tank of an HFCV. It should be appreciated that refrigeration unit may be any type of cooling source ranging from using HFC's, $CO_2$, glycol chiller systems or cryogenic gas, cascaded refrigeration units, etc.

Heat exchanger 116 may be any component with sufficiently high heat transfer efficiency to meet the performance requirements of a fueling station. According to some embodiments, an annular heat exchanger designed for high heat transfer efficiency and to operate under the high-pressure conditions of hydrogen gas refueling is used to implement heat exchanger 116, examples of which are described in further detail below. According to some embodiments, a conventional plate-to-plate heat exchanger, for example, a diffusion-bonded heat exchanger designed for the high pressures of hydrogen gas refueling may be used to implement heat exchanger 116. Use of an annular heat exchanger may be preferable for many fueling stations due to its lower cost, size and/or flexibility (e.g., the suitability of an annular heat exchanger to be used in conjunction with embodiments employing PCMs), but aspects are not limited in this respect.

During a refueling event, chilled coolant from reservoir 114 and hydrogen gas from hydrogen source 122 are pumped through heat exchanger 116 (e.g., via pumps 115) where the chilled coolant absorbs heat from the hydrogen gas as the coolant and hydrogen gas pass through the heat exchanger. Hydrogen source 122 refers to any source from which heat exchanger receives hydrogen. For example, hydrogen source 1122 may be a bank of hydrogen storage tanks at the fueling station. According to some embodiments, hydrogen source 122 may be the dispenser in configurations where the hydrogen cooling system is coupled downstream of the dispenser flow control valve, examples of which are described in further detail below. The chilled hydrogen gas may then be provided to dispenser(s) 120 for delivery during to the fuel tank of an HFCV during a fueling event. The coolant is recirculated back to the reservoir. Refrigeration unit 112 is operated to maintain the desired temperature of the reservoir and/or to recover the temperature of the reservoir coolant to the desired temperature as one or more refueling events increases the temperature of the reservoir coolant. For example, coolant many be circulated between refrigeration unit 112 and reservoir 114 to maintain or recover the desired temperature, a refrigeration coil may be positioned within the reservoir to maintain/recover the temperature, etc. Any of the techniques described below in connection with FIG. 12 may be used to maintain and/or recover a target temperature of coolant in coolant reservoir 114.

Figure 17:
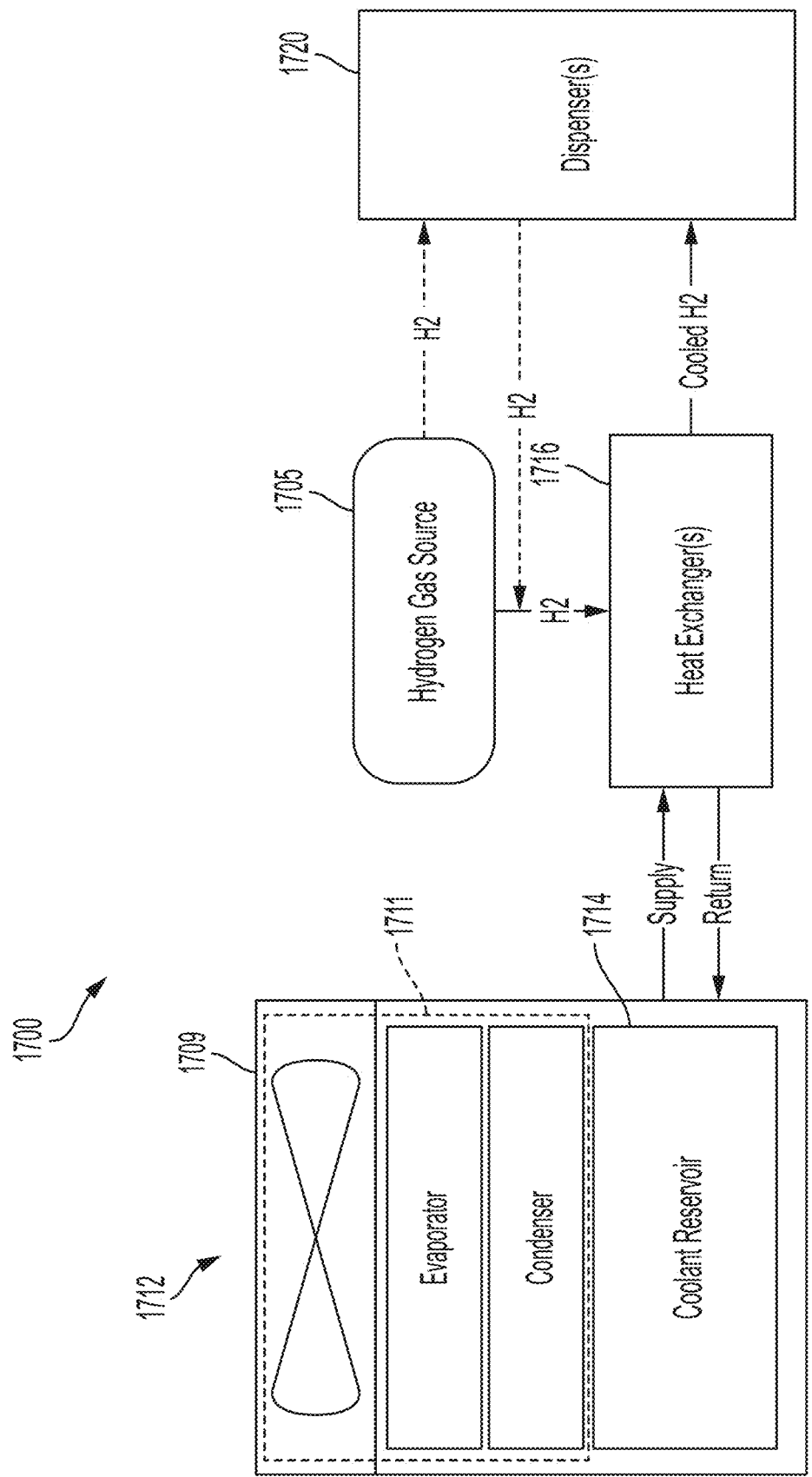
FIG. 17 illustrates a hydrogen cooling system comprising a refrigeration unit having an integrated coolant reservoir, in accordance with some embodiments.

FIG. 17 illustrates a hydrogen cooling system comprising a chiller system having a refrigeration unit and a coolant reservoir integrated in the same housing, in accordance with some embodiments. In the embodiment illustrated in FIG. 17, hydrogen cooling system 1700 comprises chiller system 1712 having a refrigeration unit 1711 and a coolant reservoir 1714 integrated in the same housing 1709. Refrigeration unit 1711 may include an evaporator and a condenser having one or more cascaded stages coupled to chill coolant held in the reservoir tank. It should be appreciated that refrigeration unit 1711 is exemplary and any suitable refrigeration unit capable of chilling coolant to target temperatures may be used, as the aspects are not limited in this respect. Chiller system 1712 may be coupled to one or more heat exchangers 1716 to provide chilled coolant via supply line(s) that can be circulated through the heat exchanger(s) to absorb heat from hydrogen gas from hydrogen gas source 1705 flowing through the heat exchanger(s) 1716 to provide chilled hydrogen gas to one or more dispensers 1720 of a fueling station. Coolant that has absorbed heat from hydrogen gas flowing through the heat exchanger(s) may then be returned to coolant reservoir 1714 and refrigeration unit 1711 can be operated to recover the temperature of the coolant reservoir, for example, using any of the techniques described below in connection with FIG. 12 for maintaining and/or recovering a target temperature of coolant in coolant reservoir 1714. According to some embodiments, one or more heat exchangers 1716 may also be integrated in housing 1709 to provide a single compact hydrogen cooling unit that can be, for example, installed on a dispenser island to provide hydrogen cooling for one or more dispensers on the island (e.g., between a pair of dispensers deployed at the dispenser island that share the hydrogen cooling system), some examples of which are described in further detail below. According to some embodiments, the hydrogen cooling system is coupled downstream of the flow control valve of the sensor so that hydrogen gas from hydrogen gas source 1705 is provided to dispenser 1720 and after flowing through the dispenser flow control valve is provided to heat exchanger 1716 and cooled hydrogen is provided to the dispenser nozzle for dispensing. This hydrogen gas flow path is illustrated by dotted lines.

As discussed above, conventional high UA hydrogen cooling systems are implemented using small-volume reservoirs (e.g., less than 50 gallons) and large-capacity refrigeration units (e.g., greater than 35 kW capacity chillers), resulting in large, expensive, high power solutions. The inventors have recognized advantages in deploying large-volume reservoirs and small-capacity refrigeration units to facilitate more compact, less expensive and/or lower power hydrogen cooling systems to provide highly flexible and scalable hydrogen cooling solutions suitable for a wide range of fueling stations and HFCV refueling (e.g., light, medium and heavy duty). A large-volume reservoir acts a thermal buffer and facilitates the use of smaller refrigeration units. The combination of a large-volume reservoir and small-capacity refrigeration unit allows for sizing of the cooling system to meet the performance needs of a particular fueling station. Hydrogen cooling systems comprising large-volume reservoirs (i.e., greater than 50 gallons, such as between 80-120 gallons for many systems, or even larger volume reservoirs such as between 500 and 700 gallons for some medium and heavy duty applications) and small-capacity refrigeration units (i.e., less than or equal to 21 kW, many configurations of which may employ 10 kW capacity refrigeration units or less) can be optimized for a range of fueling station needs, including industrial (e.g., fork lifts, off-road vehicles, etc.), light duty (e.g., passenger vehicles, etc.), medium-duty and heavy-duty (busses, cargo vans, semi-trucks, etc.) applications with fueling pressures of 0 to 87.5 MPa and fuel delivery temperatures ranging from −20-40° C., examples of which are discussed in further detail below.

Figure 12:
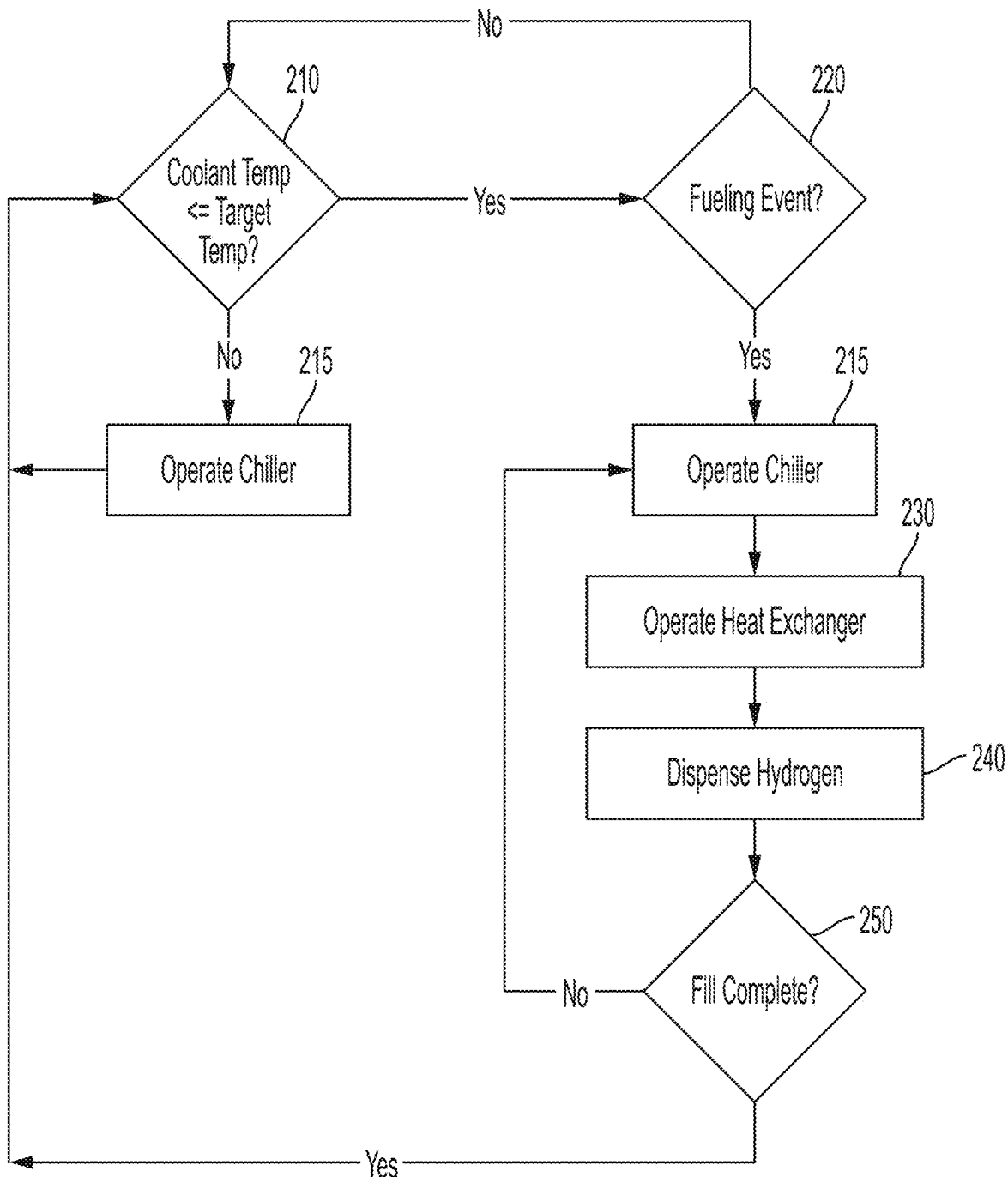
FIG. 12 illustrates an exemplary process for maintaining and recovering a target temperature of coolant in a hydrogen cooling system configured for hydrogen gas refueling, in accordance with some embodiments.

FIG. 12 illustrates an exemplary process for maintaining and/or recovering a target temperature of coolant in a hydrogen cooling system configured for hydrogen gas refueling, in accordance with some embodiments. As discussed above, a large-volume reservoir may be used to store coolant that is chilled to low temperatures to store thermal energy for use in cooling hydrogen gas for dispensing into HFCVs. The temperature of the bulk coolant in the reservoir is maintained and recovered using a small-capacity refrigeration unit that may be operated according to the exemplary process 200. In act 210, the hydrogen cooling system checks to see whether the temperature of the coolant is less than or equal to a target temperature at which the reservoir is to be maintained. Because the reservoir will lose some amount of heat even in the absence of a fill event, the hydrogen cooling system may be configured to check the temperature and operate the refrigeration unit (act 215) in the event that the coolant temperature has increased above some threshold temperature above the target temperature. The threshold temperature may be chosen appropriately to avoid excessive cycles of running the refrigeration unit throughout the day. Additionally, the threshold temperature may be a variable threshold that changes depending on information from the fueling station such as time of day, current demand, predicted demand, etc. This information may be provided by the fueling station, for example, based on information received via the vehicle communication techniques described in the foregoing.

Operating the refrigeration unit may include one or more tasks such as turning the refrigeration unit on, turning on pumps that circulate coolant through the refrigeration unit, circulating coolant through refrigeration coils, or other acts needed to engage the process of cooling the bulk coolant that may depend on the type of refrigeration unit and the type of coolant (e.g., direct refrigeration, circulation of a coolant, use of refrigeration coils, use of cryogenic gas, etc.). Operation of the chiller may continue until the bulk coolant temperature in the reservoir is sufficiently lowered (e.g., until the temperature reaches a desired target temperature). According to some embodiments, acts 210 and 215 are performed periodically in accordance with a cooling schedule based on one or more factors, based on information from the fueling station (e.g., received via vehicle communication techniques), etc.

In addition to maintenance, the chiller may also be used to recover the temperature of the bulk coolant in the reservoir after a fill event. In particular, detection of the initiation of a fueling event (e.g., when a dispenser nozzle is removed from its holder and/or engaged with a vehicle) in act 220 may result in operating the chiller (e.g., act 215 as discussed above) and operating the heat exchanger (act 230) to cool down the hydrogen gas before dispensing into the fuel tank of the vehicle. Operating the heat exchanger may include turning on pumps or other components needed to circulate coolant and pass hydrogen gas through the heat exchanger so that the coolant can absorb heat from the hydrogen gas. In act 240, chilled hydrogen gas is dispensed into the vehicle according a fueling protocol determined by communication between the dispenser and the vehicle using any of the techniques described herein. In exemplary process 200, both the refrigeration unit and the heat exchanger are operated. However, in some embodiments, the refrigeration may not be operated during or throughout a fueling event and may instead be operated after the refueling event or according to a predetermined schedule based on, for example, historic data regarding peak and low demand hours, the number of vehicles in the area that may need refueling, whether the refrigeration unit is being used to chill a different reservoir of coolant, energy costs at different times of the day and/or based on any other relevant information available to the refueling station.

After the refueling event is completed, operation of the heat exchanger may stop (e.g., pumps and/or other components may be turned off or powered down) but the refrigeration may remain operational to recover the target temperature of the bulk coolant in the reservoir (e.g., acts 210 and 215 may performed until the target temperature of the bulk coolant is recovered). As discussed above, according to some embodiments, the refrigeration may not be operated during the fueling event, but instead may be operated after the refueling event (or switched over from a different reservoir) and/or according to a cooling schedule that takes into consideration one or more factors discussed above to optimize operation of the fueling station.

It should be appreciated that the performance characteristics of process 200 (or any of the alternatives discussed above) will depend on the volume of the reservoir (e.g., the amount of heat energy the reservoir can store) and the capacity of the refrigeration unit. As discussed above, the capacity of a refrigeration unit refers to the cooling capacity (heat rejection) of the chiller and is typically measured in kilowatts, but is also frequently indicated by tonnage. Typical refrigeration units will have approximately 3.517 kW of cooling capacity (heat rejection) per ton (e.g., a 2-ton chiller would have a cooling capacity of approximately 7 kW, a 3-ton chiller would have a cooling capacity of 10.6 kW, a 5-ton chiller would have a cooling capacity of approximately 17.6 kW, etc.).

Figure 13:
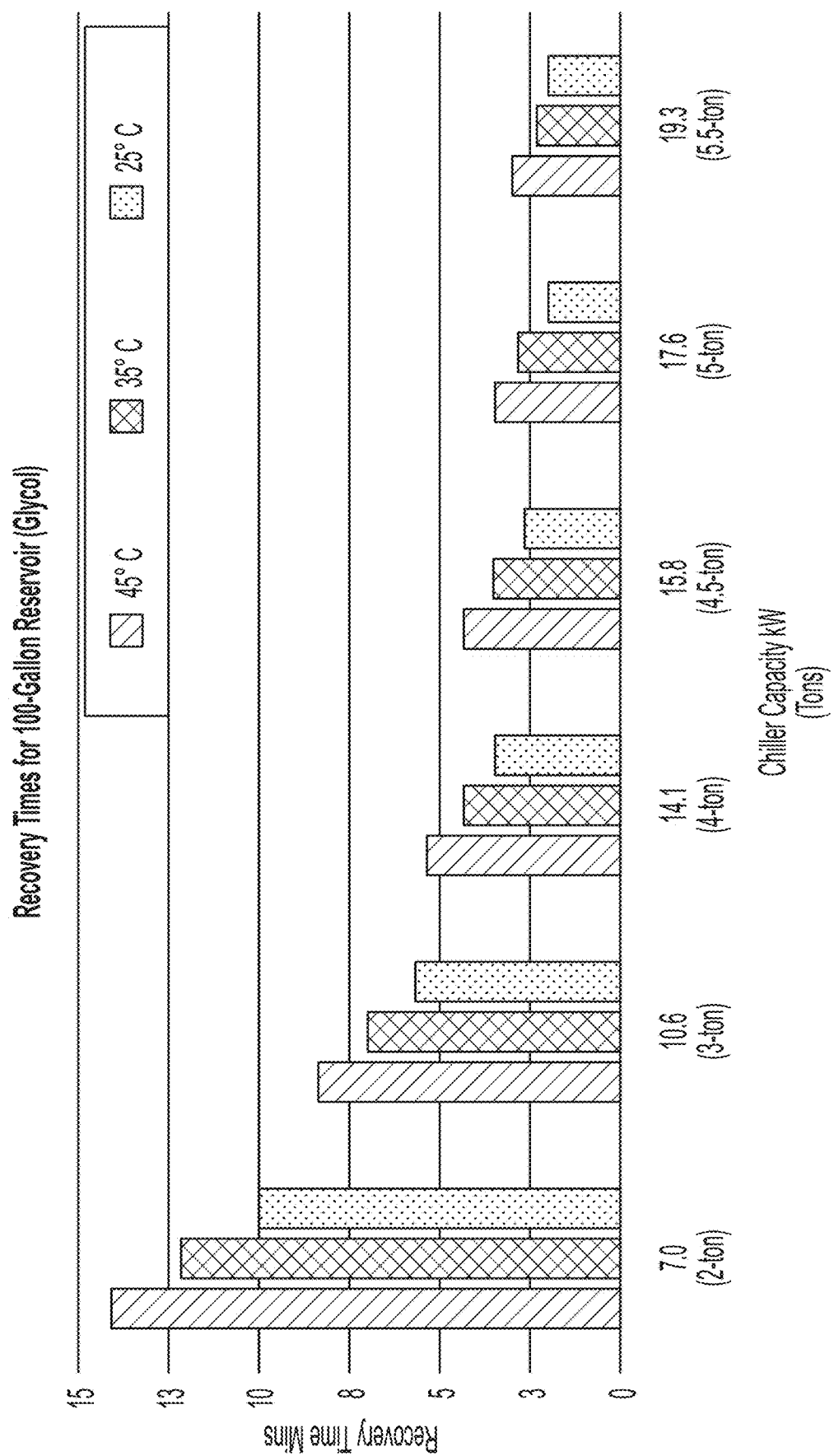
FIG. 13 is a plot of recovery times as a function of refrigeration unit (chiller) capacity at three different ambient temperatures using a 100-gallon tank as the coolant reservoir.

FIG. 13 is a plot of recovery times as a function of refrigeration unit (chiller) capacity at three different ambient temperatures using a 100-gallon tank as the coolant reservoir, which is this example holds a glycol coolant. As illustrated, by increasing the capacity of the chiller, recovery times can be reduced. The flexibility of this approach facilitates a cost-benefit analysis allowing higher performance fueling stations to be deployed at higher costs as well as lower cost installments where higher performance may not be needed. As discussed in connection with process 200 illustrated in FIG. 2, the chiller may be operated during a refueling event. In such embodiments, the bulk temperature of the reservoir undergoes recovery during the refueling event itself. For example, a 3-ton chiller for chilling hydrogen at 25° C. ambient temperature has a recovery time of just over 5 minutes. If, for example, the chiller is operated during a refueling event that takes 3 minutes to complete, the temperature of the bulk coolant may require only an additional 2 minutes of recovery time. It should be further appreciated that the bulk coolant temperature in the reservoir need not be fully recovered to the lowest target temperature before performing a subsequent refueling event. For example, for a 7 kW refrigeration unit, a first refueling event may deliver hydrogen gas at −40° C., a second back-to-back refueling event may deliver hydrogen gas at −30° C., and a third back-to-back refueling event may deliver hydrogen gas at −20° C., etc. As a result, multiple back-to-back fills can be performed before a dispenser will need to be temporarily taken offline to allow the temperature of the coolant to recover. The number of back-to-back fills that can be performed will depend on the volume of the reservoir, the capacity of the chiller (both of which can be sized to meet the demands of a particular fueling station) and the temperature class requirements of the fueling station.

As discussed above, using a large-volume reservoir as a thermal buffer allows the use of a small-capacity refrigeration unit that can be sized for average as opposed to peak load, facilitating a highly scalable cooling system that can be configured to meet the demands of fueling stations with different performance requirements. This scalability allows cooling systems that can service light, medium and heavy-duty fueling requirements at a lower cost. The large-volume reservoir and small-capacity refrigeration unit also facilitates a wide variety of configuration options such a single coolant reservoir for multiple heat exchanger/nozzle pairs, shared heat exchangers for multiple nozzles, multiple coolant reservoirs for a single refrigeration unit, etc., examples of which are described in further detail below.

As discussed above, costs may be also be reduced by replacing conventional diffusion bonded (plate-to-plate) heat exchangers with an annular heat exchanger that has been adapted to operate in the high pressure and high UA hydrogen fueling environment. By providing a lower cost high UA heat exchanger, scalability and flexibility of a hydrogen cooling system can be further improved. For example, conventional bonded heat exchangers are costly, making employing a single heat exchanger a significant expense that often renders scaling up cost prohibitive. By contrast, an annular heat exchanger can be provided at significantly reduced cost and facilitate configurations in which an annular heat exchanger may be provided for each nozzle dispenser at a fueling station, or shared between dispensers at each refueling island, examples of which are described in further detail below.

Figure 14A:
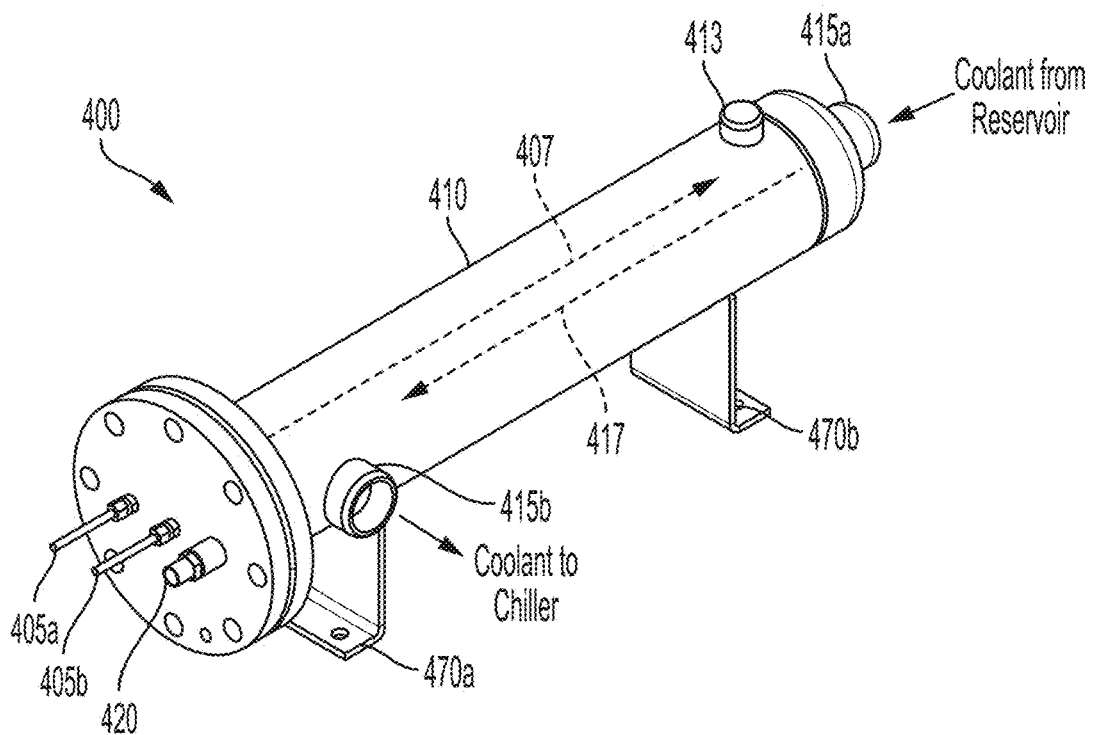
FIGS. 14A-E illustrate aspects of an annular high UA heat exchanger for hydrogen refueling using a shell-and-tube configuration, in accordance with some embodiments.
Figure 14B:
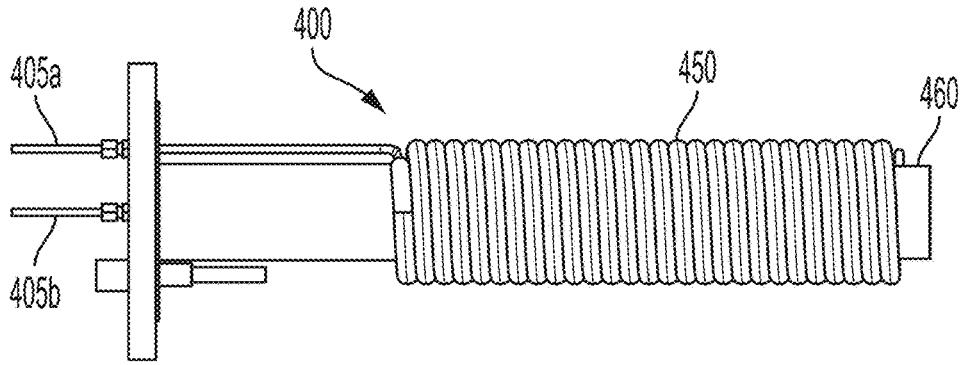

FIG. 14A illustrates an annular high UA heat exchanger for hydrogen refueling using a shell-and-tube configuration, in accordance with some embodiments. Exemplary annular high UA heat exchanger 400 comprises a shell 410 through which coolant is circulated via coolant inlet 415a and coolant outlet 415b in the direction generally indicated by arrow 417. For example, coolant from a coolant reservoir may be pumped in via inlet and 415a and returned to the reservoir or provided to a chiller via outlet 415b, depending on the configuration of the hydrogen cooling system. As shown in FIG. 14B, a coil 450 formed of a metal or metal alloy tubing (e.g., nickel, nickel alloy, copper, copper alloy or another type of alloy, etc.) is positioned within the shell through which hydrogen gas is pumped via hydrogen inlet 405a and hydrogen outlet 405b. For example, hydrogen gas from the hydrogen gas source of the fueling station may be pumped into coil 450 via inlet 405a in the direction generally indicated by arrow 407 and provided via outlet 405b to a dispenser nozzle to refuel a HFCV. As illustrated schematically by arrows 407 and 417, hydrogen gas and coolant are pumped through heat exchanger 400 in a counter-flow arrangement to facilitate heat transfer from the hydrogen gas to the coolant. Heat exchanger 400 also includes PRD port 413 to and thermocouple 420.

FIG. 14B illustrates annular heat exchanger 400 without the outer shell, illustrating the tubing of coil 450 wrapped about baffle 460. By providing the tubing with multiple turns or wraps, hydrogen gas can be pumped through a long length of tubing with significant surface area exposure to coolant flowing through the shell, allowing for high UA heat exchange in a relatively compact space. According to some embodiments, the tubing for coil 450 has a total length of between 30 and 50 feet and comprises between 20 and 35 turns or wraps. However, it should be appreciated that the number of wraps of the tubing forming coil 450 may be configured to meet the requirements of a given heat exchanger and are not limited to the exemplary values provided herein. Heat exchanger 400 also includes baffle 460 to force the coolant through a relatively tight area, increasing both the velocity and turbulence of the coolant to promote heat transfer and increase the heat transfer efficiency of the heat exchanger. Baffle 460 may be provided with a series of pilot holes to prevent air pockets or "dead zones" from forming along the baffle that could reduce the heat transfer efficiency of the exchanger.

Figure 14C:
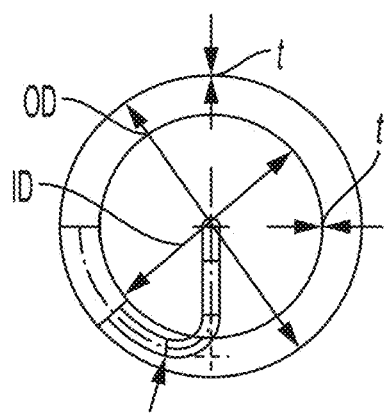

FIG. 14C illustrates a view of tubing 450 showing a turn at a inlet side of the coil to illustrate exemplary dimensions of the tubing. As shown, tubing 450 has an outer diameter OD, inner diameter ID and a wall thickness t. According to some embodiments, tubing 450 has an outer diameter of between 4.5 and 5.5 inches, an inner diameter of between 3 and 4 inches, and a thin wall thickness between 0.03 and 0.08 inches, and more preferably between 0.04 and 0.06 inches (whereas conventional wall thicknesses are on the order of 0.1 inches, which generally provides inefficient heat transfer that is generally not sufficient for hydrogen refueling without significantly increasing the length of the coil tubing) to increase heat transfer efficiency. However, the dimensions of tubing 450 may be scaled up or down and the individual parameters may be chosen to meet the requirements of a given heat exchanger and are not limited to the exemplary values described herein for the illustrative embodiments illustrated.

Figure 14D:
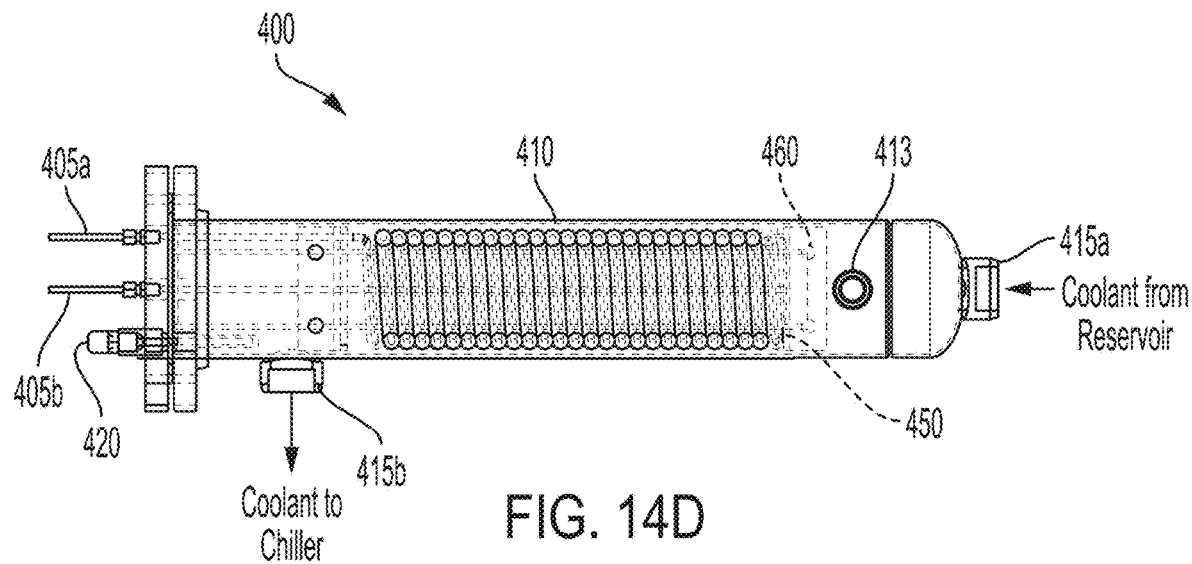
Figure 14E:
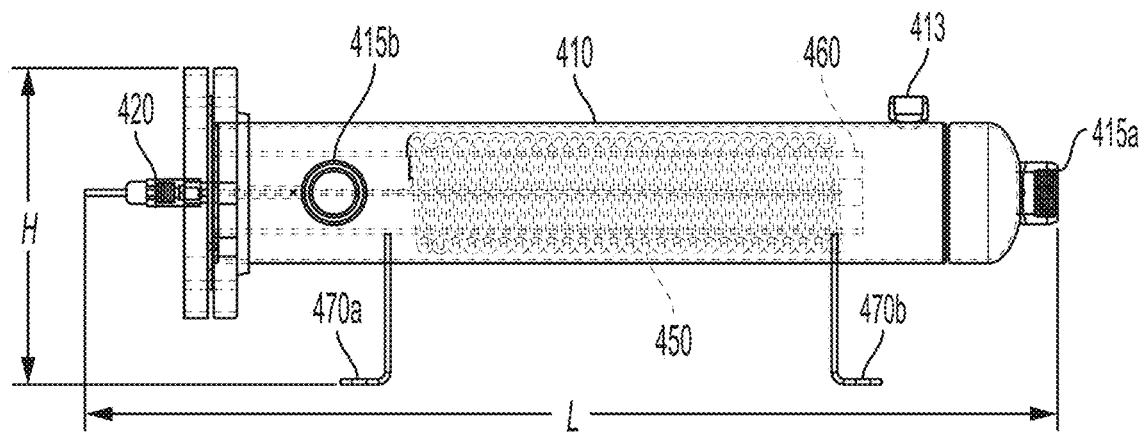

FIGS. 14D and 14E illustrate top view and a side views of heat exchanger 400, respectively, illustrating the positioning of coil 450 within shell 410 that is wrapped about baffle 460 to provide a high UA heat exchanger in accordance with some embodiments. Heat exchanger 400 has a length L and a height H (that includes the height of feet 470a and 470b). According to some embodiments, the length L may be between 30 and 50 inches (e.g., approximately 38-39 inches) and the H is between 10 and 15 inches (e.g., approximately 12-13 inches). However, the dimensions of heat exchanger 400 may be chosen to meet the requirements of a given heat exchanger and are not limited to the exemplary values described for the exemplary embodiments illustrated herein.

According to some embodiments, coil 450 is made of a material that is compatible with hydrogen and that is capable of withstanding the pressure conditions of hydrogen refueling at thin wall thickness, such as a nickel alloy or the like. For example, a nickel alloy material is resistant to corrosion and is therefore suitable for the hydrogen refueling environment. As discussed above, to increase heat transfer efficiency, coil 450 may be manufactured with a thin wall thickness (e.g., t equal to approximately 0.044 inches) to reduce the amount of material between the hydrogen and the coolant. Using a thin wall thickness facilitates a more compact design for the heat exchanger by reducing the length of tubing needed to achieve the amount of cooling. For example, conventional tube thicknesses on the order of 0.1 inches required doubling or tripling the length of the tubing needed to achieve suitable cooling for many hydrogen refueling applications. Thin wall thickness for the tubing also reduces the time to cool hydrogen to target temperatures. Hydrogen refueling applications often have short windows (e.g., approximately 30 seconds) to hit the temperature target for the hydrogen and providing a thin wall thickness for the tubing reduces the time to cool the hydrogen to target.

Figure 15:
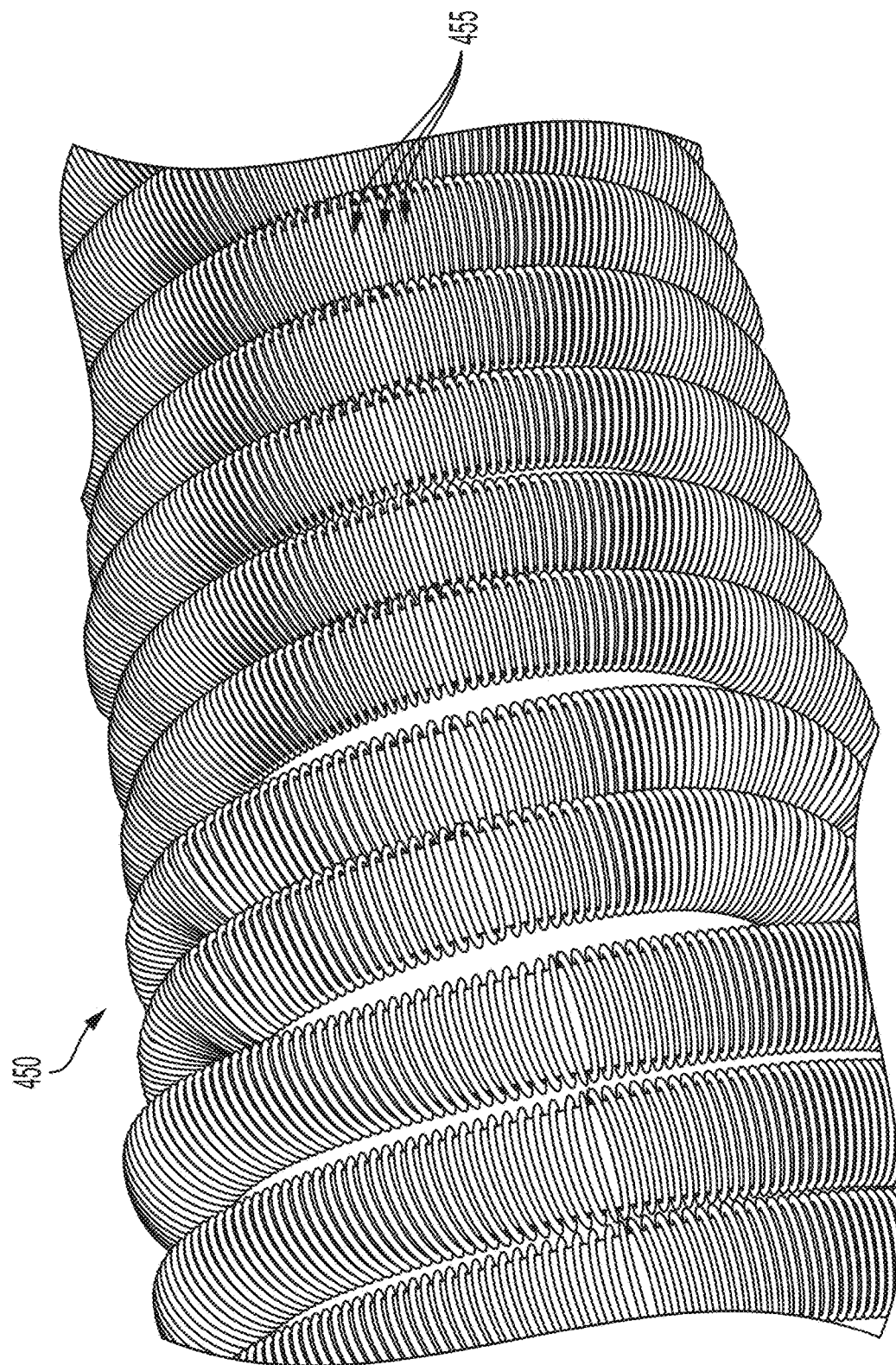
FIG. 15 illustrates a coil for an annular high UA heat exchanger that has been finned to increase the heat transfer efficiency of the coil, in accordance with some embodiments.

In addition, coil 450 may be finned to increase the surface area of the coil to substantially increase the heat transfer efficiency. FIG. 15 illustrates a coil that has been finned to create more surface area via which heat from the hydrogen gas flowing through the tubing can be transferred to the coolant flowing through the shell in which the coil is positioned (e.g., in the exemplary configuration illustrated in FIGS. 14A-E). In particular, circular or elliptical fins are attached circumferentially to provide fins about the tubing that are spaced apart along the length of the coil to provide additional surface area for heat exchange between hydrogen gas pumped through the tubing and coolant pumped through the shell. In the embodiment illustrated in FIG. 15, copper fins (e.g., exemplary copper fins 455) are attached to tubing 450 to provide a plurality of transverse fins around and in contact with the tubing at a relatively small spacing along the length of the coil. According to some embodiments, multiple fins 455 (or all of the fins) may be formed by a single continuous coil that spirals about tubing 450 to provide a finned coil for the heat exchanger. Finning coil 450 can increase the heat transfer capacity from approximately 5 kW to 75 kW, facilitating the provision of a high UA heat exchanger for hydrogen refueling.

Finning of tubing 450 may be achieved by attaching the fins to the tubing using a brazing process. The inventors recognized that high temperature brazing can result in annealing of the metal during the brazing process, thereby reducing the strength of the material resulting in the risk of rupturing during use under the high-pressure conditions of hydrogen fueling. According to some embodiments, a silver alloy braze is used that allows fins to be attached to the tubing at relatively low temperatures that prevents annealing of the metal materials during the brazing process, thereby maintaining the integrity of the coil. A silver alloy braze is also compatible with coil and fin materials, for example, nickel alloy tubing and copper fins. According to some embodiments, finning and bending of the tubing into a coil is performed during the same process. Table I illustrates materials and parameters for an exemplary coil (e.g., coil 450) for an annular high UA heat exchanger suitable for hydrogen fueling applications, in accordance with some embodiments. It should be appreciated that the materials and values given in Table I are merely exemplary and that different materials and different values may be used to provide the coil for an annular high UA heat exchanger, as the aspects are not limit to any particular choice of material, dimensions and/or values for the coil.

TABLE I

| Tubing | |
|---|---|
| Material | Nickel Alloy |
| Total Length | 35 feet |
| Coil Length | 17.375 inches |
| Number of Wraps | 27 |
| Pitch | .625 inches |
| Outer Diameter | 4.9 inches |
| Inner Diameter | 3.6 inches |
| Wall Thickness | .044 inches |
| Fin Material | Copper |
| Braze | Silver Alloy |
| Heat Transfer Capacity | 75 kW |

Figure 16A:
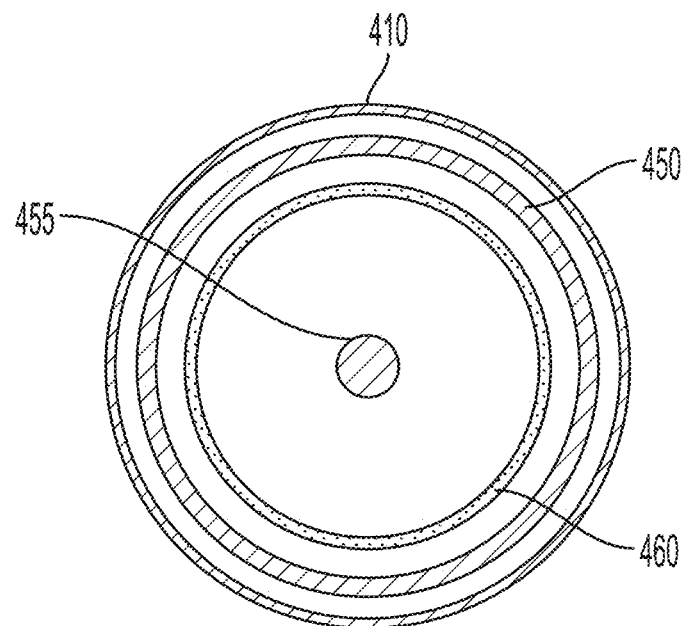
FIGS. 16A-F illustrate different configurations for an annular high UA heat exchanger, in accordance with some embodiments.
Figure 16B:
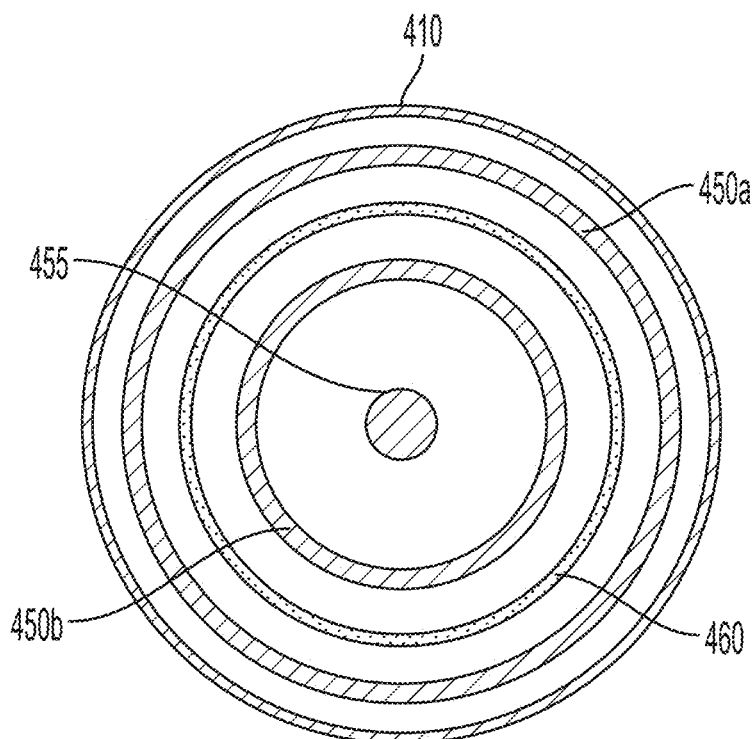

According to some embodiments, an annular heat exchanger is provided without the outer shell (FIGS. 16C, 16D) and/or without a baffle (FIGS. 16D, 16E) to facilitate different configurations of heat exchangers, examples of which are described in further detail below. FIG. 16A illustrates the cross-section of an annular high UA heat exchanger illustrating the annular configuration of heat exchanger 400 illustrated in FIGS. 14A-F. In particular, the exemplary configuration illustrated in FIG. 16A comprises outer shell 410 containing heat exchanger coil 450 positioned about baffle 460. The return tube 455 for the cooled hydrogen gas is passed through the center of heat exchanger and provided to the outlet of the heat exchanger for dispensing to the vehicle. FIG. 16B illustrates the cross-section of an annular high UA heat exchanger having an outer coil 450a and an inner coil 450b to increase the heat transfer capacity of the annular heat exchanger. The components of the heat exchanger whose cross-section is illustrated in FIG. 16B may be scaled up to provide a larger-sized heat exchanger with increased heat transfer capacity for fueling stations having higher performance requirements (e.g., fueling stations for some medium-duty or heavy-duty installations for which very high performance is needed).

Figure 16C:
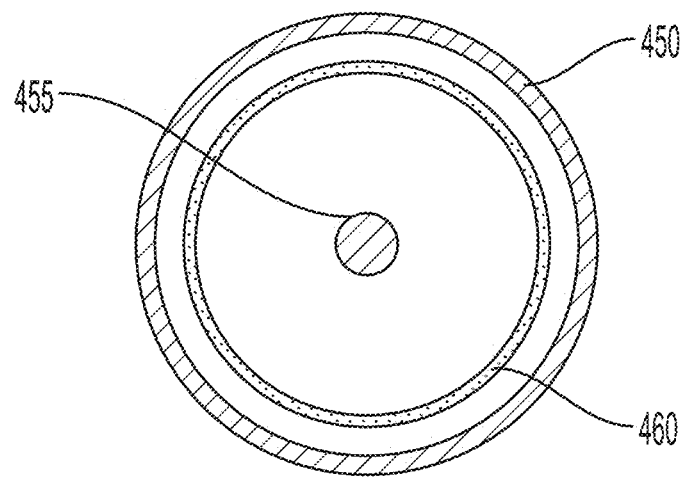
Figure 16D:
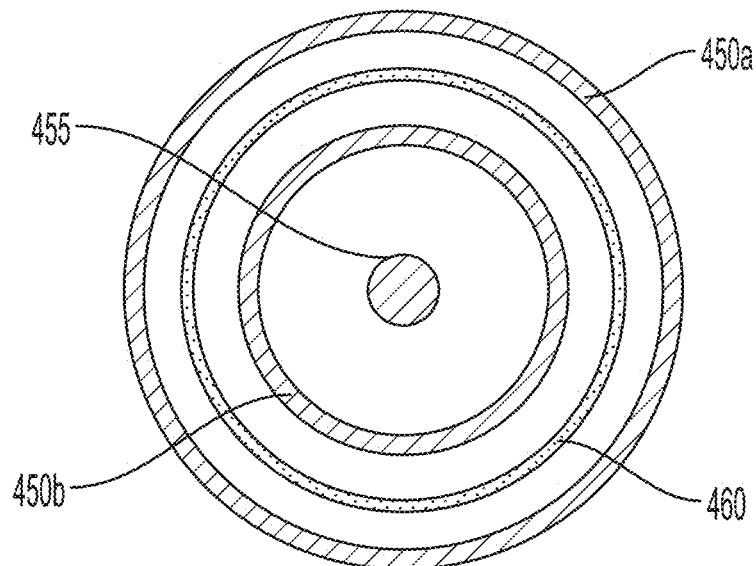
Figure 16E:
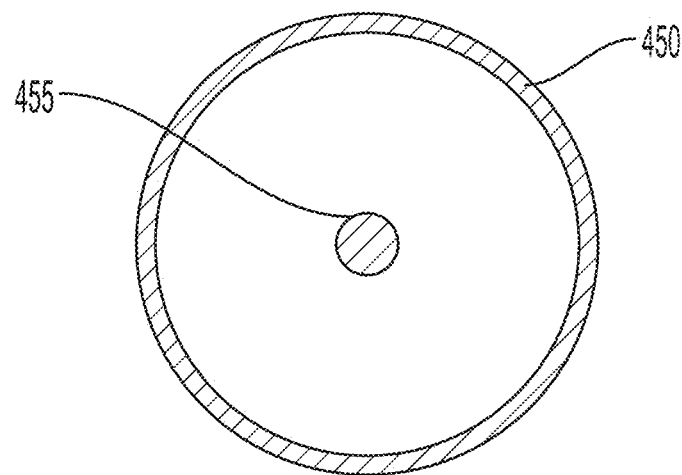
Figure 16F:
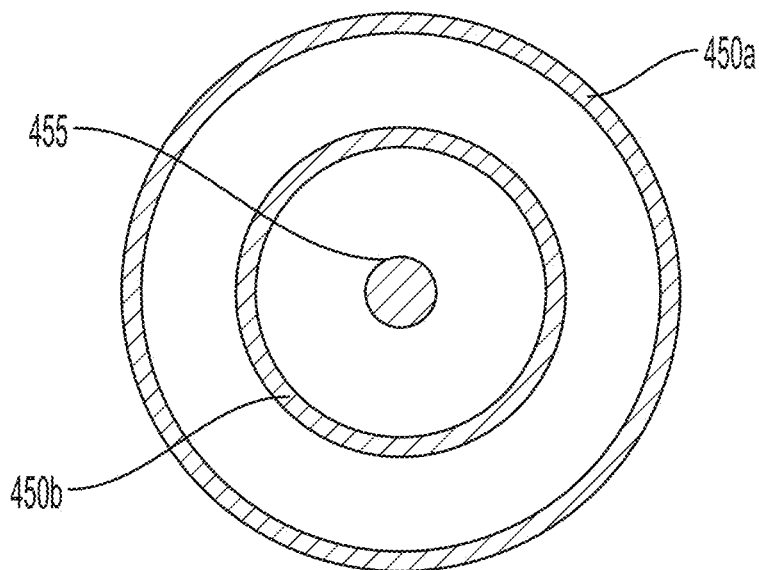

FIGS. 16C and 16D illustrate the cross-section of embodiments of annular heat exchangers without an outer shell for the single coil and multiple coil configurations, respectively. In particular, the cross-section of the annular heat exchanger illustrated in FIG. 16C comprises a coil 450 and baffle 460 with the return path 455 for the hydrogen passing through the center, and the cross-section of the annular heat exchanger illustrated in FIG. 16C comprises outer coil 450a and inner coil 450b, both implemented without an outer shell. FIGS. 16D and 16E illustrate the cross-section of embodiments of annular heat exchangers both without an outer shell and a baffle for the single coil and multiple coil configurations, respectively. In particular, the cross-section of the annular heat exchanger illustrated in FIG. 16D comprises a coil 450 with the return path for the hydrogen passing through the center, and the cross-section of the annular heat exchanger illustrated in FIG. 16E comprises outer coil 450a and inner coil 450b, both without and outer shell or baffle. It should be appreciated that multiple coil configurations may have additional coils, as the aspects are not limited to the number of coils provided. The coils may be formed using any of the techniques described above in any combination.

Figure 18:
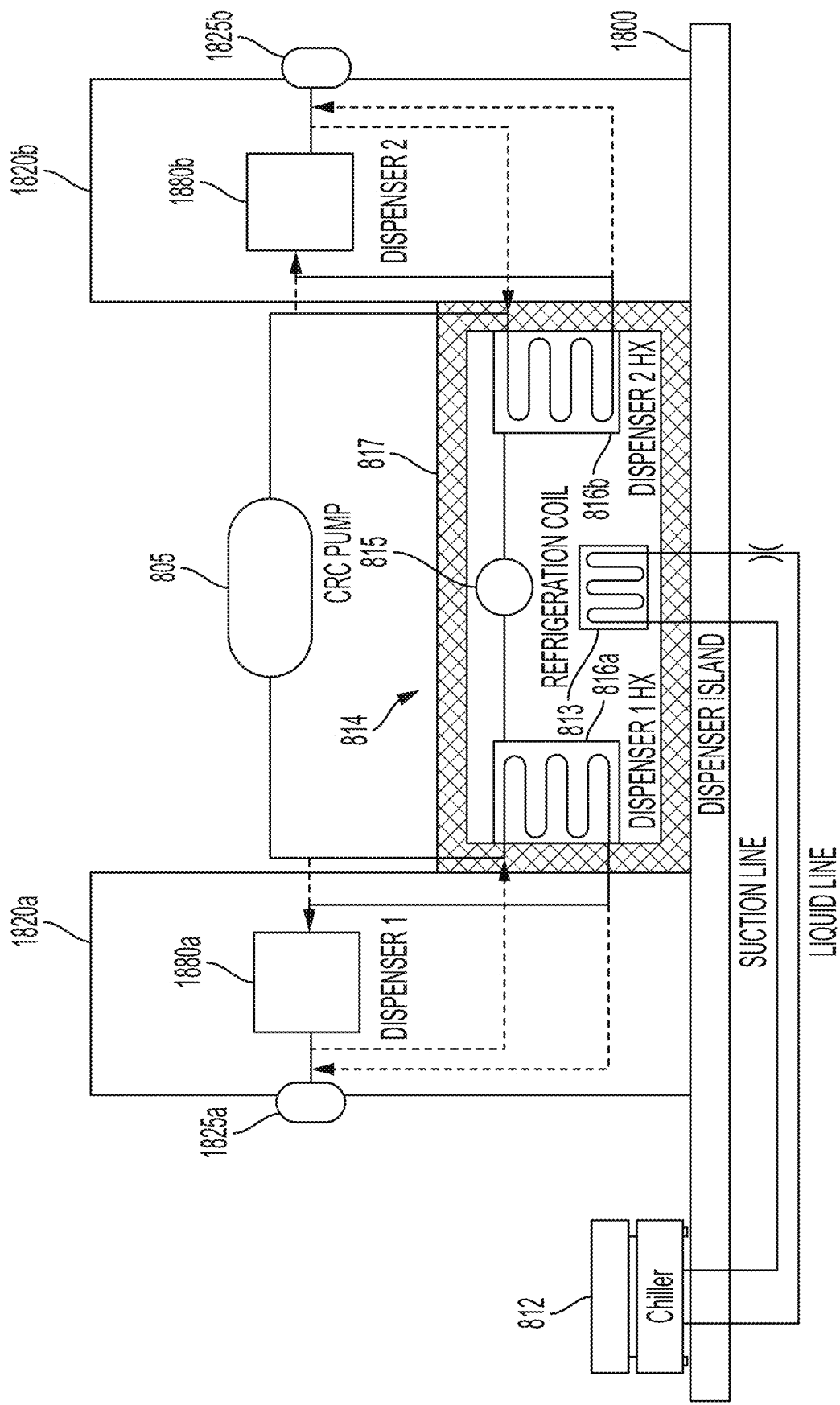
FIG. 18 illustrates a hydrogen cooling system configuration in which a refrigeration unit provides cooling to a coolant reservoir shared by multiple dispensers, each dispenser coupled to a respective heat exchanger, in accordance with some embodiments.

As discussed above, annular high UA heat exchangers facilitate reducing the cost of a hydrogen cooling system of a fueling station. Additionally, the reduced cost annular heat exchanger improves the flexibility and/or scalability of a hydrogen cooling system that can be configured to meet the needs and requirements of a given fueling station. FIG. 18 illustrates a hydrogen fueling system utilizing a hydrogen cooling system comprising a refrigeration unit configured to provide cooling for a coolant reservoir that is shared by multiple dispensers, wherein each dispenser has a respective high UA heat exchanger, which are preferably annular heat exchangers configured according to one or more techniques described in the foregoing. In particular, a dispenser island 1800 of a fueling station comprises a first dispenser 1820a and a second dispenser 1820b. A large-volume coolant reservoir 814 comprising insulated tank 817 capable of holding a large volume of coolant (e.g., a 50-600 gallon tank, and more preferably between 80-120 gallons) is positioned between the first and second dispensers to store coolant to chill hydrogen gas prior to being dispensed by dispensers 1820a and 1820b to a fuel tank of an HFCV. A single small-capacity refrigeration unit 812 (e.g., a refrigeration unit having a heat rejection capacity of between 1 kW and 21 kW, and more preferably less than 10 kW) is provided for dispenser island 1800 to maintain the coolant at low temperatures via refrigeration coil 813 (e.g., between −40° C. and −17.5° C.). Refrigeration unit 812 may be sized to handle the average load of the fueling station because the large-volume insulated tank operates as a substantial thermal buffer. For example, a fueling station with a relatively small average load may implement the hydrogen cooling system using a 1 kW capacity refrigeration unit, while a fueling station with larger average loads may implement the hydrogen cooling system using a higher capacity refrigeration unit (e.g., 3 kW, 7 kW, 10 kW, etc.) depending on the average load of the fueling station and/or on the performance requirements of the fueling station. In this way, the hydrogen cooling system can be scaled up to meet the needs of a given fueling station. According to some embodiments, the small-capacity refrigeration unit may be sized to up to 21 kW (e.g., 12 kW, 15 kW, 20 kW, etc.) and the reservoir may be sized up to 600 gallons or more for some medium or heavy-duty fueling applications.

The hydrogen cooling system further comprises an annular high UA heat exchanger for each of dispensers 1820a and 1820b. Specifically, in the exemplary embodiment illustrated in FIG. 18, annular heat exchanger 816a is fluidly coupled to dispenser 1820a and annular heat exchanger 816b is fluidly coupled to dispenser 1820b so that chilled hydrogen can be dispensed via nozzles 1825a and 1825b, respectively. To provide hydrogen gas at targeted temperatures for refueling, each heat exchanger 816a, 816b is also fluidly coupled to a hydrogen gas source 805 at the fueling station and coupled to coolant held in insulated tank 817 of coolant reservoir 814 shared by dispensers 1825a and 1825b. Coolant reservoir 815 may comprise one or more pumps 815 that circulate chilled coolant held in insulated tank 817 through the heat exchangers. One or more pumps may also be provided to pump hydrogen gas from hydrogen gas source 805 through heat exchangers 816a and 816b when respective dispenser nozzles 1825a and 1825b are engaged with the fuel tank of an HFCV for fueling and/or hydrogen gas may flow through heat exchangers 1825a and 1825b via the pressure gradient at hydrogen source 805. In the exemplary embodiment illustrated in FIG. 18, the heat exchangers are illustrated as located within the insulated tank. However, the heat exchanger may be located external to the reservoir (e.g., as illustrated in FIG. 11). Placement of the heat exchanger (e.g., internal or external to the tank) may depend on the specific design configuration of a particular fueling station, and the aspects are not limited to any particular placement of the heat exchangers.

As discussed above, heat exchanger 816a, 816b are preferably annular heat exchangers including any one or combination of features described herein. According to some embodiments, heat exchangers 816a and 816b may comprise a finned coil of tubing made of a material compatible with hydrogen (e.g., nickel alloy tubing with copper fins) designed for high heat transfer efficiency. For example, the coil of tubing may be formed with thin walls (e.g., less than 0.07 inches, and more preferably less than 0.05 inches) to facilitate a high heat transfer of capacity (e.g., a heat transfer capacity of greater than 25 kW and more preferably greater than 50 kW, such as a heat transfer capacity of approximately 75 kW or more). According to some embodiments, annular heat exchangers 816a and 816b each comprise multiple coils to increase the heat transfer capacity of the heat exchanger. It should be appreciated that heat exchangers 816a and 816b may be dimensioned in any manner suitable for the given fueling station, as the aspects are not limited to any specific annular heat exchanger design. Additionally, heat exchangers 816a and 816b may have the same or different design from one another to achieve desired dispensing characteristics of the dispenser to which it is coupled.

Hydrogen gas source 805 may be one or more hydrogen gas storage tanks shared by all of the dispensers at the fueling station, shared by a subset of the dispensers at the fueling station or may comprise multiple individual hydrogen gas storage tanks at each of the dispensers (which may in turn receive hydrogen gas from a primary hydrogen storage tank or source, or may be standalone dispenser units), as the aspects are not limited to any particular configuration for the hydrogen gas source. In the exemplary embodiment illustrated in FIG. 18, dispensers 1820a and 1820b are separate dispenser units (e.g., implemented within separate housings and separate dispenser controllers), however, according to some embodiments, dispensers 1820a and 1820b may be implemented as a single unit (e.g., within a single housing) having multiple nozzles, as the aspects are not limited in this respect. Dispenser 1820a and 1820b may be conventional dispensers or may be dispensers configured with the innovative dispenser controllers and/or valves described in further detail below. The above-described configuration provides a compact hydrogen cooling system that can be implemented on a per island basis to provide hydrogen cooling for multiple nozzles. This configuration may be repeated for each island at the fueling station. According to some embodiments, refrigeration unit 812 may be integrated in a single housing with reservoir 914 between the dispensers, may be positioned adjacent to reservoir 914, or reservoir 914 may be integrated within refrigeration unit 812 (e.g., as illustrated in FIG. 17), as the aspects are not limited in this respect. According to some embodiments, refrigeration unit 812 may be coupled to reservoirs at more than one island. It should be appreciated that the components of the hydrogen fueling system illustrated in FIG. 18 (as with all of the systems described herein) are not drawn to scale and are not intended to indicate relative sizes of the components, but rather to show the coupling and arrangement of these components.

The hydrogen cooling system may either be coupled upstream or downstream from flow control valves 1880a and 1880b of the respective dispensers. The two different hydrogen flow paths for upstream and downstream configuration are illustrated in solid and dotted lines, respectively. Specifically, as shown by the solid lines, according to some embodiments in which the hydrogen cooling system is coupled upstream of the flow control valve, hydrogen gas from hydrogen gas source 805 is provided to the inlet of heat exchangers 816a, 816b and chilled hydrogen gas from the heat exchangers is provided to flow control valves 1880a and 1880b, respectively. Chilled hydrogen gas flowing through the flow control valves is provided to nozzle 1825a and 1825b for dispensing to a vehicle during a fueling event. As shown by the dotted lines, according to some embodiments the hydrogen cooling system is coupled downstream of the flow control valve, hydrogen gas from hydrogen gas source 805 is provided to flow control valves 1880a, 1880b and hydrogen gas flowing through the flow control valves is provided to the inlet of heat exchangers 816a, 816b respectively. Chilled hydrogen gas from the heat exchangers is provided to dispenser nozzles 1825a, 1825b for dispensing to a vehicle during a hydrogen fueling event. This solid and dotted line convention is also used in the embodiments illustrated herein to illustrate that either upstream or downstream coupling of a hydrogen cooling system can be used in any configuration that utilizes a hydrogen cooling system. As used herein, when a heat exchanger is described as providing hydrogen gas to the dispenser, it refers to both upstream configurations in which hydrogen gas from the heat exchanger is provided to the dispenser upstream of the flow control valve and downstream configuration in which hydrogen gas from the heat exchanger is provided to the dispenser downstream of the flow control valve.

Figure 19:
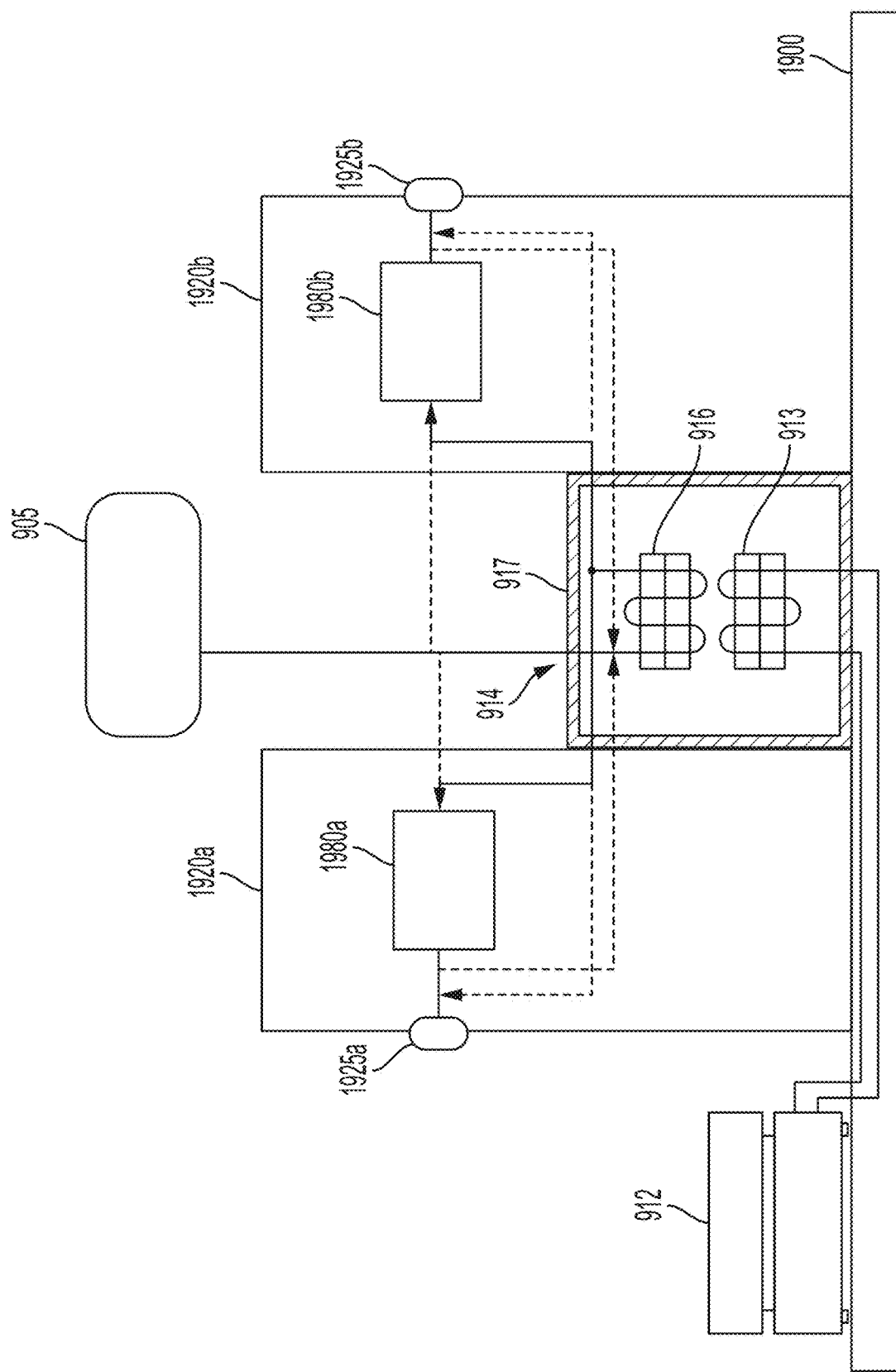
FIG. 19 illustrates a hydrogen cooling system configuration in which a refrigeration unit provides cooling to a coolant reservoir shared by multiple dispensers that share a heat exchanger, in accordance with some embodiments.

FIG. 19 illustrates a hydrogen fueling system utilizing a hydrogen cooling system comprising a refrigeration unit configured to provide cooling for a coolant reservoir that is shared by multiple dispensers, in accordance with some embodiments. The exemplary hydrogen fueling system illustrated in FIG. 19 may be similar in one or more respects to the hydrogen fueling system described in connection with FIG. 18. In FIG. 19, a small-capacity refrigeration unit 912 is provided to chill coolant (e.g., via refrigeration coil 913) held in large-volume reservoir 914 comprising insulated tank 917 shared by dispensers 1920*a* and 1920*b* on dispenser island 1900. In the embodiment illustrated in FIG. 19, dispensers 1920*a* and dispenser 1920*b* share a single heat exchanger 916. Specifically, a single heat exchanger is fluidly coupled to hydrogen source 905 and coupled to coolant held in tank 917 to chill hydrogen gas when hydrogen from hydrogen source 905 and coolant from the tank circulate through the heat exchanger. An outlet of heat exchanger 916 is fluidly coupled to both dispensers to provide chilled hydrogen to nozzles 1925*a* and 1925*b* for refueling. The individual components of the hydrogen refueling system illustrated in FIG. 19 may be implemented using any of the techniques described herein. According to some embodiments, heat exchanger 916 may be a high UA annular heat exchanger (e.g., any of the annular heat exchangers described in the foregoing) to provide a lower cost solution to chilling hydrogen). However, according to some embodiments, heat exchanger 916 may be another type of high UA heat exchanger such as a diffusion-bonded heat exchanger, as the aspects are not limited in this respect. The components of the hydrogen cooling system can be arranged apart, proximate or adjacent, in the same housing or integrated together in any of the configurations discussed in the foregoing (e.g., as described in connection with the hydrogen fueling station illustrated in FIG. 19).

Figure 20:
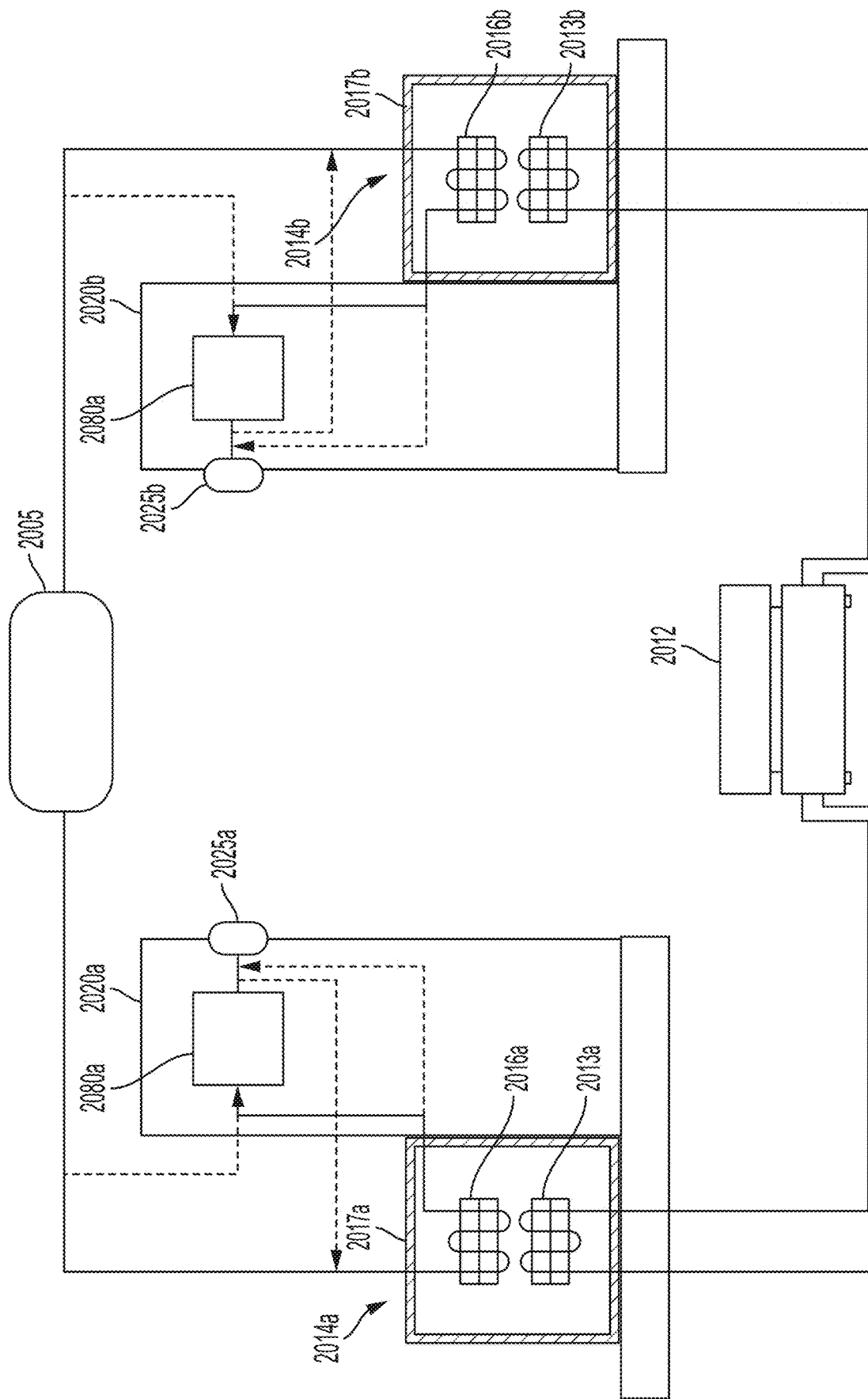
FIG. 20 illustrates a hydrogen cooling system configuration in which a refrigeration unit provides cooling to multiple coolant reservoirs and heat exchangers coupled to respective dispensers, in accordance with some embodiments.

FIG. 20 illustrates a hydrogen fueling system utilizing hydrogen cooling system comprising a refrigeration unit configured to provide cooling for a plurality of coolant reservoirs corresponding to respective dispensers, in accordance with some embodiments. The exemplary hydrogen fueling system illustrated in FIG. 20 may comprise individual components that are the same as or similar to the components described in connection with FIGS. 18 and 19 that are sized appropriately for the configuration illustrated in FIG. 20. In this configuration, a small-capacity refrigeration unit 2012 is coupled to a first coolant reservoir 2014*a* comprising insulated tank 2017*a* and a second coolant reservoir 2014*b* comprising insulated tank 2017*b*, each coolant reservoir servicing a respective dispenser 2020*a* and 2020*b*. Each of dispensers 2020*a* and 2020*b* has its own heat exchanger 2016*a*, 2016*b* (preferably of the annular heat exchanger type), respectively, to chill hydrogen gas from hydrogen source 2005 and provide the chilled hydrogen to respective dispenser nozzle's 2025*a* and 2025*b*.

As discussed above, it should be appreciated that the exemplary hydrogen fueling systems shown in FIGS. 18-20 are illustrated schematically and the relative sizes of the components are not drawn to scale but are intended instead merely illustrate a set of components and coupling therebetween to illustrate an exemplary configuration using one or more aspects of the techniques developed by the inventors to implement a flexible and highly scalable hydrogen cooling system for a wide range of hydrogen fueling applications from light duty to medium and heavy duty deployments. It should be further appreciated that the small-capacity refrigeration unit, large-volume coolant reservoir and high UA heat exchanger combination of components is amenable to other configurations suitable for a given fueling station and that the components can be sized and configured as discussed herein to scale up or down to meet the performance requirements of a particular fueling station installment.

As discussed above, the inventors have further appreciated that the thermal energy capacity of a hydrogen cooling system may be increased by using phase change materials (PCM) as a coolant, either alone or in conjunction with one or more other coolants. As also discussed above, phase change materials store energy when cooled so that the material transitions from one state to another (e.g., from a liquid to a solid, or from a gas to a liquid) that can be released upon when the material is heated so as to transition back to the previous state (e.g., from a solid to a liquid, or from a liquid to a gas). As a result, heat transferred from hydrogen gas during the chilling process for a fueling event goes into state change rather than heating up the material. Thus, a PCM coolant can be used like a thermal battery that can be "charged-up" by causing it to transition from its ambient temperature state to its low temperature state, and that stored thermal energy can be released as the PCM absorbs heat from hydrogen gas (or another coolant that has absorbed heat from hydrogen gas) that goes into changing the state of the PCM back to its ambient temperature state. Therefore, a reservoir of PCM material can absorb more heat from hydrogen gas (or another coolant that has absorbed heat from hydrogen gas) without increasing its temperature, allowing for longer periods of continuous hydrogen chilling without needing to recover the temperature of the PCM and/or other coolant in the reservoir.

In addition, PCM material provides better thermal control over the hydrogen gas because it will maintain the temperature of its low temperature state transition until the material has transitioned back to its ambient temperature state. As discussed above, back-to-back fills (i.e., without a recovery period) using conventional coolants result in increasingly higher temperature hydrogen gas fills until the maximum temperature at which hydrogen gas can be dispensed is reached and no further fueling can take place until the refrigeration unit recovers the target temperature of the coolant in the reservoir. Because the temperature of the PCM will be maintained at its low temperature state transition temperature, back-to-back fills can be performed at that temperature until the PCM has been thoroughly transitioned to its ambient temperature state.

The inventors have recognized that PCMs can therefore be used to optimize the hydrogen cooling system for specific hydrogen fueling needs in a number of ways, including increasing the number of back-to-back fills that can be performed, reducing the size of the coolant reservoir, reducing the size of the refrigeration unit (which can be operated during the night or other off-peak hours when demand is low and/or energy is cheaper to bring the PCM to its low temperature state), or some combination of the above, as discussed in further detail below.

Figure 21:
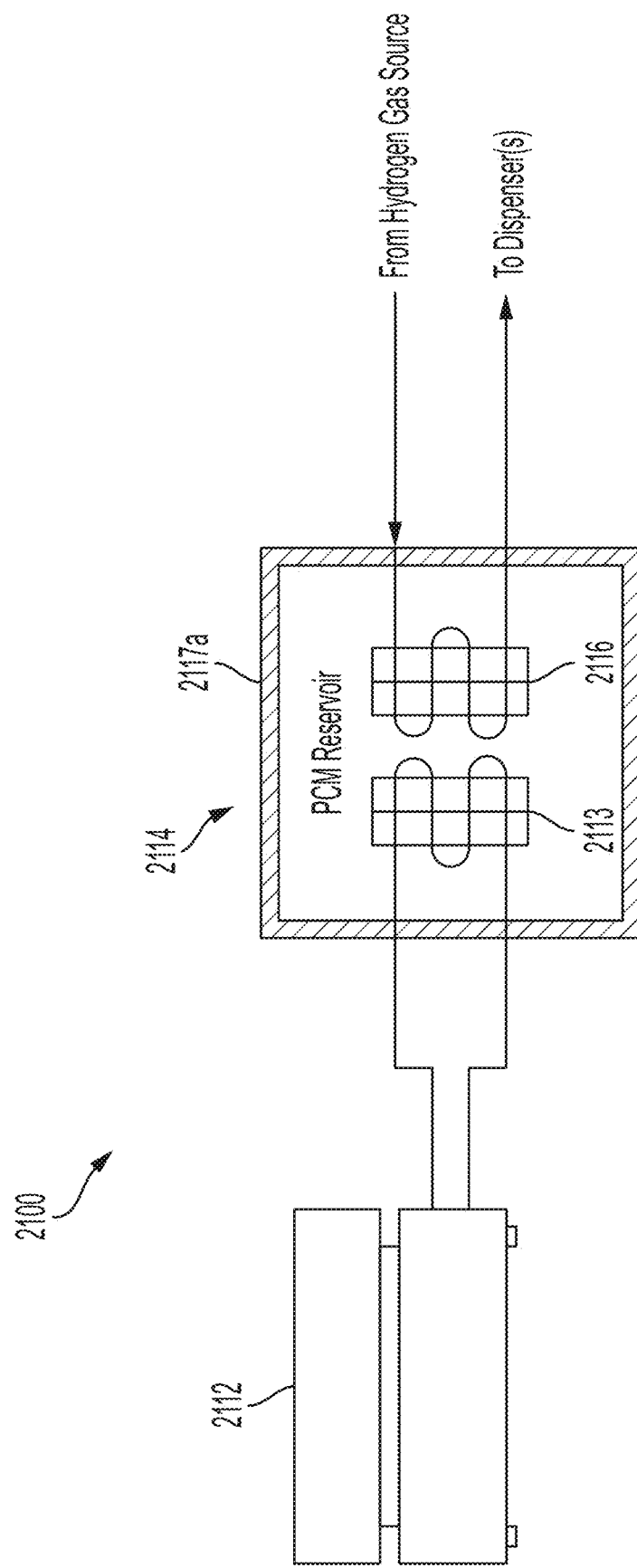
FIG. 21 illustrates a hydrogen cooling system utilizing phase change material (PCM) to increase the thermal energy capacity of a coolant reservoir, in accordance with some embodiments.

FIG. 21 illustrates an example a hydrogen cooling system using a PCM as a coolant to chill hydrogen gas, in accordance with some embodiments. Hydrogen cooling system 2100 comprises a refrigeration unit 2112 that chills coolant stored in a reservoir 2114 comprising insulated tank 2117 to hold PCM coolant, components that may be similar or the same as, or different from, those described in the foregoing and that, in accordance with some embodiments, can be optimally sized in different ways as a result of the use of PCM. Refrigeration unit 2112 is configured to chill the PCM coolant to a temperature that causes the PCM to transition to its low temperature state, e.g., via refrigeration coil 2113 or via any other refrigeration techniques, thereby storing energy by the transition of the PCM to its low temperature state.

According to some embodiments, the PCM's low temperature state is as a solid so that refrigeration unit 2112 freezes the PCM material to bring the reservoir down to the target temperature. In such embodiments, heat exchanger 2116 may be an annular heat exchanger comprising one or more coils according to techniques described herein, but with no outer shell (e.g., as shown in the exemplary configurations illustrated in FIGS. 16C-F. In such a configuration, the coil(s) of heat exchanger 2116 may be positioned within the reservoir in contact with the PCM that in the low temperature state will form a solid mass about the coil to absorb heat from hydrogen gas provided by a hydrogen gas source to an inlet of the heat exchanger to provide chilled hydrogen gas to one or more dispensers of a fueling station. As discussed above, the use of a PCM reservoir allows an increased number of back-to-back fills to be achieved without increasing the temperature of the PCM due to the increased thermal capacity of the PCM (i.e., absorbed heat energy goes into changing the state of the PCM instead of increasing its temperature). The increased thermal capacity of the PCM reservoir also allows the volume of the reservoir to be reduced and/or the capacity of the refrigeration unit 2112 to be reduced, thereby providing a more compact and/or less expensive hydrogen cooling system. According to some embodiments, the PCM is a eutectic compound (e.g., a mixture of materials) that has a state transition at approximately the temperature of the lowest temperature class fill at which the dispenser is configured to dispense hydrogen gas (e.g., approximately −40° C. for T40 class fills). However, it should be appreciated that such PCMs may be chosen to have other low temperature state transitions (e.g., less than −10° C., less than or equal to −20° C., less than or equal to −30° C., less than or equal to −40° C., etc.), as the aspects are not limited in this respect.

With respect to the refrigeration unit 2112, because the PCM reservoir does not need to be brought back to the target temperature as frequently, a smaller capacity refrigeration unit can be utilized and operated relatively infrequently when the PCM reservoir needs to be brought back to its low temperature state. For example, the refrigeration unit may be operated overnight or during off hours (e.g., when energy is cheaper), when substantially all of the PCM has transitioned to its ambient temperature state (e.g., before or after the temperature of the ambient PCM has reached a temperature in which no further low temperature fills can be performed) and/or when the fueling station determines recovering the temperature and/or low temperature state of the PCM is needed via the vehicle communication techniques described above. The above described benefits (increasing the back-to-back fill capacity, reducing the volume of the reservoir, reducing the capacity of the refrigeration unit, increasing the number of reservoirs coupled to the refrigeration unit and/or increasing the number of dispenser nozzles sharing the reservoir) can be used in any combination, thus providing a highly flexible and modular hydrogen cooling system that can meet the needs of a wide variety of fueling stations, including providing different configurations of components for different dispenser islands within the same fueling station, providing multiple independent hydrogen cooling systems within the same fueling station, or a single hydrogen cooling system configured for light, medium or heavy duty refueling needs.

The inventors have further recognized that PCMs can be used in combination with conventional coolants in a variety of ways to take advantage of the increased thermal capacity of PCMs. According to some embodiments, a dual-stage hydrogen cooling system is provided comprising a bulk PCM reservoir for storing a PCM to chill hydrogen gas from a hydrogen source to a first temperature and a polishing reservoir for storing a conventional (non-PCM) coolant (e.g., glycol) to chill hydrogen gas from the bulk PCM reservoir to a second temperature for dispensing to a HFCV during a fueling event. According to some embodiments, a coolant reservoir combines a conventional coolant and a PCM material to take advantage of the increased thermal capacity of the PCM when brought to its low temperature state. According to some embodiments, a PCM is integrated into the heat exchanger (e.g., within a baffle of annular heat exchanger) configured to also circulate a conventional coolant to chill hydrogen gas via both the integrated PCM and the circulated conventional coolant. Examples of hydrogen cooling systems utilizing one or more these techniques is discussed in further detail.

Figure 22:
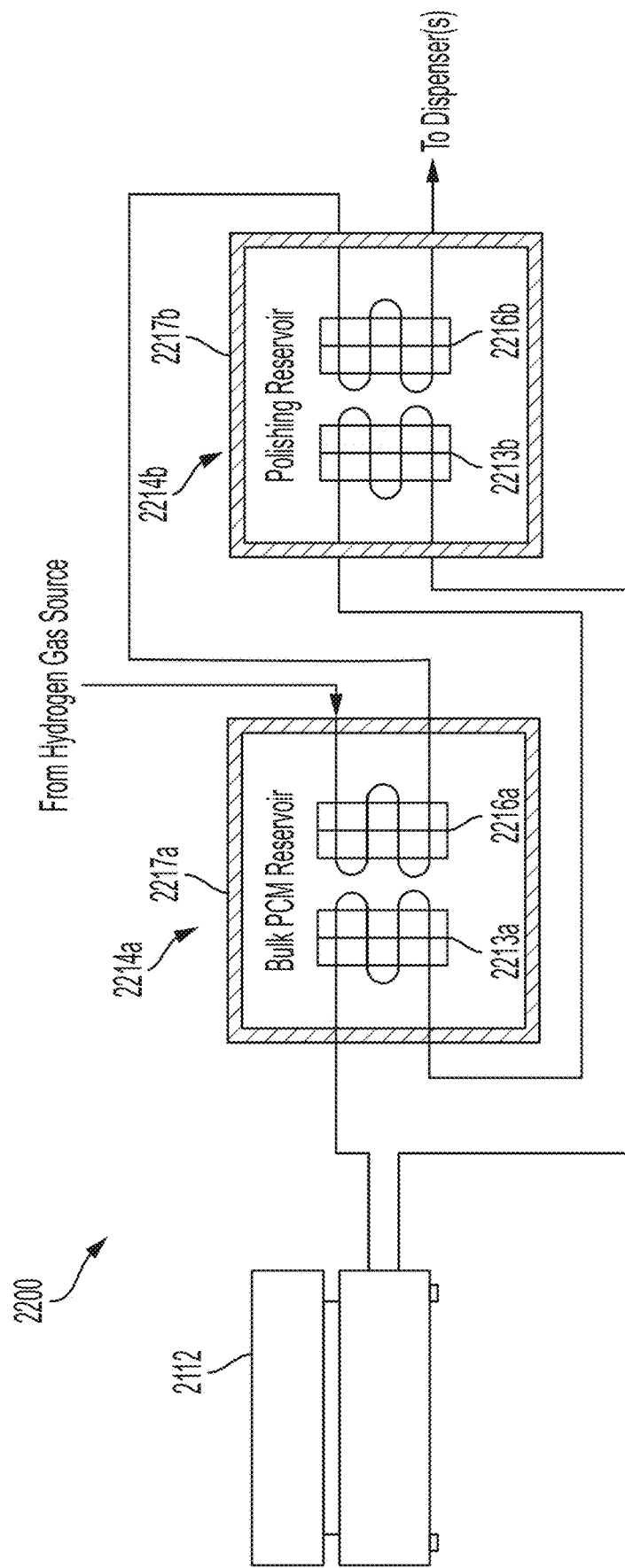
FIG. 22 illustrates a dual-stage hydrogen cooling system comprising a bulk PCM reservoir and a polishing reservoir, in accordance with some embodiments.

FIG. 22 illustrates an exemplary dual-stage cooling system comprising a bulk PCM reservoir 2214a that includes an insulated tank 2217a for storing a PCM having a phase change at a first temperature (e.g., between −20° C. and −10° C., between −10° C. and 0° C., etc.), and a polishing reservoir 2214b that includes an insulated tank 2217b for storing a conventional coolant. In the exemplary embodiment illustrated in FIG. 22, a refrigeration unit 2112 is coupled to PCM reservoir 2214a to chill the PCM to cause a phase change of the PCM (e.g., via refrigeration coil 2213a) at the first temperature, and the refrigeration unit 2112 is also coupled to polishing reservoir 2214b to chill the conventional coolant to a target temperature for hydrogen gas dispensing (e.g., via refrigeration coil 2213b). Bulk PCM reservoir 2214a may further comprise annular heat exchanger 2216a coupled to receive hydrogen gas from a hydrogen source (which may either be a hydrogen gas storage tank or a dispenser depending on whether hydrogen cooling is coupled upstream or downstream of the dispenser flow control valve) and provide chilled hydrogen at the first temperature via heat exchange between the hydrogen gas and the PCM as the hydrogen gas flows through one or more coils of heat exchanger 2216a. A second annular heat exchanger 2216b may be coupled to coolant held by polishing reservoir 2214b and hydrogen gas provided by annular heat exchanger 2216a to chill the hydrogen gas from the first temperature to a target temperature for dispensing to an HFCV. Second annular heat exchanger may be deployed internal to polishing reservoir 2214b or may be deployed external to the polishing reservoir as discussed in the foregoing.

Annular heat exchanger 2216a may be formed using one or more coils using any of the techniques described above so that the one or more coils are thermally coupled to the PCM (e.g., in contact with the PCM), for example, using the annular configurations illustrated in FIGS. 16C-F that do not include an outer shell. Thus, for exemplary dual-stage hydrogen cooling system 2200, a first stage chills hydrogen gas from hydrogen gas source to a first intermediate temperature between the temperature of the stored hydrogen gas at the source and the target temperature for dispensing to a HFCV, and a second stage chills hydrogen gas from the intermediate temperature to the target temperature for dispensing. The use of a bulk PCM reservoir for chilling hydrogen to an intermediate temperature allows generally less expensive PCMs to be used and allows for flexibility in the choice of PCM. Because polishing reservoir need only reduce the temperature of hydrogen gas from the intermediate temperature to the target temperature rather than all the way from the temperature of the hydrogen gas from the hydrogen source, each fueling event requires less energy to cool the hydrogen gas, reducing the temperature increase of the coolant from each fill, thereby decreasing recovery times and increasing the back-to-back fill capacity of the hydrogen cooling system.

In the exemplary embodiment illustrated FIG. 22, a single refrigeration unit is employed to chill both the bulk PCM reservoir and the polishing reservoir. However, according to some embodiments, different refrigeration units are used to chill the bulk PCM reservoir and the polishing reservoir, respectively, or different stages of a multi-stage (e.g., cascaded) refrigeration unit may be used to chill the different stages of the hydrogen cooling system. Additionally, it should be appreciated that the coupling of the refrigeration unit 2112 to the reservoirs illustrated in FIG. 22 is schematic to illustrate that refrigeration unit 2112 provides refrigeration for both reservoirs, but that refrigeration unit 2112 may be coupled to stages of the hydrogen cooling system so that the reservoirs can be chilled independently of one another. For example, refrigeration unit 2112 may be independently coupled to bulk PCM reservoir 2214a and polishing reservoir 2214b so that the stages can be independently cooled. Because bulk PCM reservoir 2214a may only need to infrequently recover the low temperature state of the PCM, it may be advantageous to be able to chill the bulk PCM reservoir and the polishing reservoir independently. According to some embodiments, the stages of the hydrogen cooling system may be chilled simultaneously, as the aspects are not limited in this respect.

According to some embodiments, a single bulk PCM reservoir provides intermediate cooling for multiple polishing reservoirs. For example, a single bulk PCM reservoir may provide intermediate cooling for a plurality of polishing reservoirs where each of the plurality of polishing reservoirs are shared by multiple dispensers of a dispenser island, or where each of the plurality of polishing reservoirs is used by a single respective dispenser. The flexibility of dual-stage hydrogen cooling systems allows for many different configurations and optimizations for both the sizing of the one or more refrigeration units and for the volume of both the PCM reservoir and the one or more polishing reservoirs to meet the needs of a particular fueling station. It should be appreciated that the use of a multi-stage cooling system can be implemented in other configurations and the aspects are not limited to any particular configuration, combination of elements and/or types of PCM and conventional coolants.

Figure 23:
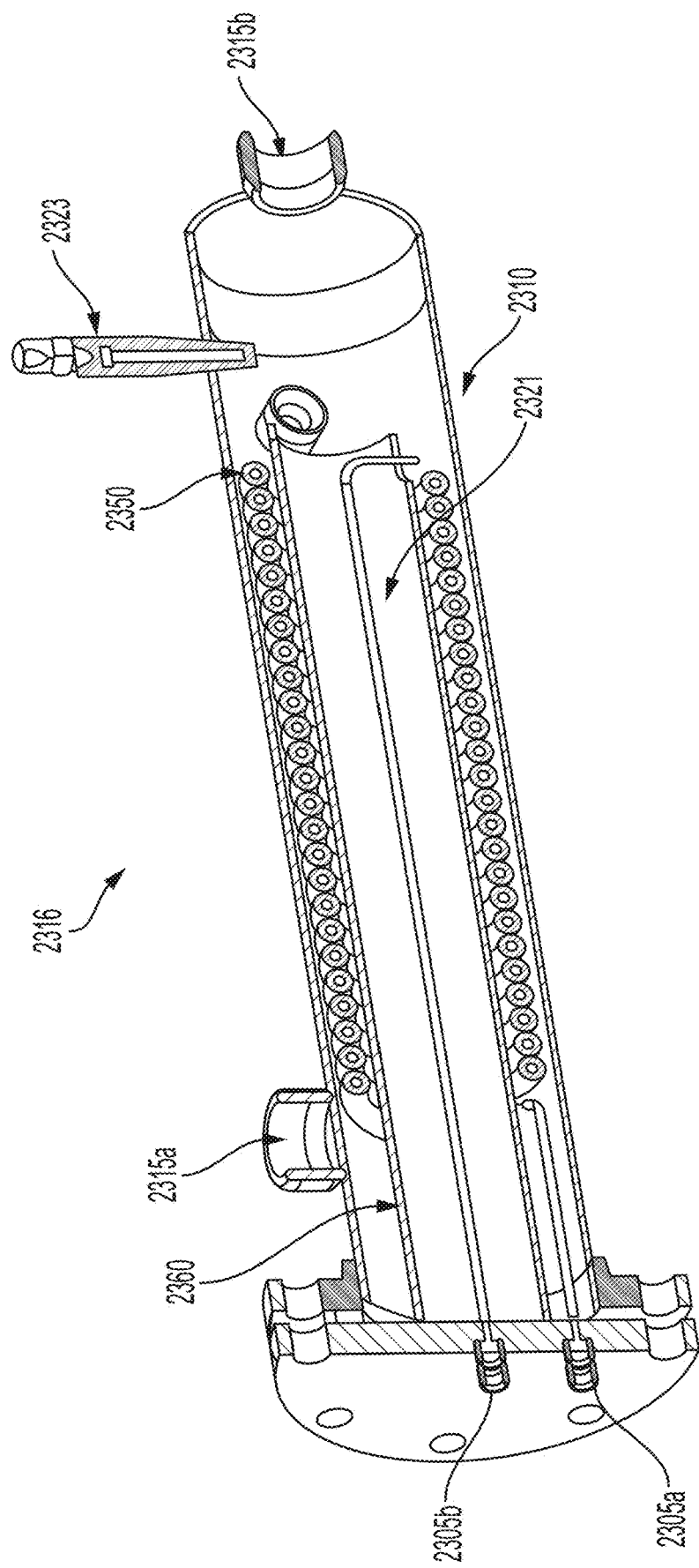
FIG. 23 illustrates an annular heat exchanger configured to hold PCM for hydrogen cooling, in accordance with some embodiments.

FIG. 23 illustrates an exemplary annular heat exchanger configured to hold a PCM internally to take advantage of the increased thermal capacity of PCMs to chill hydrogen flowing through one or more coils of the heat exchanger, in accordance with some embodiments. Annular heat exchanger 2316 may share similar aspects to the annular heat exchangers described in connection with FIGS. 14D-E and 15. Specifically, exemplary annular heat exchanger 2316 comprises an outer shell 2310 through which coolant can be circulated via coolant inlet 2315a and coolant outlet 2315b, and an inner coil 2350 (e.g., a finned coil of tubing) through which hydrogen gas can be circulated via hydrogen inlet 2305a and hydrogen outlet 2305b. For annular heat exchanger 2316, inner portion 2360 is configured to hold a PCM material 2321 (e.g., a baffle may be configured to store PCM) such that inner coil 2350 is thermally coupled to PCM 2321 when the inner portion 2360 contains the PCM. As a result, hydrogen gas flowing through coil 2350 transfers heat to both conventional coolant circulating through the heat exchanger and PCM 2321 held internally. It should be appreciated that PCM may be held internal to the heat exchanger in other ways, as the aspects are not limited in this respect.

Figure 24:
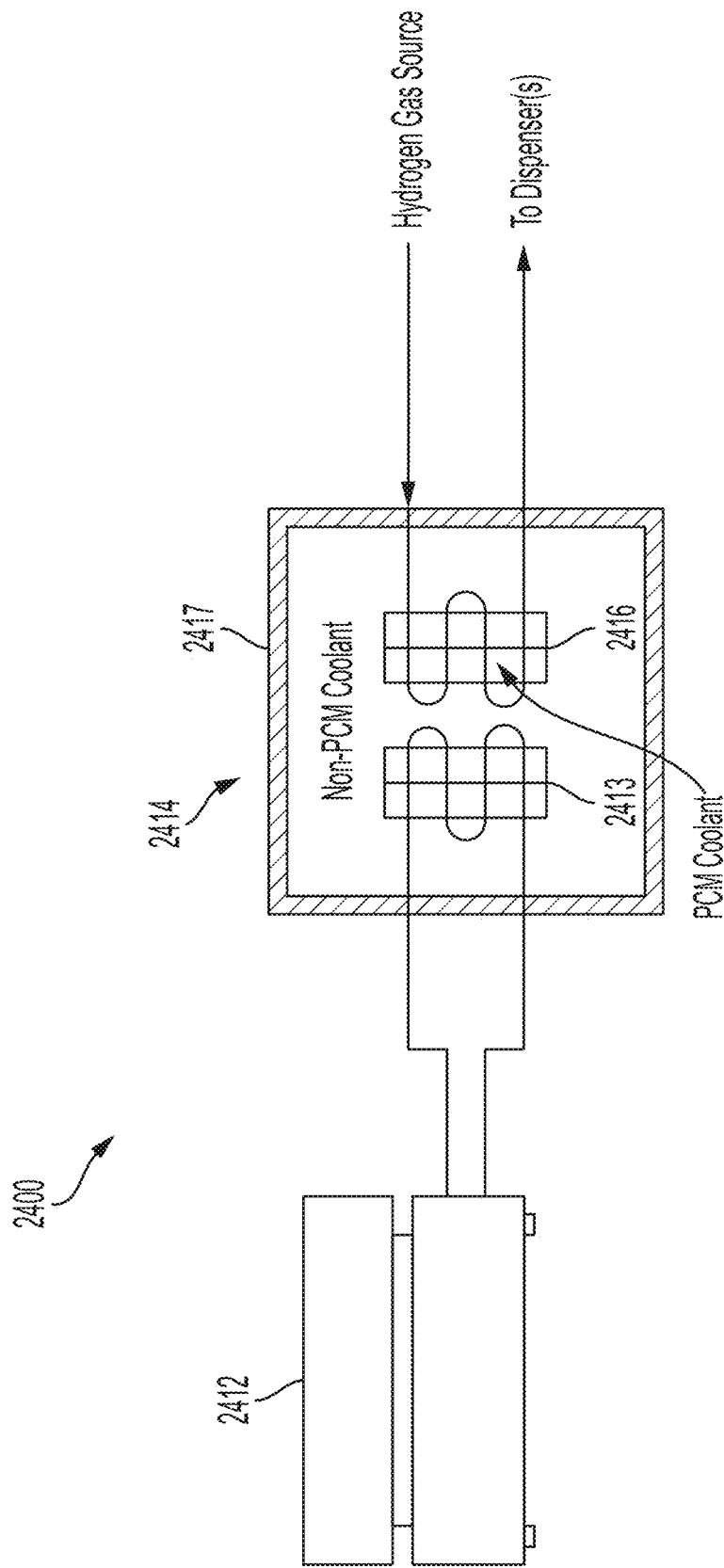
FIG. 24 illustrates a hydrogen cooling system utilizing annular heat exchanger configured to hold PCM for hydrogen cooling, in accordance with some embodiments.

FIG. 24 illustrates an exemplary hydrogen cooling system that utilizes an annular heat exchanger of the type described above in connection with FIG. 23, in accordance with some embodiments. In particular, hydrogen cooling system 2400 comprises reservoir 2414 that includes insulated tank 2417 configured to hold a conventional non-PCM coolant. Hydrogen cooling system 2400 further comprises annular heat exchanger 2416 configured to hold a PCM material, for example, using an inner portion of the heat exchanger as described in connection with heat exchanger 2316 illustrated in FIG. 23. Heat exchanger 2416 may be coupled to receive hydrogen gas from a hydrogen gas source via an inlet to one or more coils of the heat exchanger, and further coupled to receive non-PCM coolant from the reservoir to circulate the coolant through the heat exchanger to absorb heat energy from the hydrogen gas flowing through the coil.

Refrigeration unit 2412 may be coupled to reservoir 2414 to chill the non-PCM coolant in insulated tank 2417 (e.g., via refrigeration coil 2413 or other refrigeration techniques) and the PCM within heat exchanger 2416. When hydrogen gas and coolant are pumped through heat exchanger 2416, heat from the hydrogen gas is absorbed by the coolant and the PCM held internal to the heat exchanger. As such, the heat transfer load of a fueling event will be shared by the PCM and non-PCM coolants, resulting in a reduction in the temperature increase of the non-PCM coolant in the reservoir. Therefore, the exemplary PCM technique used by hydrogen cooling system can be used to increase the back-to-back fill capacity of the fueling system, decrease the recovery time of the coolant reservoir, allow for a reduction in the size of the refrigeration unit and/or volume of the reservoir, or facilitate an optimization that achieves some combination of these benefits. It should be appreciated that exemplary hydrogen cooling system 2400 may be used in any of the variety fueling system configurations described herein (e.g., the hydrogen fueling systems illustrated in FIGS. 18-21) allowing for further optimization and customization of the resulting hydrogen fueling system.

Figure 25:
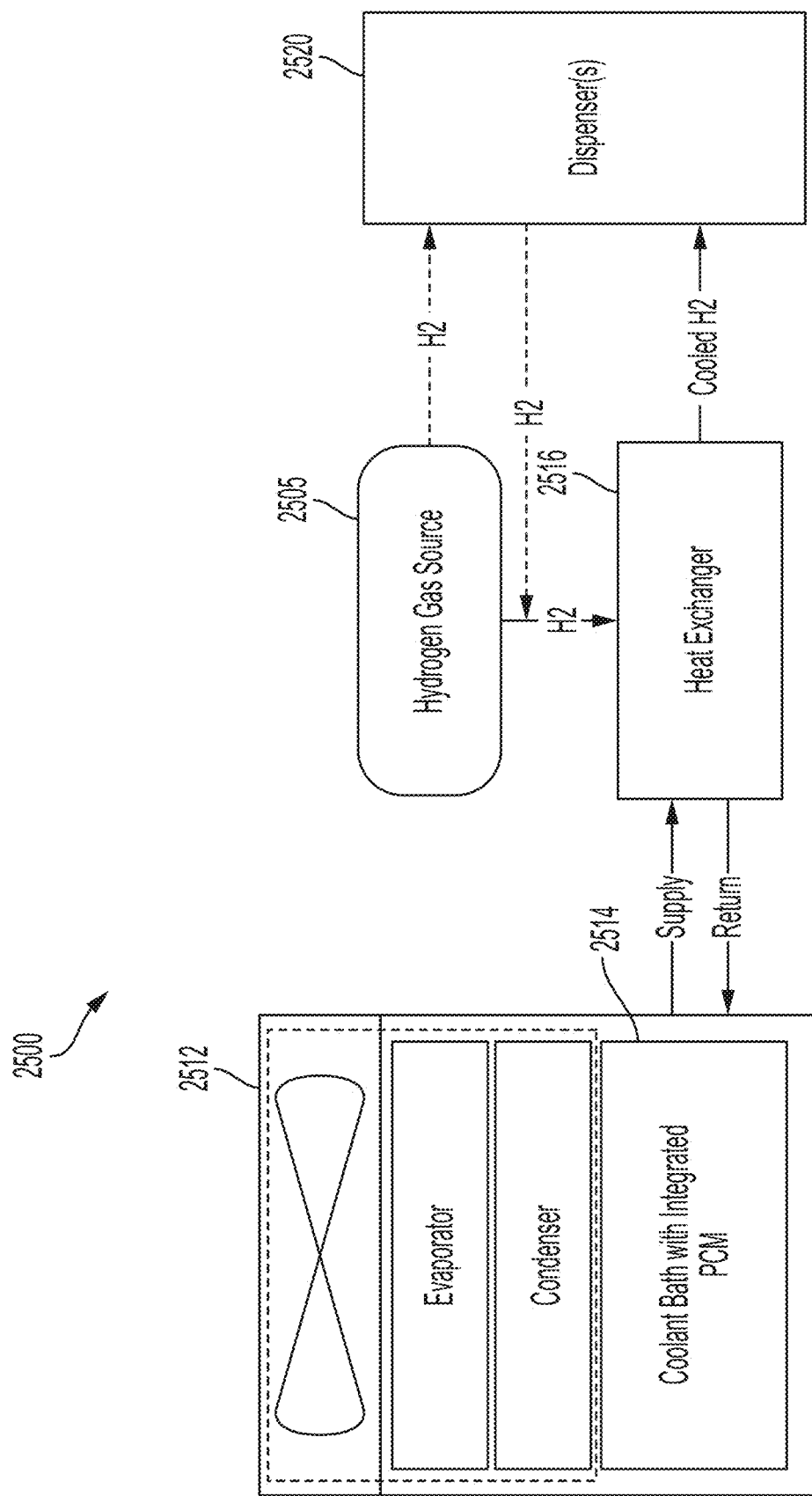
FIG. 25 illustrates a hydrogen cooling system comprising a refrigeration unit have an integrated coolant reservoir configured to contain both PCM and conventional coolant, in accordance with some embodiments.

FIG. 25 illustrates another exemplary hydrogen cooling system utilizing PCMs to increase the thermal energy capacity of a coolant reservoir, in accordance with some embodiments. Fueling system 2500 may utilize a similar configuration as exemplary fueling system 1700 described in connection with FIG. 17 in that a coolant reservoir is integrated with a refrigeration unit to form an integrated chiller system. In particular, in the embodiment illustrated in FIG. 25, a chiller system includes a refrigeration unit comprising an evaporator and a condenser that chills coolant held in integrated reservoir 2514. Reservoir 2514 may be configured to hold both a PCM and a conventional (non-PCM) coolant and chiller system 2512 is arranged to chill both the PCM and the conventional coolant held in the reservoir. For example, reservoir 2514 may contain both a low temperature eutectic PCM and a conventional coolant such as glycol that are chilled to a target temperature that causes the PCM to transition to its low temperature state (e.g., a solid). A heat exchanger 2516 may be coupled to chiller system 2512 and hydrogen gas source 2505 to chill hydrogen gas with coolant pumped from reservoir 2514 and circulated through the heat exchanger via supply and returns lines. The chilled hydrogen gas may then be provided to one or more dispensers 2520 for fueling of HFCVs. The increased thermal energy capacity of the PCM is capable of providing benefits described in the foregoing. It should be appreciated that a coolant reservoir containing both PCM and conventional coolant may be used in any of the other configurations described above and is not limited for use in the integrated chiller system illustrated in FIG. 25 (e.g., as a separate coolant reservoir as illustrated in FIGS. 18-20, for example).

Figure 26A:
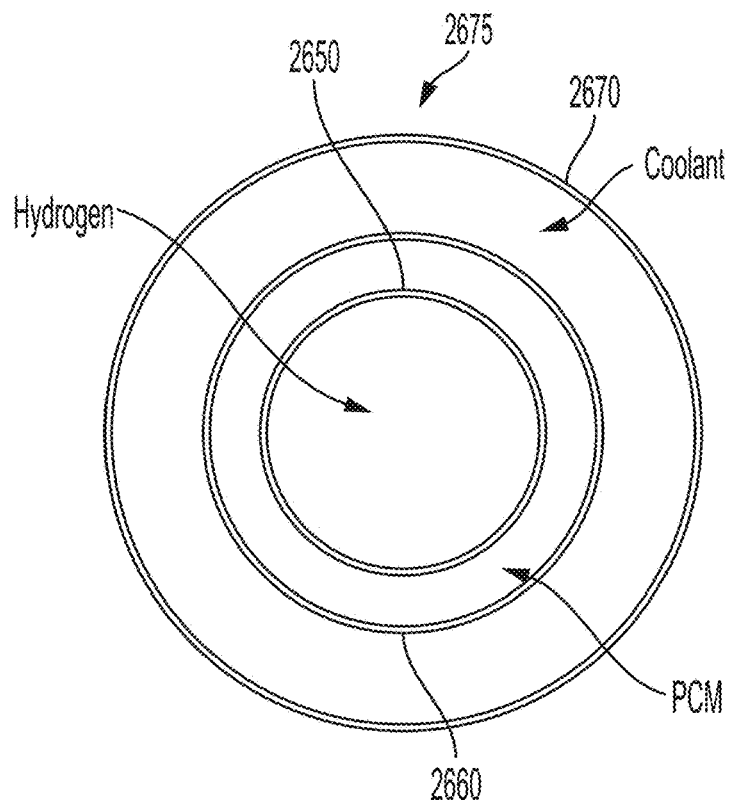
FIG. 26A illustrates coaxial tubing that integrates PCM and conventional coolant to provide hydrogen cooling, in accordance with some embodiments.
Figure 26B:
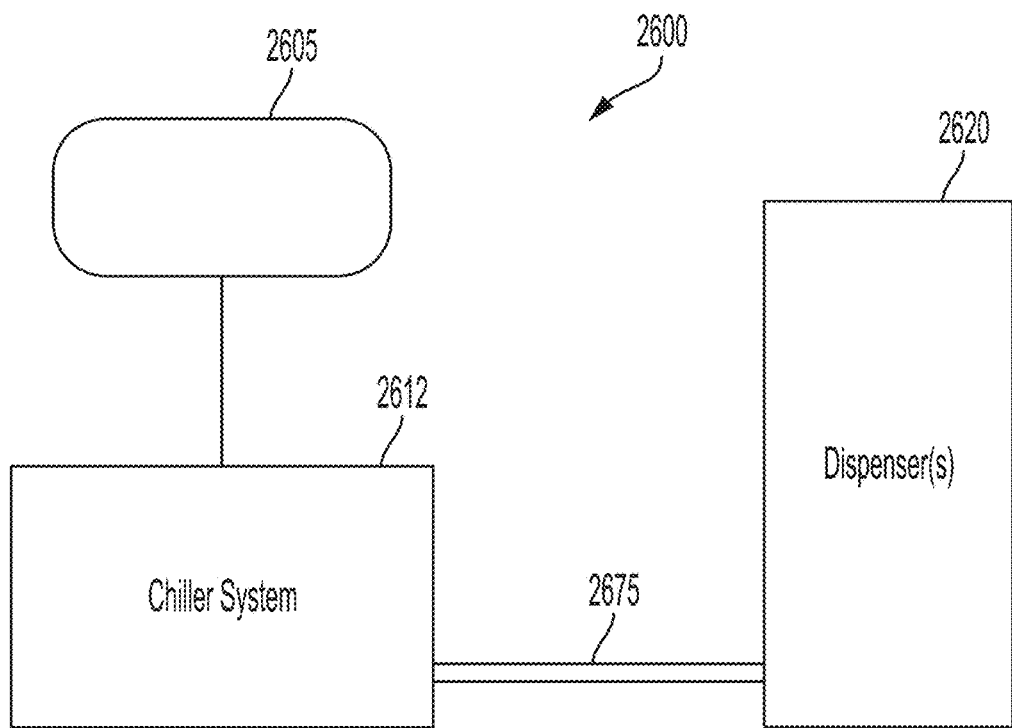
FIG. 26B illustrates an exemplary hydrogen fueling system employing the coaxial tubing illustrated in FIG. 26A.

FIGS. 26A and 26B illustrate coaxial tubing that includes PCM to facilitate aspects of hydrogen gas cooling, in accordance with some embodiments. FIG. 26A illustrates a cross-section of coaxial tubing 2675 that can be used to transport hydrogen from components of a fueling station to one or more dispensers to provide chilled hydrogen to dispensers for delivery to the fuel tank of an HFCV during a fueling event. In the embodiment illustrated in FIG. 26, coaxial tubing 2675 comprises three concentric tubes: an inner tube 2650 through which hydrogen gas can flow; a middle tube 2660 to contain a PCM; and outer tube 2670 through which a conventional (non-PCM) coolant can flow. Inner tube 2650 may be the same or similar to conventional piping used to transport hydrogen between components of the fueling system or may include a different type of tubing. It should be appreciated that the relative diameters of the different tubing levels illustrated in FIG. 26A is exemplary and tubing can be selected to have any suitable diameters, as the aspects are not limited in this respect. Using this configuration, hydrogen gas can be cooled as it flows through the inner tube 2650 of coaxial tubing 2675.

In particular, hydrogen gas flowing through inner tube 2650 transfers heat to PCM contained in middle tube 2660 that has been chilled to its low temperature state via chilled coolant flowing through outer tube 2670. For example, coolant may be chilled to a temperature sufficient to cause a state transition of the PCM to its low temperature state using any of the refrigeration techniques discussed herein and thereafter pumped through outer tube 2670 to chill the PCM to cause a state transition. According to some embodiments, coolant from a coolant reservoir that has been chilled to a desired temperature by a refrigeration unit may be pumped through outer tube 2670 to cause the PCM to change state and then circulated back to the reservoir for temperature recovery. As discussed above, once the PCM has been chilled to its low temperature state, heat absorbed from hydrogen flowing through inner tube 2650 will go into transitioning the PCM to its ambient temperature state rather than heating the PCM. As a result, chilled coolant may only need to be pumped through outer tube 2670 when the PCM has substantially transitioned to its ambient temperature state or when the fueling system determines that the low temperature state of the PCM should be fully recovered.

FIG. 26B illustrates a hydrogen fueling system in which coaxial tubing is employed to provide chilled hydrogen to one or more dispensers for delivery to a fuel tank of an HFCV during a fueling event. In the embodiment illustrated in FIG. 26B, hydrogen fueling system 1600 comprises hydrogen gas source 2605, chiller system 2612 and one or more dispensers 2620. Coaxial tubing 2675 is fluidly coupled to components of the chiller system 2612 to dispenser(s) 2620 to provide chilled hydrogen for dispensing. Coaxial tubing 2675 may also be employed to transport hydrogen directly from hydrogen source 2605 to the one or more dispensers, as discussed in further detail below. Chiller system 2612 may include any combination of refrigeration unit and coolant reservoir described herein and may employ any of the cooling techniques discussed above to provide chilled coolant to outer tube 2660 of coaxial tubing 2675 at a sufficiently low temperature to cause PCM contained in middle tube 2660 to transition to its low temperature state. Heated coolant may be returned to chiller system 2612 via a return line (not shown) or any suitable return path. The chilled PCM absorbs heat from hydrogen gas from the hydrogen gas source 2605 as it flows through inner tube 2650 of coaxial tubing 2675 to deliver chilled hydrogen to dispenser(s) 2620.

According to some embodiments, chiller system 2612 also comprises a heat exchanger that pre-cools hydrogen gas from hydrogen gas source 2605 before being provided to coaxial tubing 2675. In embodiments employing a heat exchanger, the heat transfer load of chilling hydrogen gas may be shared between the heat exchanger and coaxial tubing 2675 so that a lower UA heat exchanger can be employed at reduced cost relative to embodiments of high UA exchangers discussed herein. As discussed in connection with the other PCM techniques discussed above, use of PCM in a coaxial tubing facilitates increasing back-to-back fills, reducing the size and cost of components of the hydrogen cooling system, or some combination of each. According to some embodiments, coaxial tubing 2675 may be used to transport hydrogen gas from hydrogen gas source 2605 (e.g., one or more storage tanks) to the one or more dispensers and chiller system 2612 may be coupled at the connection of the coaxial tubing to the hydrogen gas source so that hydrogen cooling may be performed via a direct transport link between the hydrogen gas source 2650 and the one or more dispensers. Coaxial tubing 2675 may be used to connect components of a hydrogen fueling station in other ways, as the use of coaxial tubing is not limited to any particular arrangement.

Figure 27:
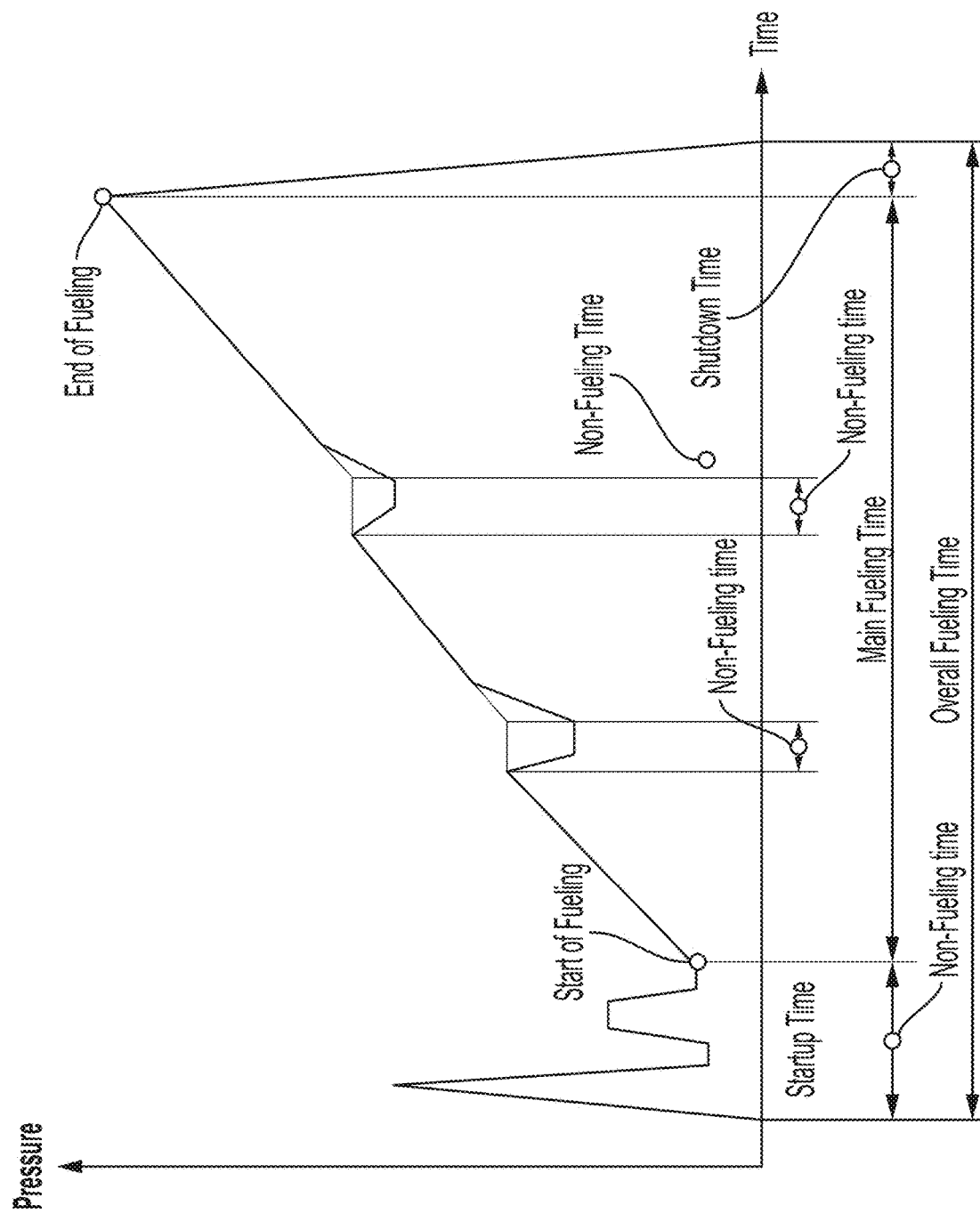
FIG. 27 illustrates the pressure profile of an exemplary fueling protocol.

As discussed above, a fueling event includes a dispenser at a hydrogen fueling station delivering hydrogen from a hydrogen source at the fueling station to a fuel tank onboard a HFCV. When the nozzle of the dispenser is engaged with the vehicle fuel tank, the dispenser is activated to control the flow of hydrogen into the fuel tank of the vehicle. As discussed above, tank parameters such as tank pressure, tank volume, tank temperature, etc. are typically communicated to the dispenser so that the dispenser can safely refill the tank. Fueling protocols are established for safely refueling a HFCV and dispensers are configured to control the flow of gas into the tank according to a corresponding fueling protocol. FIG. 27 illustrates a typical fueling protocol for an HFCV. During a startup up time, the dispenser delivers gas to perform certain start actions. After the start-up time, the dispenser will enter an active filling stage in which the dispenser attempts to maintain a constant pressure ramp rate to the vehicle as illustrated by the linear ramp of the pressure profile between the start and end of fueling points of the exemplary fueling protocol illustrated in FIG. 27, which is interrupted by two dwell time safety checks in which the dispenser is required to stop the flow of hydrogen to ensure there is no leaking. Fueling protocols typically specify a tolerance (referred to as the pressure corridor) that a dispenser is allowed to deviate from the specified pressure profile of the fueling protocol (e.g., between +7 MPa/min and −2 MPA/min from the target pressure profile of the fueling protocol. Thus, hydrogen fueling involves controlling the dispenser to maintain a constant pressure ramp (e.g., bar per minute) as opposed to maintain a particular mass flow rate (e.g., kg per minute). Because hydrogen is compressible, the mass flow rate of the hydrogen is not constant. According, the dispenser must be able to control vary the area through which hydrogen gas flows to allow the mass flow rate to vary to maintain the desired pressure profile of the fueling protocol. Some fueling protocols may provide target hydrogen flow rates instead of or in addition to target pressures.

The inventors have developed dispenser techniques to facilitate dispenser control of hydrogen gas to a fuel tank of a HFCV. According to some embodiments, a dispenser comprises a bank of fixed-sized orifice valves that can be turned off and on in any desired combination to control the mass flow rate of hydrogen gas to the vehicle to achieve the pressure profile (e.g., a constant pressure ramp) of a fueling protocol. According to some embodiments, a variable-size orifice solenoid valve paired to a direct drive servo motor is employed to control the mass flow rate of hydrogen to match the pressure profile of a corresponding fueling protocol. As discussed above, either the fixed-sized orifice solution or the variable-size orifice solution can be employed in any of the dispenser illustrated above in connection with the exemplary fueling stations.

Figure 28:
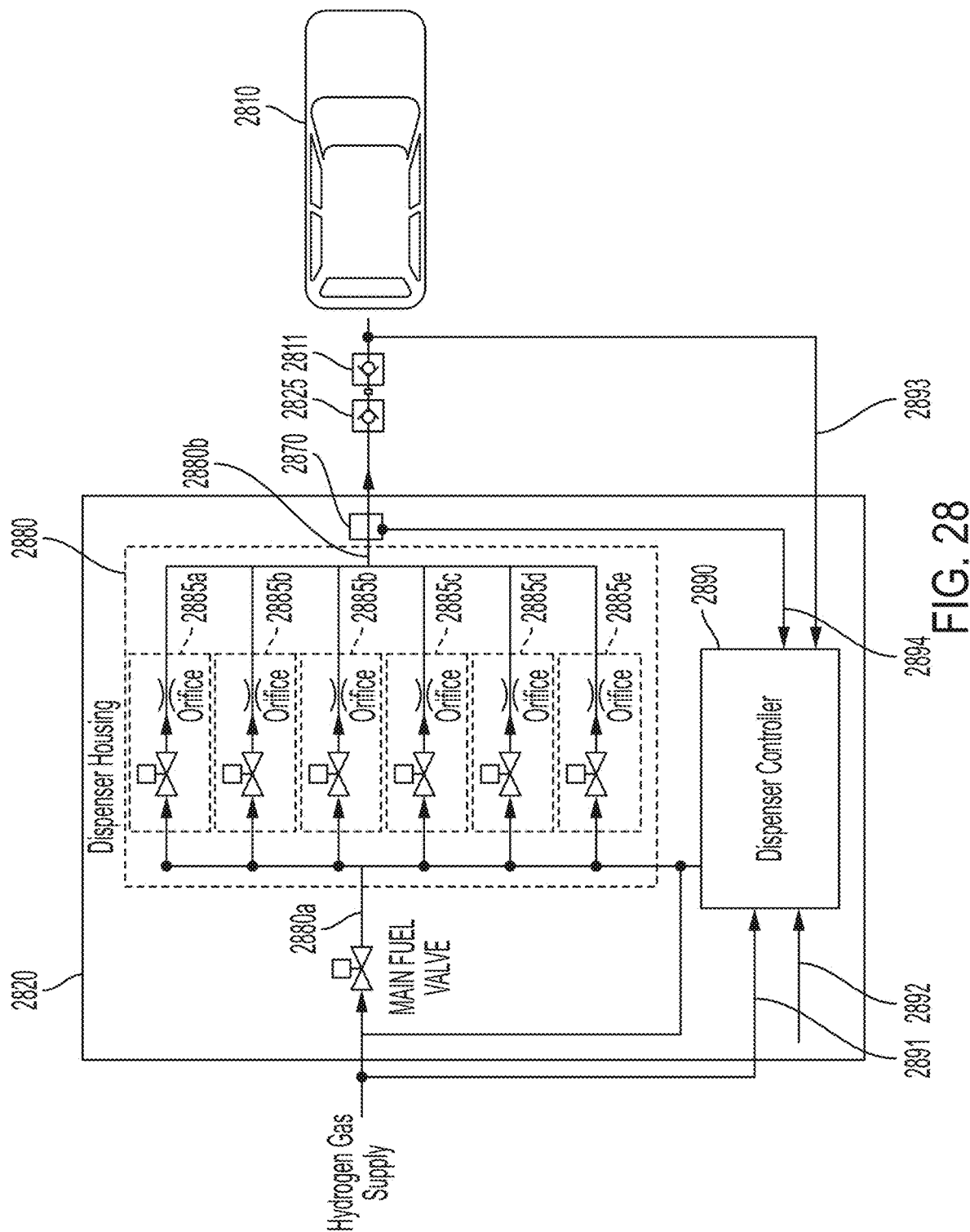
FIG. 28 illustrates a hydrogen dispenser comprising a bank of fixed-size orifice valves to control the flow rate of hydrogen gas, in accordance with some embodiments.

FIG. 28 illustrates a fixed-orifice dispenser comprising a valve bank of fixed-size orifice valves that can be controlled to be open or closed to provide a desired flow area to achieve a target pressure and/or target flow rate during a fueling event, in accordance with some embodiments. As used herein, a fixed-size orifice valve refers to an orifice having a fixed-size opening or flow area paired with a valve that can be opened or closed. According to some embodiments, a valve bank may include one or more fixed-size orifices that are not paired with a valve. For example, in addition to one or more fixed-size orifice valves, a valve bank may include one or more fixed-size orifices such that when a dispenser is enabled to dispense hydrogen gas (e.g., by opening a master valve to the valve bank) a minimum flow rate of hydrogen will be delivered to the nozzle via the one or more fixed-size orifices without needing to open a respective associated valve.

In the embodiment illustrated in FIG. 28, exemplary dispenser 2820 comprises valve bank 2880 that includes a plurality of fixed-size orifice valves 2885a-2885e arranged in parallel that can be turned on and off under control of dispenser controller 2890. As used herein, arranged in parallel means that the same hydrogen gas does not flow through any of the fixed-size orifice valves that are so arranged. As a result, the hydrogen gas provided at output 2880b is the sum of the hydrogen gas flowing through the fixed-size orifice valves that are arranged in parallel. A supply of hydrogen gas, either from a hydrogen gas source directly for ambient fills or in configurations in which hydrogen cooling is performed downstream of valve bank 2880, or via a hydrogen cooling system (e.g., any of the exemplary hydrogen cooling system described herein) in configurations in which hydrogen cooling is performed upstream of valve bank 2880, is provided to a main fuel valve, which is turned on when dispenser nozzle 2825 is engaged with the fuel tank interface 2811 of HFCV 2810 to provide hydrogen gas at input 2880a of bank 2880. The flow of hydrogen gas is governed by which of the fixed orifice valves the controller opens to pass hydrogen gas from the supply to the dispenser nozzle 2825 and into the fuel tank of the HFCV.

According to some embodiments, dispenser controller 2890 is configured to control the pressure of hydrogen gas dispensed to the HFCV, for example, according to a pressure profile of a hydrogen fueling protocol. Thus, dispenser controller receives the target pressure 2892 (or target flow rate) indicative of the desired tank pressure of the fuel tank of HFCV (or target flow rate to the tank) at a given instant during the fueling event, which target pressure and/or target flow rate may vary over the course of the fueling event in accordance with the fueling protocol. To achieve the desired pressure, controller 2890 may be configured to receive the supply pressure 2891 of the hydrogen gas from the gas supply, a measured pressure downstream of the valve bank and/or the tank pressure of the fuel tank of the HFCV. As discussed above, tank parameters may be received via a communications link established between the nozzle and the fuel tank, via a communications link established between the vehicle and a fueling station network and/or or may be received via other means (e.g., tank pressure may be measured directly by nozzle 2825). Thus, controller 2890 may receive the tank pressure 2893 at a given instant in time. Using the supply pressure 2891 and either the measured pressure 2894, the tank pressure 2893, or both, and the known pressure differential across each of the fixed orifices, controller 2890 determines which combination of fixed orifices valves 2885a-e should be opened to provide a hydrogen gas flow rate that most closely matches the hydrogen gas flow rate that will deliver the target pressure 2892 (or target flow rate) to the tank (e.g., a constant pressure ramp during the course of the fueling event). Controller 2890 may also receive measurements from one or more sensors 2870 to ensure that the dispenser is delivering the desired flow rate of hydrogen gas. For example, sensor(s) 2870 may include a pressure sensor, a mass flow rate sensor or both as a check to make sure that the hydrogen gas is being delivered as intended.

It should be appreciated that bank 2880 may include any number of fixed-size orifice valves of any size. For example, bank 2880 may include a plurality of orifices at different fixed sizes, a plurality of orifices at a same size or any combination of different and same size orifices to achieve the desired granularity in control over the flow rate of hydrogen between the hydrogen supply and the dispenser nozzle. Fixed-size orifice valves are relatively inexpensive and have few moving parts and therefore can provide a cost effective and reliable dispenser solution for dispensing hydrogen gas to a HFCV vehicle. Additionally, valve bank 2880 may include one or more fixed-size orifices without an associated valve that allows hydrogen flow whenever supply hydrogen is provided to the valve bank 2880 (e.g., whenever the main fuel valve of the dispenser is opened), some examples of which are described in further detail below in connection with FIG. 30.

Figure 29:
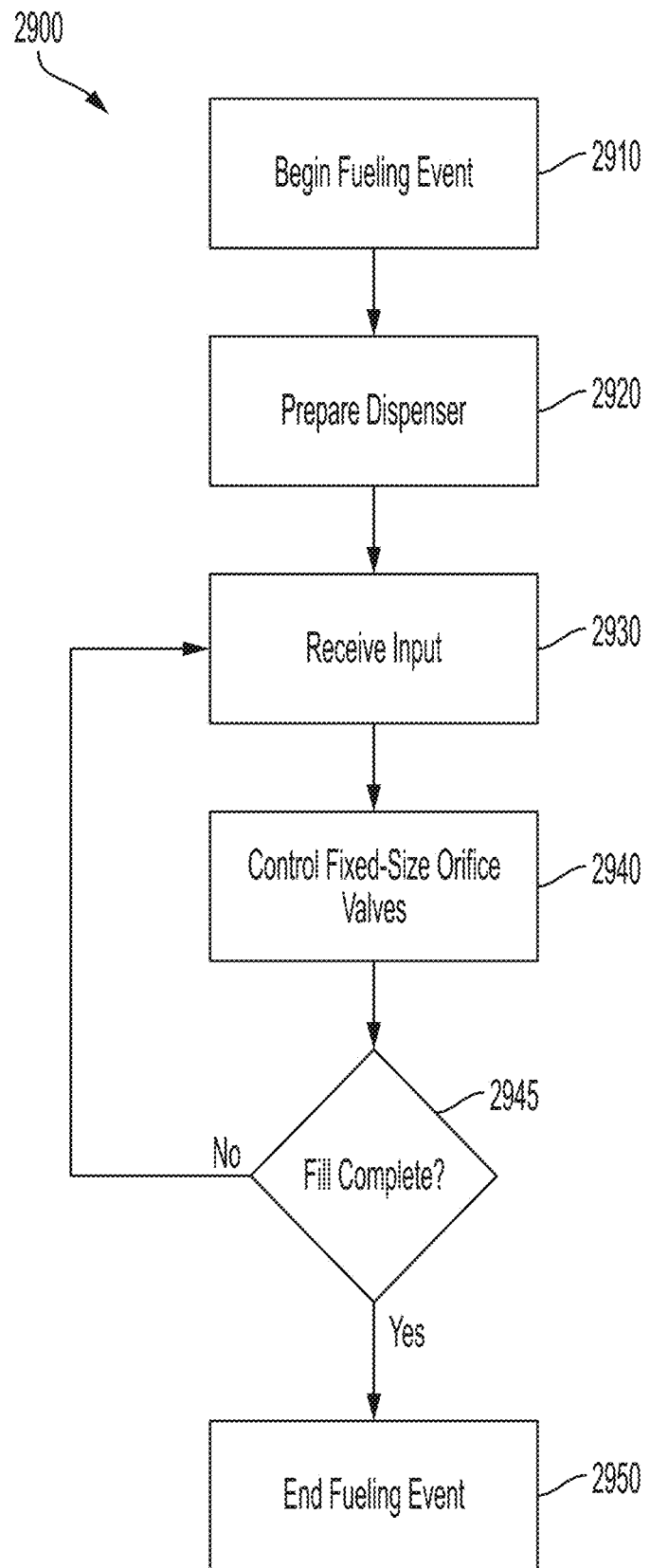
FIG. 29 illustrates a method for performing a fueling event employing a bank of fixed-size orifice, in accordance with some embodiments.

FIG. 29 illustrates a method of controlling hydrogen gas flow during a fueling event using a valve bank containing a plurality of fixed-size orifice valves arranged in parallel, in accordance with some embodiments. In act 2910, a fueling event may begin when, for example, a nozzle at a dispenser is engaged with the fuel tank of a vehicle or a fuel event is otherwise initiated. According to some embodiments, vehicle-to-nozzle pairing is performed during act 2910 using any of the techniques discussed herein, or vehicle-to-nozzle pairing may be performed using conventional techniques (e.g., via IrDA when the dispenser nozzle is engaged with the vehicle). In act 2920, the dispenser is prepared to perform the fueling event and may include receiving tank parameters from the vehicle, engaging relevant portions of a hydrogen cooling system to provide chilled hydrogen gas, opening a master valve to allow hydrogen gas from the supply (e.g., hydrogen gas stored in a bank of storage tanks) to flow to the dispenser (e.g., a stop flow valve of the valve bank of the dispenser), obtaining a fueling protocol for the fueling event or any other tasks to prepare the dispenser to perform the fueling event. According to some embodiments, components of a hydrogen cooling system are arranged upstream from the dispenser so that chilled hydrogen is supplied to the dispenser. In some embodiments, one or more components of a hydrogen cooling system (e.g., a heat exchanger) are provided downstream from the dispenser flow control system (e.g., downstream of the valve bank) prior to being delivered to the nozzle so that the dispenser is supplied hydrogen gas at approximately the temperature at which the hydrogen gas is stored. To begin fueling, the dispenser controller may be configured to allow a prescribed amount of hydrogen to flow through the dispenser for delivery to the fuel tank of the vehicle via the nozzle during a start-up period.

In act 2930, the dispenser controller receives or obtains input from one or more sensors or otherwise receiving information for the fueling event. For example, the dispenser may be configured to receive supply pressure of the hydrogen gas at the input of the dispenser, measured pressure and/or flow rate downstream of the valve bank and/or tank pressure of the fuel tank of the vehicle, and a target pressure of the fuel tank (or a flow rate to the tank) that the dispenser controller seeks to achieve. As discussed in the foregoing, the target pressure and/or hydrogen flow rate may be obtained from a fueling protocol that provides a pressure profile the dispenser should follow during the refueling event. The dispenser controller may also obtain other input such as hydrogen flow rate at or near the nozzle (e.g., downstream from the dispenser valve system), temperature or other input in connection with the fueling event.

In act 2940, the dispenser controller controls the plurality of fixed-sized orifice valves based on the input received by the dispenser controller including, but not limited to, opening one or more of the plurality of fixed-size orifice valves, closing one or more of the plurality of fixed-size orifice valves, or maintaining the existing combination of open and closed fixed-sized orifice valves to deliver hydrogen flow through the valve bank that matches the target pressure and/or target flow rate or follows the target pressure profile as closely as possible. According to some embodiments, the dispenser controller uses the supply pressure of hydrogen gas at or near the input to the valve bank (upstream of the valve bank), the measured pressure and/or flow rate downstream of the valve bank and/or the current tank pressure of the fuel tank of the vehicle, and the current target pressure and/or hydrogen flow rate to determine the combination of open and closed fixed-size orifice valves that will deliver hydrogen at a flow rate that will result in bringing the measured pressure or tank pressure towards the target pressure or the target flow, respectively. For example, the dispenser controller may use the difference between the measured pressure and/or current tank pressure and the current target pressure to selectively open or close one or more of the fixed-size orifice valves or maintain the current combination of open and closed valves to minimize the difference between the current tank pressure and the current target pressure. However, the dispenser controller can determine the combination of open and closed fixed-size orifice valves in other suitable ways to follow a target pressure and/or flow rate profile for the fueling event. The dispenser controller may be configured to continuously monitor the input received (e.g., received in act 2930) to control the valve bank to adjust the hydrogen flow rate to follow the target pressure and/or flow rate profile for the fueling event until the fill is complete (act 2945).

A fill may be completed when the nozzle is disengaged from the fuel tank, the dispenser determines that the fuel tank is full (e.g., the tank pressure has reached its maximum tank pressure), or the dispenser otherwise determines that the delivery of hydrogen gas should be terminated. To end the fueling event (act 2950), the dispenser controller may close the master valve (e.g., stop flow valve) to the valve bank, close the plurality of fixed-sized orifice valves, or otherwise stop the dispensing of hydrogen gas to the fuel tank of the vehicle. By using the supply pressure, measured pressure and/or current tank pressure and target pressure and/or target flow rate to control the fueling event, the dispenser can perform a fueling event according to a desired fueling protocol to the resolution of the valve bank based on the number of valves and/or combination of different orifice sizes, which can be designed to achieve a desired granularity in different flow rates.

Figure 30:
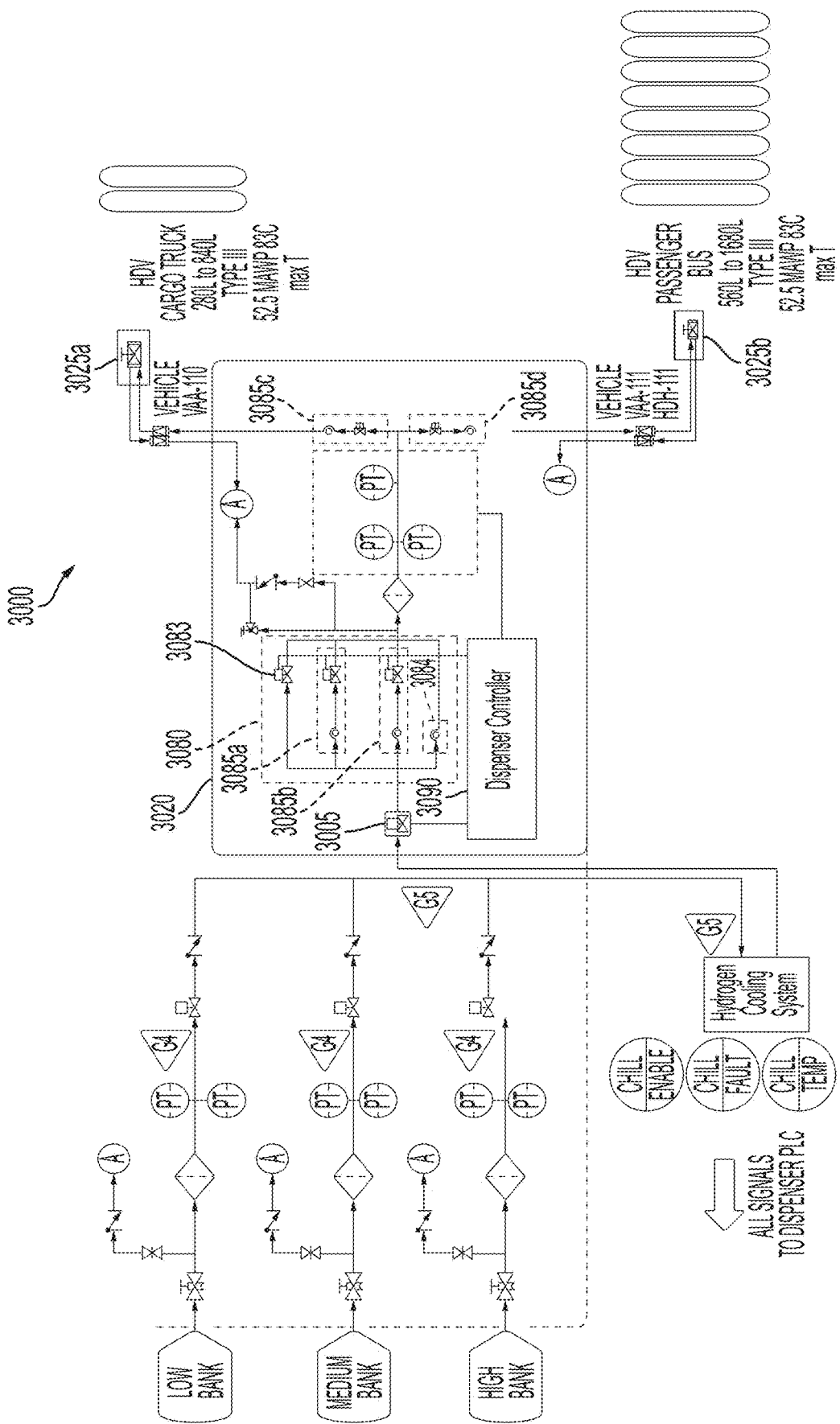
FIG. 30 illustrates a dual-nozzle dispenser employing a bank of fixed-size orifice, in accordance with some embodiments.

FIG. 30 illustrates a hydrogen fueling system comprising a dispenser utilizing a valve bank of fixed-size orifice valves implementing a dual-nozzle configuration, in accordance with some embodiments. Hydrogen fueling system 3000 comprises a dispenser 3020 that controls flow of hydrogen gas to a pair of nozzles configured for performing fueling events for two different types of vehicles. According to some embodiments, dispenser 3020 may be configured with two separate flow paths to deliver hydrogen gas to nozzle 3025*a* configured for use with a first type of vehicle (e.g., cargo trucks, etc.) and to deliver hydrogen gas to nozzle 3025*b* configured for use with a second type of vehicle (e.g., passenger busses). It should be appreciated that the dual nozzle configuration can be configured to deliver hydrogen to any type of vehicle, as the aspects are not limited in this respect.

In the embodiment illustrated in FIG. 30, valve bank 3080 comprises fixed-size orifice valves 3085*a* and 3085*b*, fixed-size orifice 3084 and full flow valve 3083. According to one example configuration, the size of the orifice for fixed-size orifice valve 3085*a* may be 0.038 inches (allowing 750 grams/min of flow) and the size of the orifices for fixed-size orifice valve 3085*b* and fixed-size orifice 3084 may both be 0.022 inches (allowing 250 grams/min of flow). However, these values are merely exemplary and any size orifices may be chosen depending on the requirements of the dispenser. In the embodiment illustrated in FIG. 30, nozzles 3025*a* and 3025*b* may have an associated nozzle fixed-size orifice valve 3085*c* and 3085*d*, respectively, that are sized according to the type of vehicle that the nozzle is configured to refuel to allow a maximum flow rate to be delivered to the nozzle. According to some embodiments, the size of the orifice for fixed-size orifice valve 3085*c* may be 0.058 inches (allowing for a maximum flow rate of 1800 grams/min) and the size of the orifice for fixed-size orifice valve 3085*d* may be 0.082 inches (allowing for a maximum flow rate of 3600 grams/min). Fixed-size orifice 3084 has no associated valve so that whenever stop flow valve 3005 is opened and one of nozzle valves 3085*c*, 3085*d* is opened, a minimum flow rate dictated by the size of this orifice (e.g., 250 g/min) will be delivered to the corresponding nozzle. Full flow valve 3083 has no associated orifice so that hydrogen gas will flow through the valve bank at full flow and will be limited by the orifice of the nozzle valve of whichever of nozzle 3025*a*, 3205*b* has been engaged with a vehicle.

As one example fueling event using this configuration, all of the valves may be closed to begin with and the either nozzle valve 3085*c* or 3085*d* will be opened depending on which nozzle has been engaged with a vehicle of the corresponding type. According to some embodiments, the nozzles themselves are different so that they cannot be mistakenly engaged with the wrong type of vehicle. When stop flow valve 3005 is opened to begin the fueling event, hydrogen gas will flow only through orifice 3084 at the maximum flow rate of the orifice (e.g., 250 g/min). Dispenser controller 3090 may then select which of fixed-size orifice valves 3085a, 3085b and/or full flow valve 3083 to open to deliver hydrogen gas at different flow rates ranging from the maximum flow rate of orifice 3084 to the maximum flow rate of the nozzle valve 3085c, 3085d engaged with a vehicle during the fueling event. For the exemplary orifice sizes discussed above, dispenser controller 3090 can deliver a flow rate of 250 g/min, 500 g/min, 1000 g/min, 1500 g/min and full flow rate that is limited to 1800 g/min for nozzle 3025a and that is limited to 3600 g/min for nozzle 3025b. However, it should be appreciated that any number of fixed-size orifice valves of any size can be used to delivered flow rates to any type of desired vehicle, as the aspects the dual-nozzle dispenser configuration are not limited in this respect.

According to some embodiments, a variable-size orifice valve paired to a direct drive servo motor is employed to control the mass flow rate of hydrogen to match the pressure profile of a corresponding fueling protocol. Many conventional hydrogen flow control valves employ pressure regulator valves that are opened and closed pneumatically based on the pressure differential across the valve. Pressure regulator valves are frequently used in hydrogen fueling applications because there are no electrical components and are by design safe for hydrogen fueling environments. The inventors recognized that the use of pressure regulator valves have drawbacks, some associated with slow response times to pressure changes at the hydrogen gas supply. Typical hydrogen sources at a fueling station comprise a bank of cascaded tanks at different pressures that are successively opened during a fueling event. As a result, the supply pressure will decrease as hydrogen flows from the first tank and then will spike each time a successive tank is engaged to deliver hydrogen. Conventional dispenser controllers using pressure regulator valves typically cannot handle such large changes in supply pressure and as a result are forced to stop the flow of hydrogen gas, reset the pressure regulators and then start the flow again. As a result, hydrogen fueling stations typically must be paired with a specific dispenser tuned to the specific storage bank at that fueling station, resulting in costly, time consuming and inflexible deployment of a hydrogen dispenser that must be matched to a specific fueling station. Some hydrogen gas dispenser utilize stepper motors to open and close the valve opening, but stepper motor solutions also suffer from slow response times and lack of control.

According to some embodiments, a variable-size orifice valve is paired with a direct drive servo motor providing high resolution and highly responsive control over the variable-size orifice valve, thereby addressing a number of drawbacks of conventional dispensers that utilize variable-size orifice valves that are paired with stepper motors and/or rely on pressure regulators to control hydrogen flow into the fuel tank of an HFCV during a fueling event. As used herein, a direct drive servo motor refers to a servo motor that has a one-to-one rotational relationship with the valve to which it is paired. That is, each 360° rotation of the direct drive servo motor results in a 360° rotation of the valve stem. By contrast, stepper motors or other geared motors have a many-to-one rotational relationship with the valve to which it is paired. That is, a 360° rotation of the valve stem requires multiple rotations of the stepper motor due to gear reduction. For example, a typical stepper motor may have a twenty-to-one rotational relationship with the valve so that the stepper motor rotates twenty times (i.e., 7200° of rotation) to effect one rotation of the valve stem (i.e., 360°). As a result, pairing the valve with a direct driver servo motor results in significantly fast response times. Additionally, direct drive servo motors according to some embodiments can operate at significantly higher rotations per minute (RPMs) than stepper motors, further increasing the speed increase and responsive improvement over conventional stepper motor solutions. That is, direct drive servo motors according to some embodiments not only effect more change in the valve opening on each rotation, but also rotate faster.

According to some embodiments, a direct drive servo motor includes an encoder that measures the rotation of the direct drive servo motor. Because the servo motor is direct drive, the encoder allows the position of the valve to be measured (i.e., how many degrees the valve has been opened). The measured valve position allows the dispenser controller to operate in a closed feedback loop, facilitating precise control and fast response times at a high degree of resolution. According to some embodiments, the encoder measures rotation with one degree of resolution or less (0.5 degrees or less, more preferably 0.3 degrees or less, and more preferably at 0.1 degrees of resolution), allowing the valve position to be precisely determined. According to some embodiments, the encodes measures rotation down to 0.1 degree of resolution, allowing for highly precise control.

Hydrogen dispensers employing a flow control valve having a direct drive servo motor paired with variable-size orifice valve and control techniques described herein provide high resolution and fast response times that allow the dispenser to be deployed at virtually any fueling station independent of the characteristics of the hydrogen gas source (e.g., independent of the characteristics of the supply bank), eliminating the need to match and custom tune the dispenser for a specific hydrogen supply bank or hydrogen source configuration and allowing for the design of stand-alone hydrogen dispensers that are agnostic to the fueling station configuration and hydrogen supply characteristics, facilitating simple cost effective deployment across a wide range of different fueling stations. Because the flow control valve using the direct drive servo motor techniques described herein can respond quickly and precisely, the dispenser controller does not need to stop flow when a different supply tank is switched to and the dispenser need not know that specifics of the number, trigger levels or pressure changes that will result from a particular storage bank because the dispenser controller can respond quickly to pressure spikes and continue to deliver hydrogen gas at the desired pressure.

Figure 31:
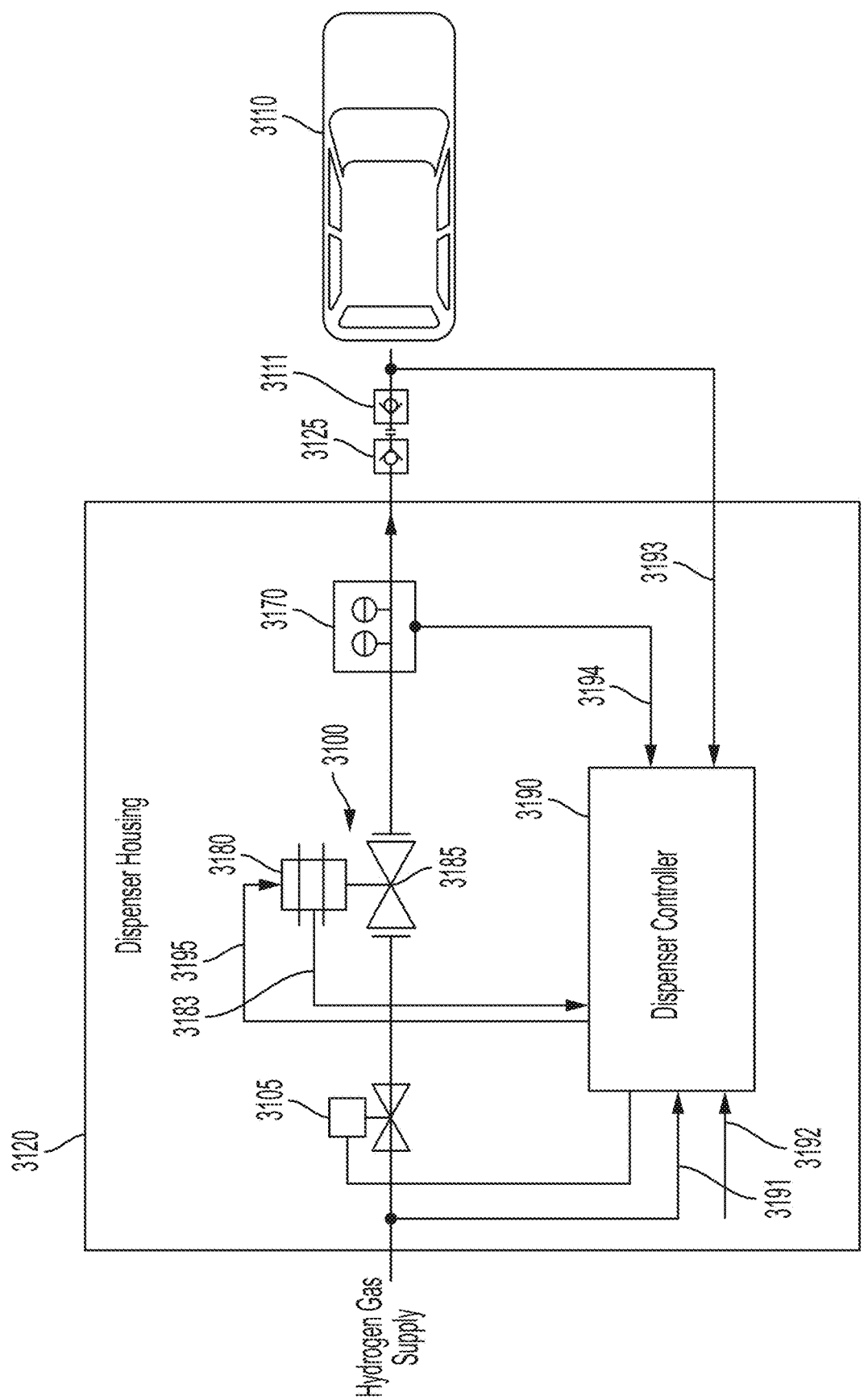
FIG. 31 illustrates a hydrogen dispenser comprising a flow control valve having a direct drive servo motor paired with a variable-size orifice valve, in accordance with some embodiments.

FIG. 31 illustrates a dispenser employing a flow control valve comprising a variable-size orifice valve paired with a direct drive servo motor that can be controlled to vary the size of the valve opening to provide a desired flow area that delivers a flow rate that achieves a target pressure and/or target flow rate during a fueling event, in accordance with some embodiments. In the embodiment illustrated in FIG. 31, exemplary dispenser 3120 employs flow control valve 3100 comprising a direct drive servo motor 3180 coupled to variable-size valve 3185 to vary the size of the valve opening based on control signals 3195 from dispenser controller 3190. Dispenser 3120 may also include a stop flow valve 3105 that is closed to stop hydrogen flow when the dispenser is not being used and that is opened at the beginning of a fueling event. One or more of the inputs to the dispenser 3120 and dispenser controller 3190 may be similar to or the same as those described in connection with dispenser illustrated in FIG. 28. For example, a supply of hydrogen gas, either from a hydrogen gas source directly for ambient fills or in configurations in which hydrogen cooling is performed downstream of valve 3185, or via a hydrogen cooling system (e.g., any of the exemplary hydrogen cooling system described herein) in configurations in which hydrogen cooling is performed upstream of valve 3185 via a hydrogen cooling system (e.g., any of the exemplary hydrogen cooling system described herein), is provided to the dispenser when dispenser nozzle 3125 is engaged with the fuel tank interface 3111 of HFCV 3110.

Dispenser controller 3190 may be configured to control the pressure of hydrogen gas dispensed to the HFCV, for example, according to a pressure profile of a hydrogen fueling protocol. For example, dispenser controller 3190 may receive the target pressure and/or target flow rate 3192 indicative of the desired tank pressure of the fuel tank of HFCV and/or the desired flow rate to be delivered at a given instant during the fueling event, which target pressure and/or target flow rate may vary over the course of the fueling event in accordance with the fueling protocol. To achieve the desired pressure, controller 3190 may be configured to receive the supply pressure 3191 of the hydrogen gas from the gas supply, a measured pressure and/or measured flow rate downstream from the flow control valve (e.g., measured by a sensor(s) in sensor(s) 3170 and/or the tank pressure 3193 of the fuel tank of the HFCV. As discussed above, tank parameters may be received via a communications link established between the nozzle and the fuel tank, via a communications link established between the vehicle and a fueling station network and/or or may be received via other means (e.g., tank pressure may be measured directly by nozzle 3125). Thus, dispenser controller 3190 may receive the tank pressure 3193 at a given instant in time.

In the embodiment illustrated in FIG. 31, direct drive servo motor includes an encoder that measures valve position 3183 (e.g., how many degrees the valve has been opened) and provides the valve position measurement 3183 to dispenser controller 3190. Using the supply pressure 3191, measured pressure and/or measured flow rate 3194 and/or tank pressure 3193, dispenser controller 3190 determines the flow area that achieves a hydrogen gas flow rate that will deliver the target pressure and/or target flow rate 3192 to the tank (e.g., a constant pressure ramp during the course of the fueling event). Because the dispenser controller can determine the current flow area of the valve from the valve position measurement (e.g., the area of the valve opening may be determined from the number of degrees that the valve is opened using the known valve characteristics), dispenser controller 3190 can provide signal 3195 (e.g., a voltage or current signal) that will cause the direct drive servo motor 3180 to precisely control valve 3185 to achieve the determined flow area. Controller 3190 may also receive measurements from one or more sensors 3170 to ensure that the dispenser is delivering the desired flow rate of hydrogen gas. For example, sensor(s) 3170 may include a pressure sensor (to provide the measured pressure 3194), a mass flow rate sensor or both as a check to make sure that the hydrogen gas is being delivered as intended (or as part of the control feedback loop).

Figure 32:
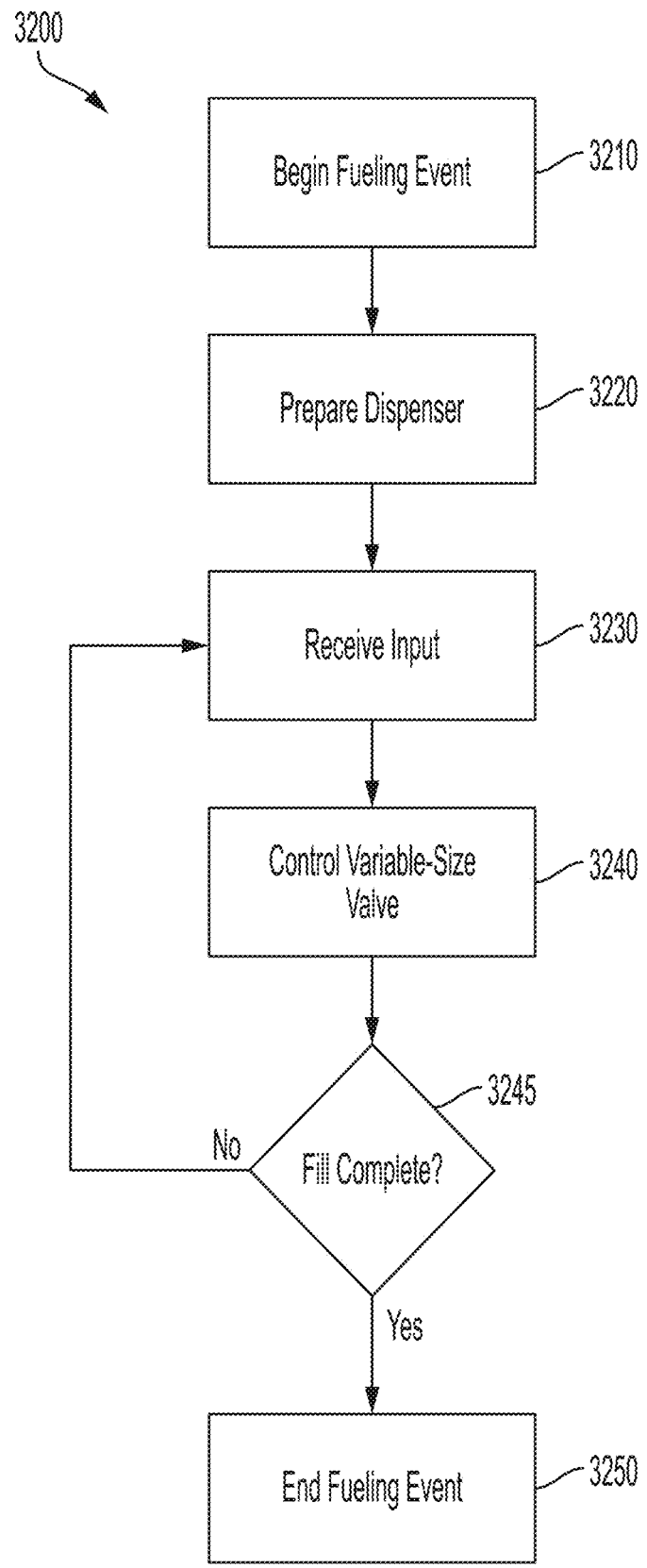
FIG. 32 illustrates a method for performing a fueling event employing a flow control valve having a direct drive servo motor paired with a variable-size orifice valve, in accordance with some embodiments.

FIG. 32 illustrates a method of controlling hydrogen gas flow during a fueling event using a variable-size valve paired with a direct drive servo motor, in accordance with some embodiments. Acts 3210 and 3220 may include some or all of the actions described for act 2910 and 2920 in connection with the fueling method illustrated in FIG. 29. For example, a fueling event may begin (act 3210) when, for example, a nozzle at a dispenser is engaged with the fuel tank of a vehicle or a fuel event is otherwise initiated. Vehicle-to-nozzle pairing may be performed using any suitable technique. In act 3220, the dispenser may be prepared to perform the fueling event by receiving tank parameters from the vehicle, engaging relevant portions of a hydrogen cooling system to provide chilled hydrogen gas, opening a master valve (e.g., a stop flow valve) to allow hydrogen gas from the supply (e.g., hydrogen gas stored in a bank of storage tanks) to flow to the dispenser, obtaining a fueling protocol for the fueling event and/or any other tasks to prepare the dispenser to perform the fueling event.

According to some embodiments, components of a hydrogen cooling system are arranged upstream from the dispenser so that chilled hydrogen is supplied to the dispenser. In some embodiments, one or more components of a hydrogen cooling system (e.g., a heat exchanger) are provided downstream from the dispenser flow control system (e.g., downstream of the variable-size valve) prior to being delivered to the nozzle so that the dispenser is supplied hydrogen gas at approximately the temperature at which the hydrogen gas is stored. To begin fueling, the dispenser controller may cause the direct drive servo motor to open the valve a small amount (e.g., bring the valve to an almost closed position) and then slowly open the valve until an initial target pressure and/or target flow rate is achieved. By initially opening the valve slowly, large spikes that could potentially overheat the tank or damage components of the dispenser are prevented. Once the initial target pressure is reached, the dispenser controller control loop follows a desired pressure and/or target flow rate profile based on input received by the dispenser controller in act 3230.

For example, the dispenser may be configured to receive supply pressure of the hydrogen gas at the input of the dispenser, measured pressure and/or flow rate downstream of the flow control valve and/or tank pressure of the fuel tank of the vehicle, a target pressure of the fuel tank (or target flow rate to be delivered) that the dispenser controller seeks to achieve, flow rate and feedback from the direct drive servo motor (e.g., valve position from an encoder). As discussed in the foregoing, the target pressure and/or target flow rate may be obtained from a fueling protocol that provides a pressure and/or flow rate profile the dispenser should follow during the fueling event. The dispenser controller may also obtain other input such as the hydrogen gas pressure and/or hydrogen flow rate at or near the nozzle (e.g., downstream from the dispenser valve system), or other input in connection with the fueling event.

In act 3240, the dispenser controller sends signals to the direct drive servo motor (e.g., voltage or current signals indicative of the direction and amount that the direct drive servo motor should change the valve position) based on the input received in act 2930. According to some embodiments, the dispenser controller uses the supply pressure of hydrogen gas at or near the valve input, the measured pressure downstream of the flow control valve and/or current tank pressure of the fuel tank of the vehicle, the current target pressure and/or target flow rate, current flow rate and valve position in a closed feedback loop to adjust the valve position (e.g., via signals from the dispenser controller to the direct drive servo motor) to deliver hydrogen gas at the target pressure. As the target pressure and/or target flow changes (e.g., according to a fueling protocol) and/or as the supply pressure changes, the feedback loop tracks the target pressure and/or flow rate by adjusting the valve position accordingly until it is determined that the fill is complete in act 3245, for example, when the nozzle is disengaged from the fuel tank, the dispenser determines that the fuel tank is full (e.g., the tank pressure has reached its maximum tank pressure), or the dispenser otherwise determines (or is instructed) that the delivery of hydrogen gas should be terminated. To end the fueling event (act 3250), the dispenser controller may signal the direct drive servo motor to bring the valve to a fully closed position (and close any master valve that may be present) and/or otherwise stop the dispensing of hydrogen gas to the fuel tank of the vehicle.

Figure 33A:
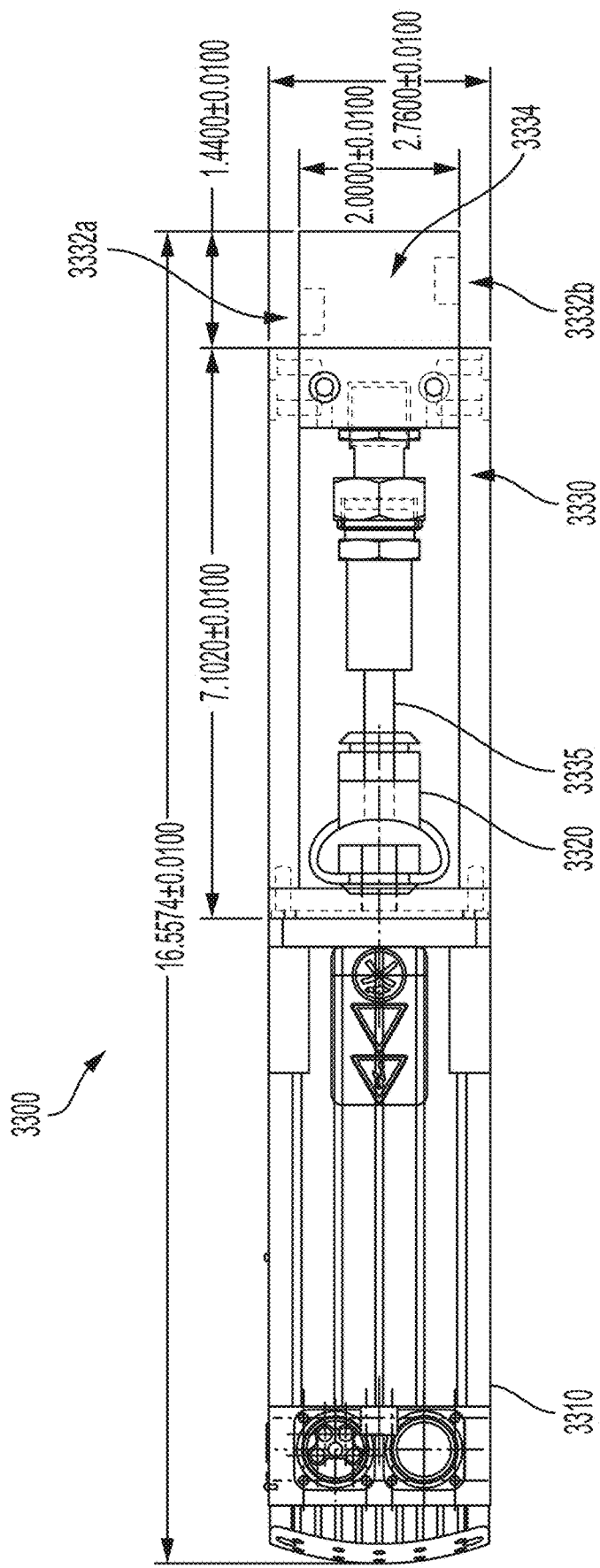
FIGS. 33A and 33B illustrate views of a flow control valve having a direct drive servo motor paired with a variable-size orifice valve, in accordance with some embodiments.
Figure 33B:
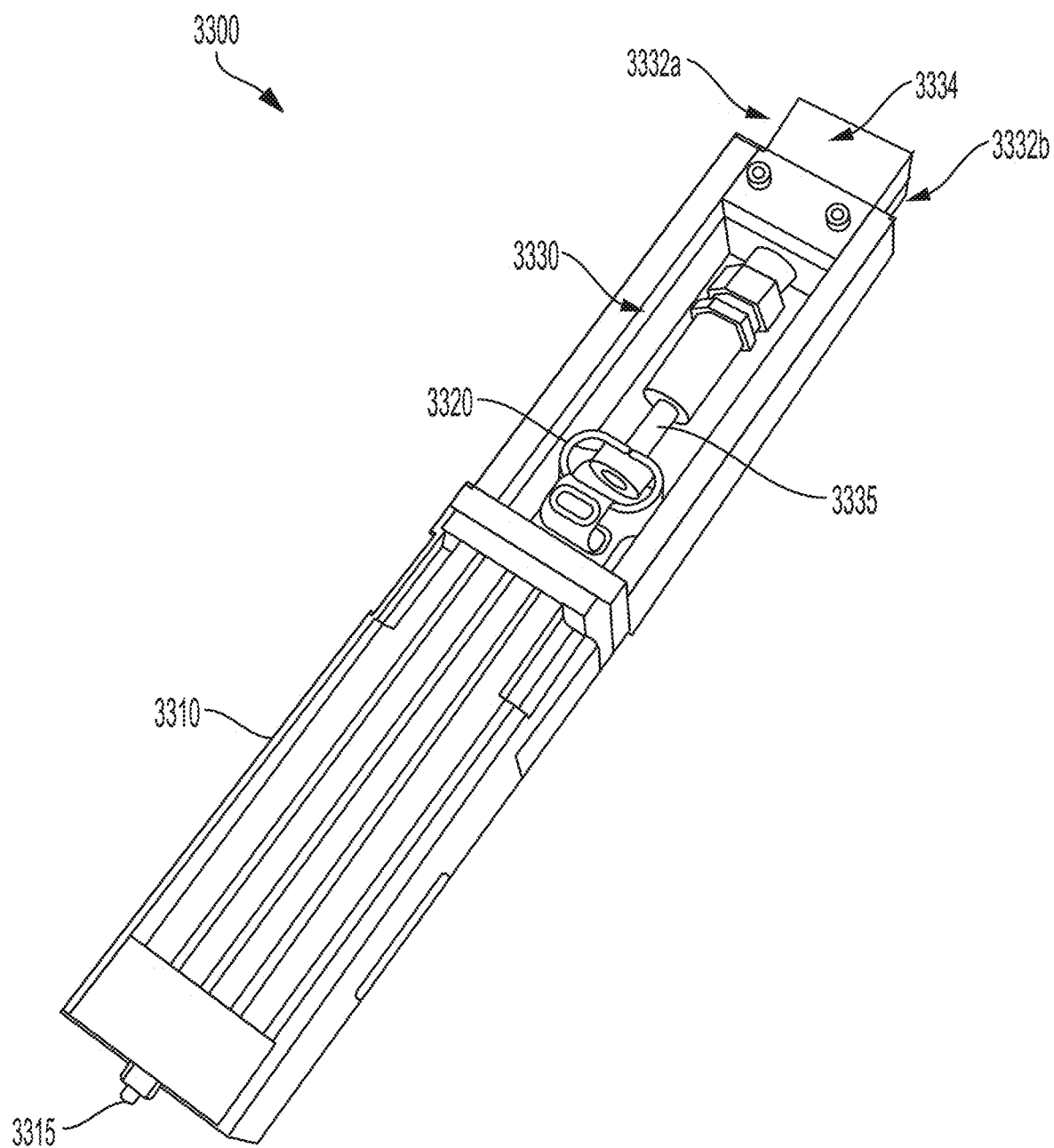

FIG. 33 illustrate view of flow control valve comprising a variable-size valve paired with direct drive servo motor, in accordance with some embodiments. Exemplary flow control valve 3300 comprises a valve 3330 having a valve opening or orifice 3334 whose size can be varied from fully closed to fully opened by rotating valve stem 3335. A direct drive servo motor 3310 is coupled to valve stem 3335 via valve coupling 3320 so that its rotation causes valve stem 3335 to rotate to change the size of valve orifice 3334. Hydrogen gas flows through the valve orifice via inlet 3332*a* and 3332*b*. As discussed above, a direct drive servo motor has a one-to-one rotational relationship with valve so that each 360° rotation of the direct drive servo motor 3310 cause a corresponding 360° rotation of valve stem 3335. According to some embodiments, the valve opening is moved from fully opened to fully closed in between 7-10 rotations of the valve stem and the direct drive servo motor is configured to rotate at a speed that moves the valve opening from fully opened to fully closed in between 1 and 5 seconds. For example, according to some embodiments, direct drive servo motor 3310 (which may have the ability to rotate at up to 6200 RPM according to some embodiments) is configured to rotate at a maximum of approximately 200 RPM so that the direct drive servo motor is capable of causing valve opening 3334 to move from fully opened to fully closed in approximately 2 seconds. Because a direct drive servo motor will often have a higher maximum RPM (e.g., 600 RPM, 1200 RPM, 4800 RPM, 6200 RPM, etc.) than the maximum RPM at which the motor will typically be operated at (e.g., 100 RPM, 200 RPM, 300 RPM, etc.), using a direct drive servo motor allows a variable-size orifice valve to be operated slower or faster depending on the specific requirements of a dispenser, fueling protocol and/or fueling event (e.g., between 1 and 10 seconds, or longer if desired). Compared to conventional control valves that can move a valve opening from fully opened to fully closed on the order of minutes, the ability of a direct drive servo motor to move a valve opening from fully opened to fully closed on the order of seconds provides for significantly faster response times.

For hydrogen fueling applications, a valve that allows for a wide range of flow rates is beneficial and, in some cases, may be required. According to some embodiments, a variable-size orifice valve (e.g., valve 3330 in flow control valve 3300) has a range from 0-90 g/min to facilitate control of hydrogen flow for hydrogen fueling. For example, some exemplary variable-size orifice valves may be capable of proving 0 g/min at the fully closed position and 90 g/min at the fully opened position. According to some embodiments, a variable-size orifice valve has a smaller or larger flow rate range (e.g., 0-40 g/min, 0-60 g/min, 0-80 g/min, 0-100 g/min, 0-120 g/min, etc), as the aspects are not limited to any particular range provided the range is suitable for hydrogen fueling. Additionally, the electrical components of the servo motor may be rated for use in hazardous environments to ensure that the electrical components operate safely in a hydrogen fueling environment.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, controller, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers, controllers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately," "about," and "substantially" may be used to mean within ±20% of a target value in some embodiments, within ±10% of a target value in some embodiments, within ±5% of a target value in some embodiments, and yet within ±2% of a target value in some embodiments. The terms "approximately," "about," and "substantially" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A hydrogen gas dispenser configured to receive hydrogen gas from a hydrogen gas supply and provide the hydrogen gas to a fuel tank of a vehicle during a fueling event, the hydrogen gas dispenser comprising:
    at least one nozzle configured to engage with the fuel tank to dispense hydrogen gas to the fuel tank during the fueling event, the at least one nozzle comprising:
        a first nozzle configured to engage with a fuel tank of a first type of vehicle; and
        a second nozzle configured to engage with a fuel tank of a second type of vehicle;
    a valve bank comprising a plurality of fixed-size orifice valves arranged in parallel, the bank configured to receive hydrogen gas from the hydrogen gas supply and to deliver hydrogen gas passing through one or more of the plurality of fixed-size orifice valves that have been opened;
    a dispenser controller coupled to the bank and configured to selectively open or close the plurality of fixed-size orifice valves to provide hydrogen gas at desired flow rates based on target pressures and/or target flow rates of the fuel tank of the vehicle during the fueling event;

a first fixed-size orifice valve positioned between the valve bank and the first nozzle to provide hydrogen gas passing through the valve bank to the first nozzle when opened; and a second fixed-size orifice valve positioned between the valve bank and the second nozzle to provide hydrogen gas passing through the valve bank to the second nozzle when opened.

2. The hydrogen gas dispenser of claim 1, wherein the dispenser controller is configured to receive as input:
a supply pressure of hydrogen from the hydrogen gas supply;
a measured pressure downstream of the valve bank and/or a tank pressure of hydrogen gas in the fuel tank; and
a target pressure and/or target flow rate, and
wherein the dispenser controller is configured to selectively open or close the plurality fixed-size orifice valves based on the input.

3. The hydrogen gas dispenser of claim 2, wherein the target pressure and/or the target flow rate changes during the fueling event.

4. The hydrogen gas dispenser of claim 2, wherein the input received by the dispenser controller includes a pressure profile that provides target pressures over a duration of the fueling event, and wherein the dispenser controller is configured to selectively open or close the plurality of fixed-size orifice valves to provide hydrogen gas at flow rates that cause the measured pressure and/or the tank pressure to follow the pressure profile.

5. The hydrogen gas dispenser of claim 1, wherein at least one of the plurality of fixed-size orifice valve has an orifice size that is different than at least one other of the plurality of fixed-size orifice valves.

6. The hydrogen gas dispenser of claim 1, wherein the plurality of fixed-size orifice valve comprises at least three fixed-size orifice valves.

7. The hydrogen gas dispenser of claim 1, wherein the valve bank comprises at least one fixed-size orifice with no corresponding valve arranged in parallel with the plurality of fixed-size orifice valves.

8. The hydrogen gas dispenser of claim 1, wherein the first type of vehicle includes a larger capacity fuel tank than the second type of vehicle.

9. The hydrogen gas dispenser of claim 1, wherein the first nozzle is configured to not engage with the fuel tank of the second type of vehicle, and wherein the second nozzle is configured to not engage with the fuel tank of the first type of vehicle.

10. The hydrogen gas dispenser of claim 1, wherein the hydrogen gas dispenser is coupled to a hydrogen gas cooling system configured to provide chilled hydrogen gas to be delivered to the fuel tank of the vehicle during the fueling event.

11. A method of dispensing hydrogen gas to a fuel tank of a vehicle during a fueling event via a valve bank comprising a plurality of fixed-size orifice valves arranged in parallel, the method comprising:
receiving hydrogen gas from a hydrogen gas supply;
receiving as a first input:
a supply pressure of hydrogen from the hydrogen gas supply; and
a measured pressure downstream of the valve bank and/or a tank pressure of hydrogen gas in the fuel tank of the vehicle;
selectively opening and/or closing at least one of the plurality of fixed-size orifice valves that results in a target pressure and/or target flow rate at which it is desired to provide hydrogen gas to the fuel tank based at least in part on the first input; and
opening a first fixed-sized orifice valve positioned between the valve bank and a first nozzle configured to engage with a fuel tank of a first type of vehicle to allow hydrogen gas passing through the valve bank to be dispensed to the fuel tank of the vehicle via the first nozzle, or
opening a second fixed-sized orifice valve positioned between the valve bank and a second nozzle configured to engage with a fuel tank of a second type of vehicle to allow hydrogen gas passing through the valve bank to be dispensed to the fuel tank of the vehicle via the second nozzle.

12. The method of claim 11, further comprising receiving a pressure profile that provides target pressures over a duration of the fueling event, wherein selectively opening and/or closing comprises selectively opening and/or closing at least one of the plurality of fixed-size orifice valves to provide hydrogen gas at flow rates that cause the measured pressure and/or the tank pressure to follow the pressure profile.

13. The method of claim 11, wherein at least one of the plurality of fixed-size orifice valve has an orifice size that is different than at least one other of the plurality of fixed-size orifice valves.

14. The method of claim 11, wherein selectively opening and/or closing at least one of the plurality of fixed-size orifice valves of the valve bank causes one of at least four different flow rates to pass through the valve bank.

15. The method of claim 11, wherein selectively opening and/or closing at least one of the plurality of fixed-size orifice valves of the valve bank causes one of at least six different flow rates to pass through the valve bank.

16. The method of claim 11, further comprising:
dispensing the hydrogen gas flowing through the valve opening to the fuel tank of the vehicle; and
cooling the hydrogen gas prior to dispensing.

* * * * *